Figure 1:
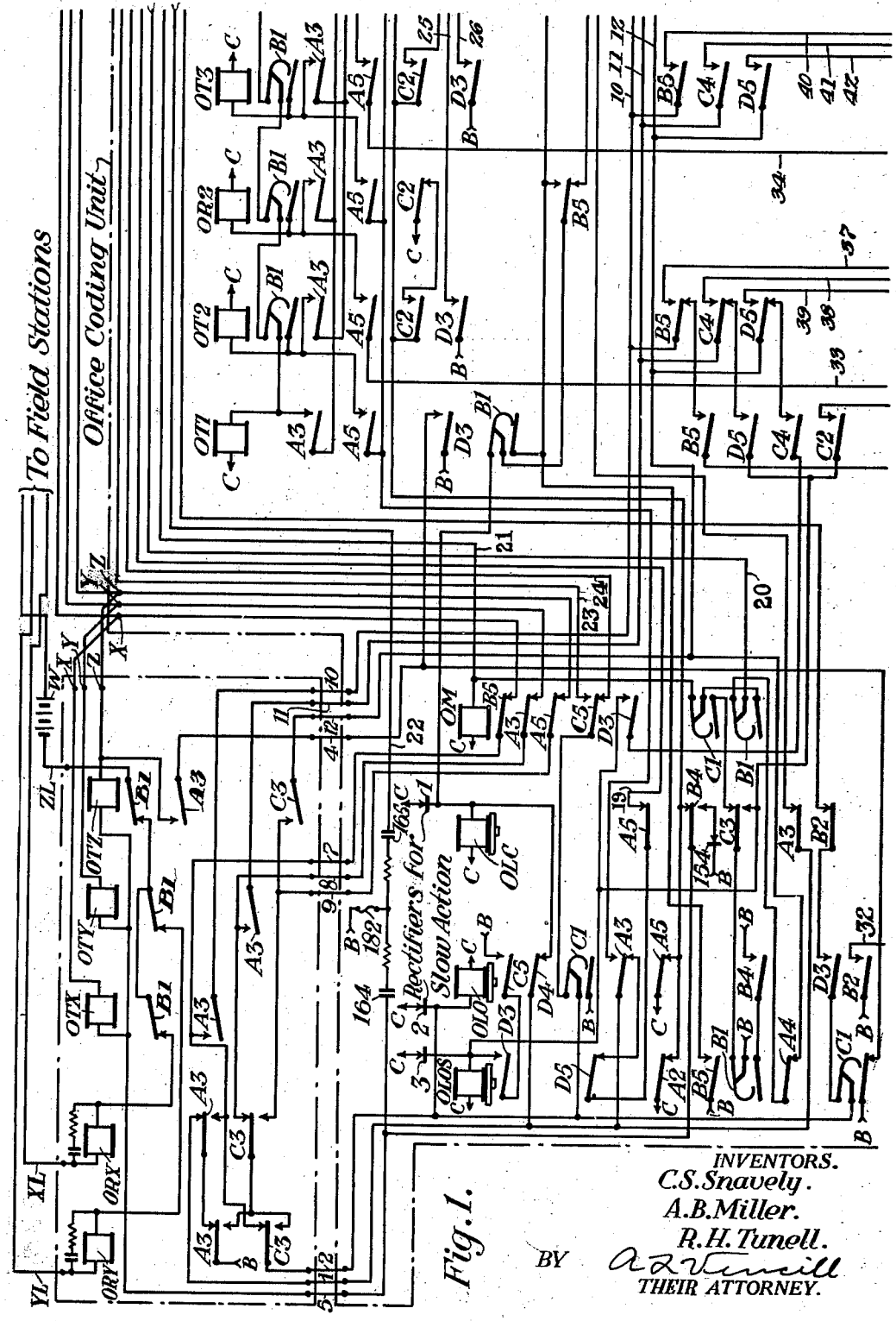
Figure 2:
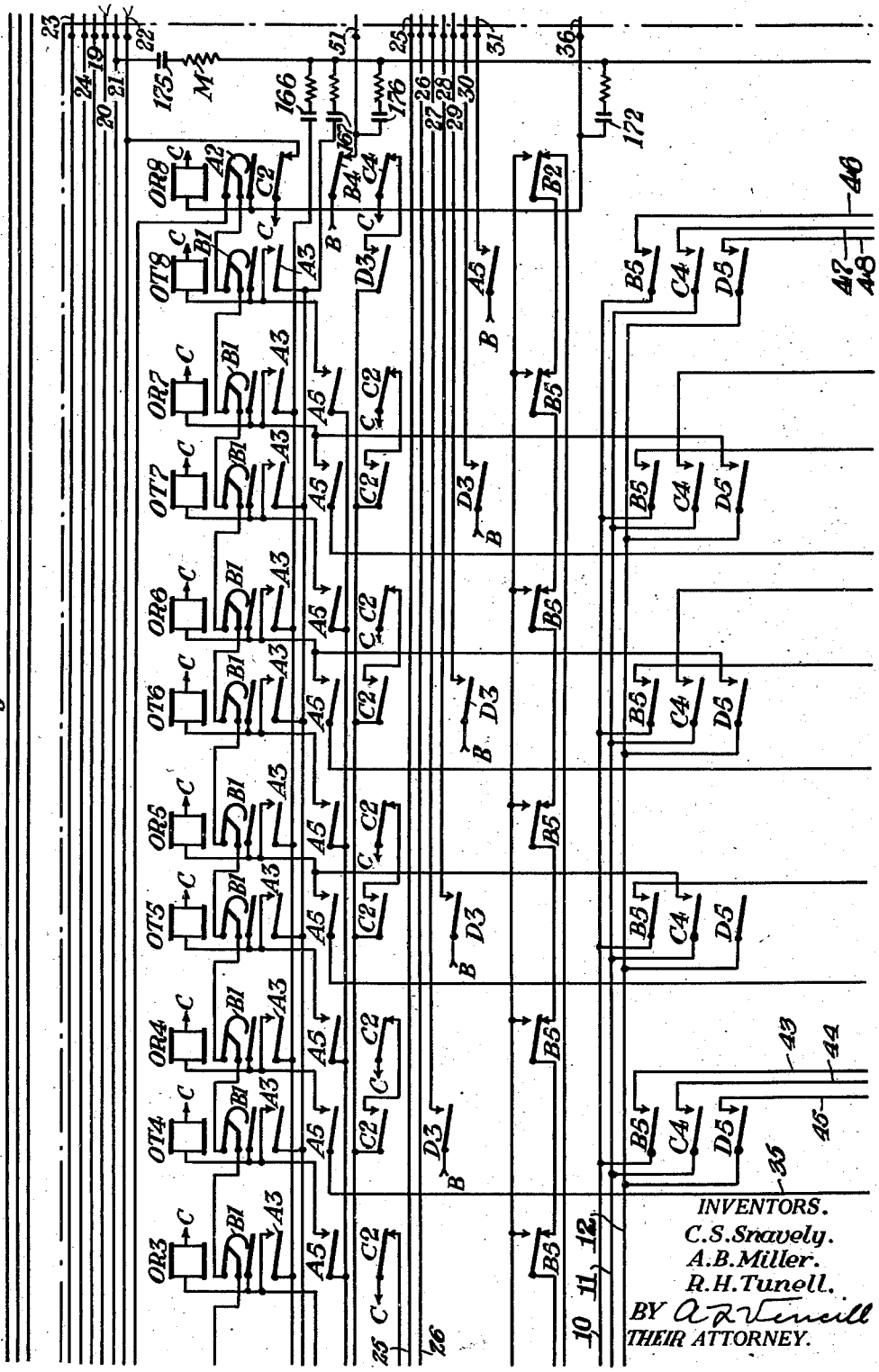
Figure 3:
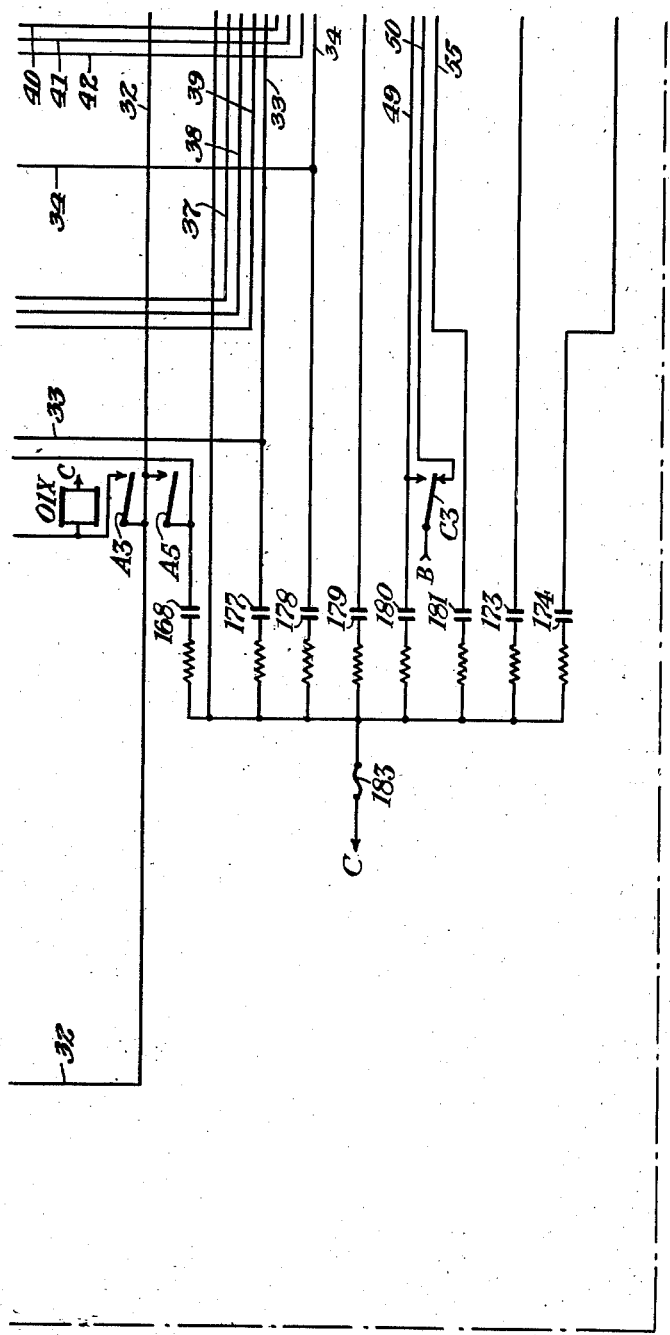
Figure 4:
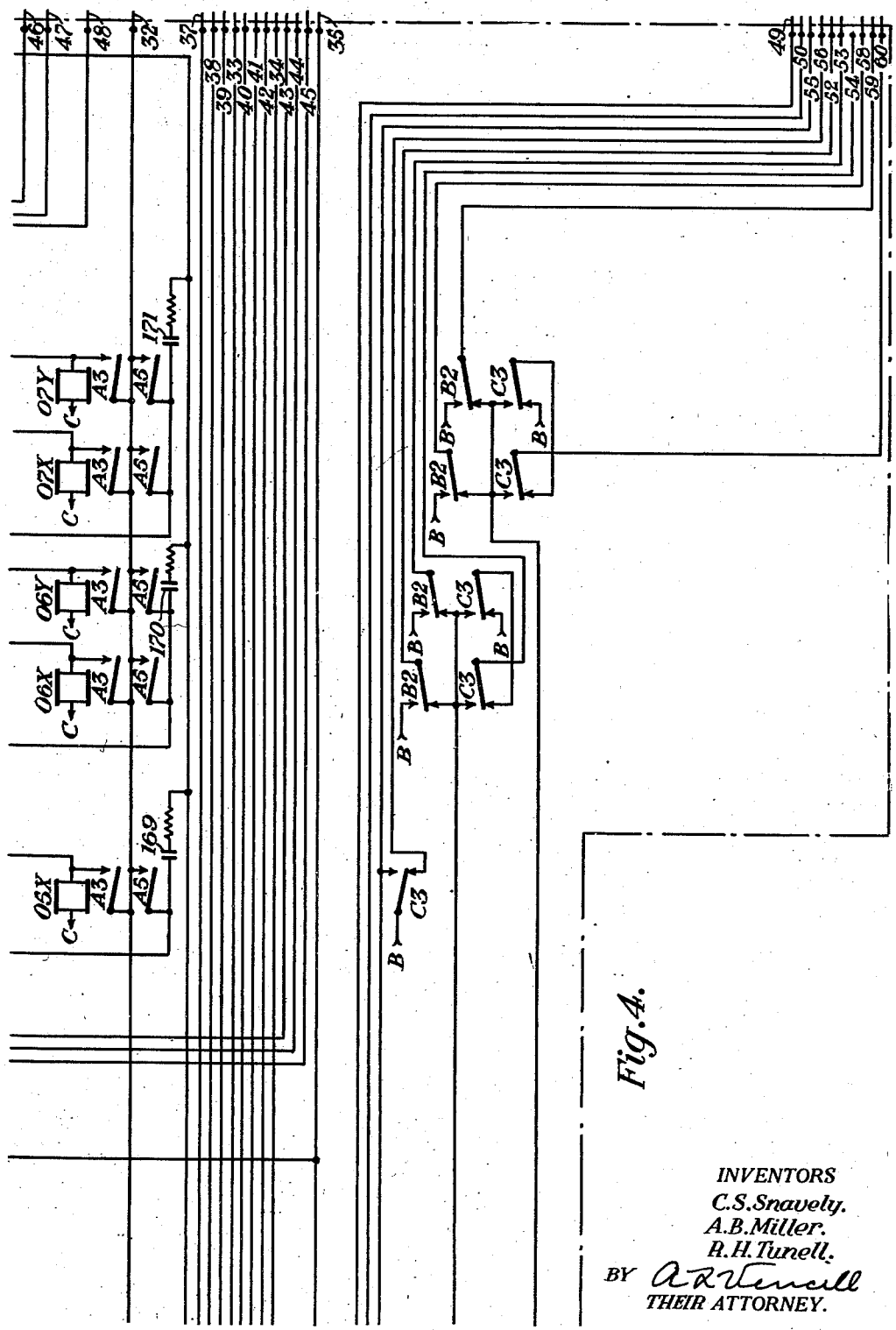
Figure 5:
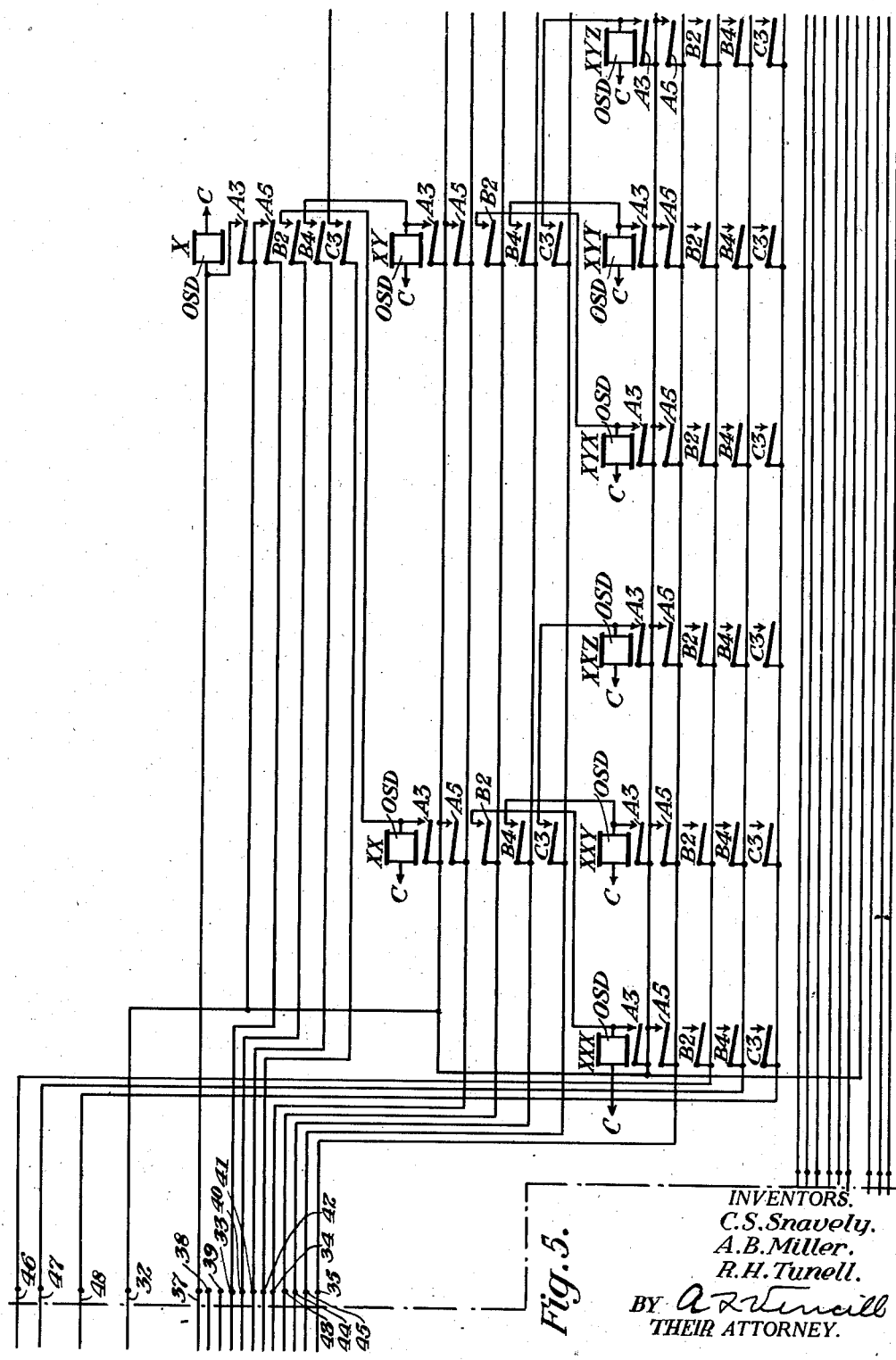
Figure 6:
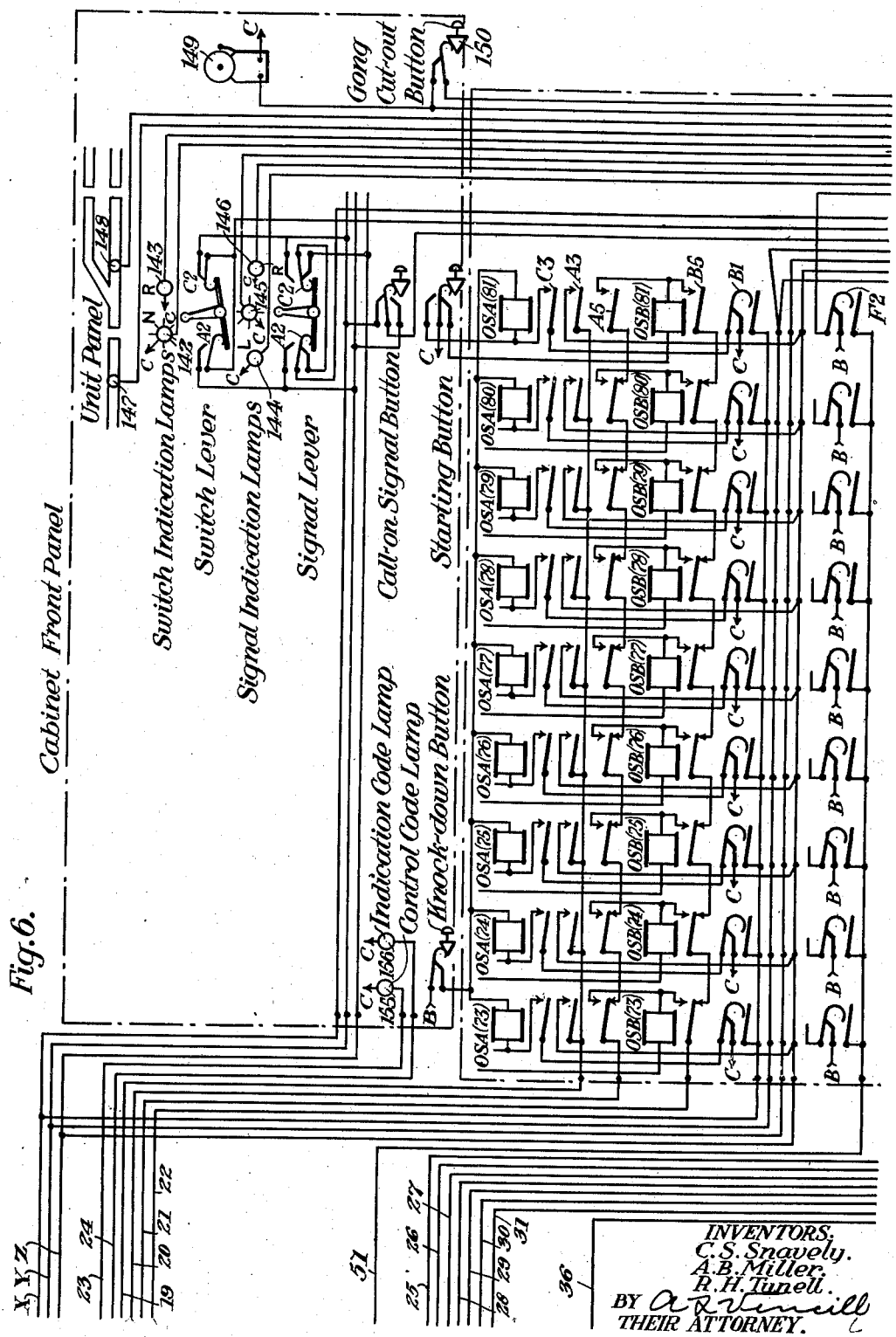
Figure 7:
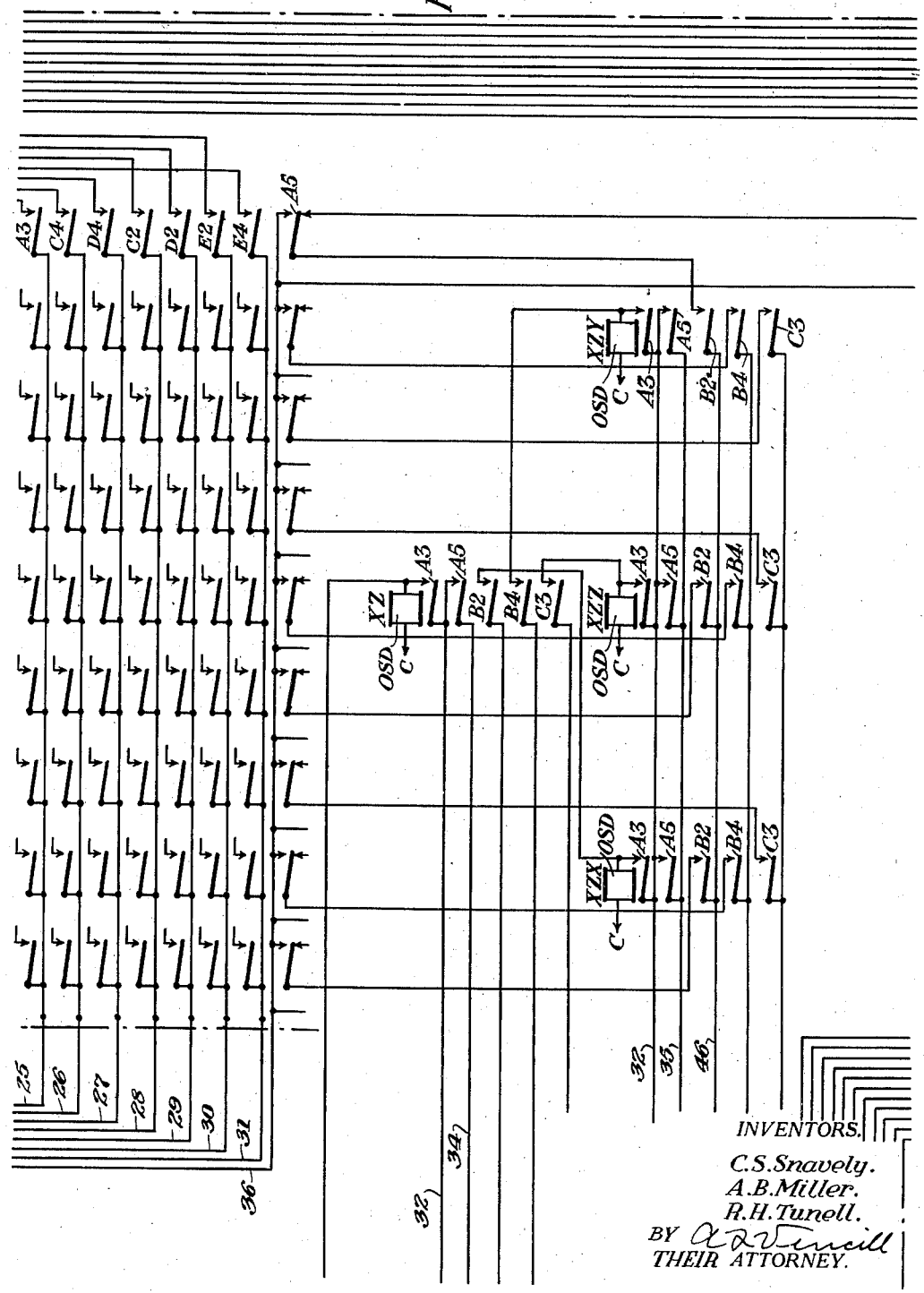

Oct. 7, 1941.  C. S. SNAVELY ET AL  2,258,341
REMOTE CONTROL SYSTEM
Filed May 18, 1931  14 Sheets—Sheet 3

INVENTORS.
C.S. Snavely.
A.B. Miller.
R.H. Tunell.
BY
THEIR ATTORNEY.

Oct. 7, 1941.   C. S. SNAVELY ET AL   2,258,341
REMOTE CONTROL SYSTEM
Filed May 18, 1931   14 Sheets-Sheet 13

INVENTORS.
C. S. Snavely.
A. B. Miller.
R. H. Tunell.
BY *[signature]*
THEIR ATTORNEY.

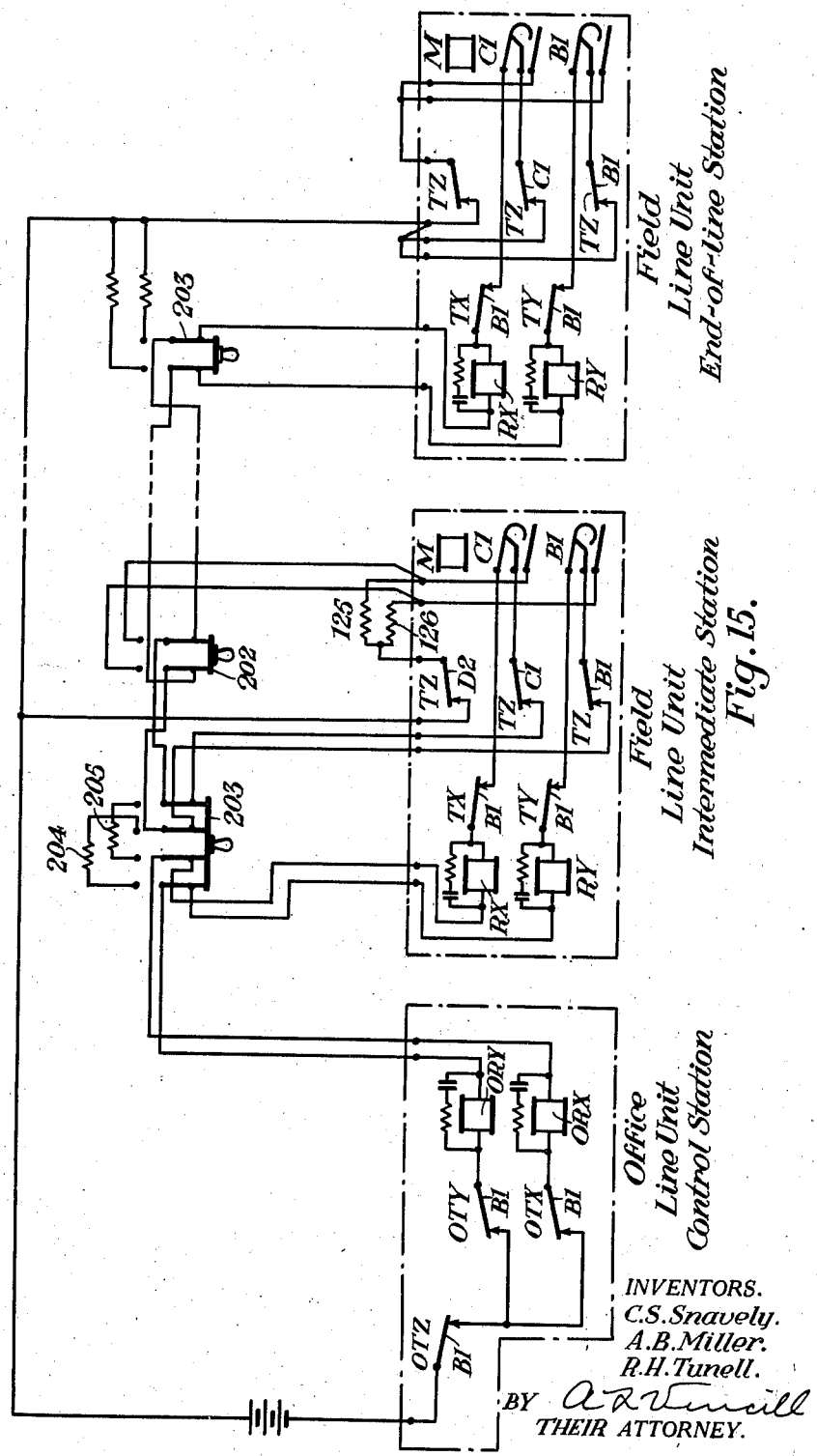

Patented Oct. 7, 1941

2,258,341

UNITED STATES PATENT OFFICE 2,258,341

REMOTE CONTROL SYSTEM

Clarence S. Snavely, Pittsburgh, Alfred B. Miller, Edgewood Borough, and Robert H. Tunell, Wilkinsburg, Pa., assignors to The Union Switch & Signal Company, Swissvale, Pa., a corporation of Pennsylvania Application May 18, 1931, Serial No. 538,380

139 Claims. (Cl. 246—5)

Our invention relates to remote control systems, and particularly to centralized traffic control systems for railroads of the type comprising means for controlling a plurality of movable devices such as railway switches, or signals, or both, from a remote point such for example as a train dispatcher's office; and for also communicating to said office the condition of such devices and other information, such as the presence of trains adjacent such devices.

For purposes of explanation, we have disclosed our invention as applied to a remote control system of the code type in which control codes are transmitted from the office to a plurality of field stations and from any field station to the office over a plurality of direct wire circuits which are controlled selectively to produce code elements of distinctive characters arranged in predetermined sequences to which the receiving apparatus at the office and at each station is selectively responsive. One system operating in the manner described, is disclosed and claimed in a copending application Serial No. 398,343, filed by A. B. Miller, on October 9, 1929, now Patent No. 2,085,438, issued June 29, 1937, for Remote controlling apparatus.

One object of our present invention is to provide, in a system of the type described, apparatus consisting of relays of the usual and well known tractive armature type connected and arranged to produce the results required for controlling the switches, signals, etc., necessary for safely controlling railroad traffic.

Other objects and features of our invention will become apparent from the following description.

We will describe one form of remote control system embodying our invention, and will then point out the novel features thereof in claims.

In the accompanying drawings, Figs. 1 to 8, inclusive, when arranged in the order indicated in Fig. 9, form a diagrammatic view illustrating one form of office equipment employed in a remote control system embodying our invention. Figs. 10 to 14, when arranged in numerical order form a diagrammatic view illustrating the apparatus located at a single field station in a system embodying our invention. Fig. 15 is a diagrammatic view illustrating the line circuits over which codes are delivered, together with the apparatus immediately associated with such line circuits at the office and at two field stations.

Similar reference characters refer to similar parts in each of the several views.

Referring to the drawings, we have provided a plurality of communication channels between the office and each line station. As here shown there are two of these communication channels provided by three line wires XL, YL and ZL, extending from the office through each of the field stations throughout the control territory. Line wire ZL serves as a common return for the two line circuits one including line wire XL and the other including line wire YL. Two line relays are located in the office, and two similar line relays are located at each field station, each such line relay being included in one of the line circuits made up of the common wire ZL and one of the line wires XL or YL. Thus line relay ORX at the office and line relay RX at the station are included in line wire XL, and line relay ORY at the office and line relay RY at the station are included in line wire YL. Current is normally supplied to both line circuits from a battery W located at the office. Both said line circuits are normally closed, so all line relays are normally energized.

Means are provided however for selectively controlling these line circuits to produce code elements which may be combined in different sequences to produce distinctive complete codes, and to cause successive similar operations of individual ones or combinations of the line relays at a distant point in response to the successive elements of the codes. Since we have shown the line circuits normally closed we prefer to produce these code elements by briefly opening one or more of the line circuits, thereby simultaneously deenergizing all line relays in the corresponding circuit or circuits throughout the system. It is obvious that any line circuit may be opened at the office or at any station, and that codes may therefore originate at any point in the system where adequate transmitting equipment is installed. Thus a code element of one character which we will hereinafter term an X element may be produced by briefly opening the line circuit through wire XL; a different code element which we will call a Y element may be produced by opening the line circuit through wire YL; and if both line circuits are opened, simultaneously, still another code element which we will call a Z element is produced. It should be pointed out that this method of controlling the line circuits is not essential, as any control operation imposed selectively upon the line circuits could be employed to produce different code elements.

Figure 12:
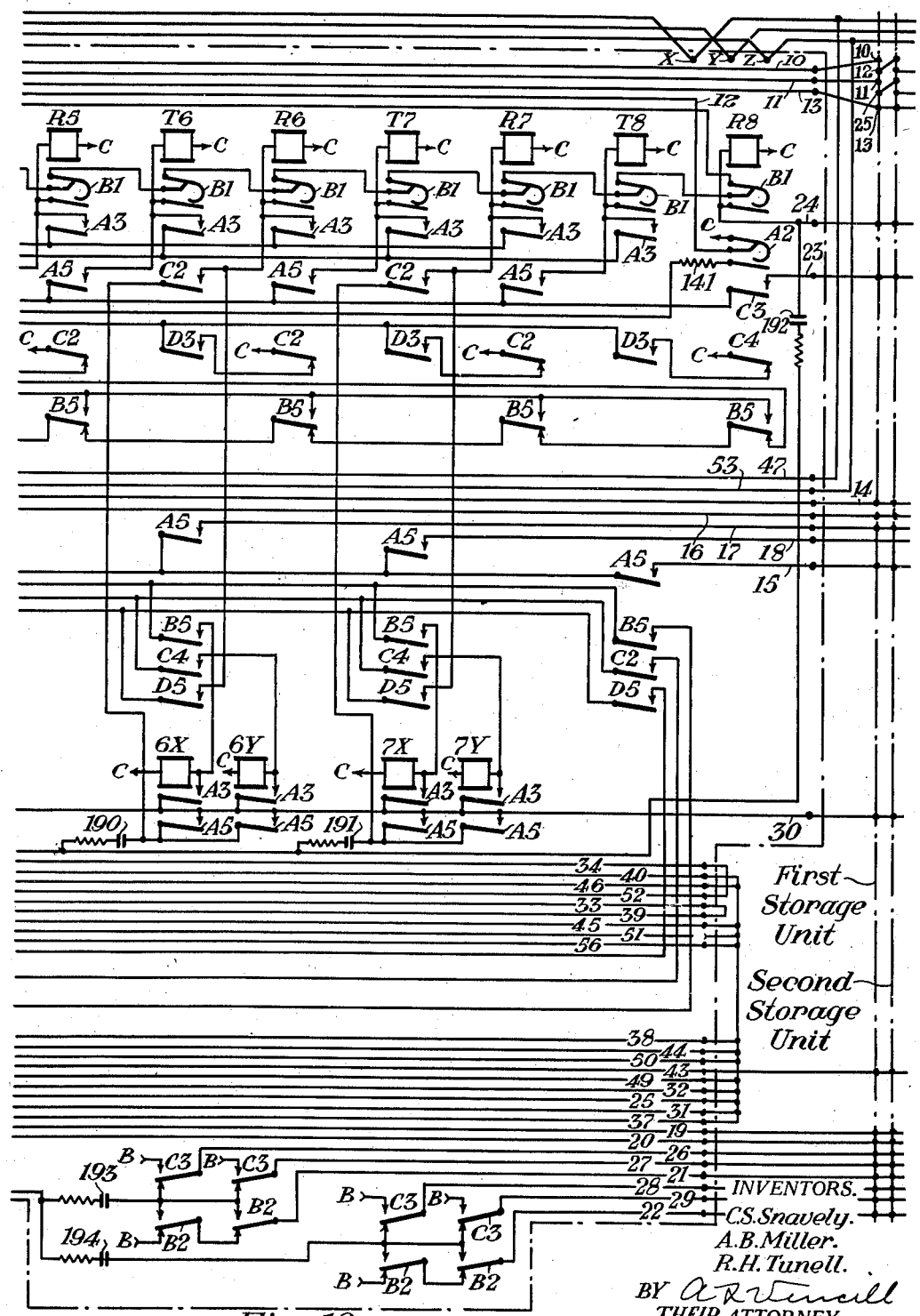
Figure 13:
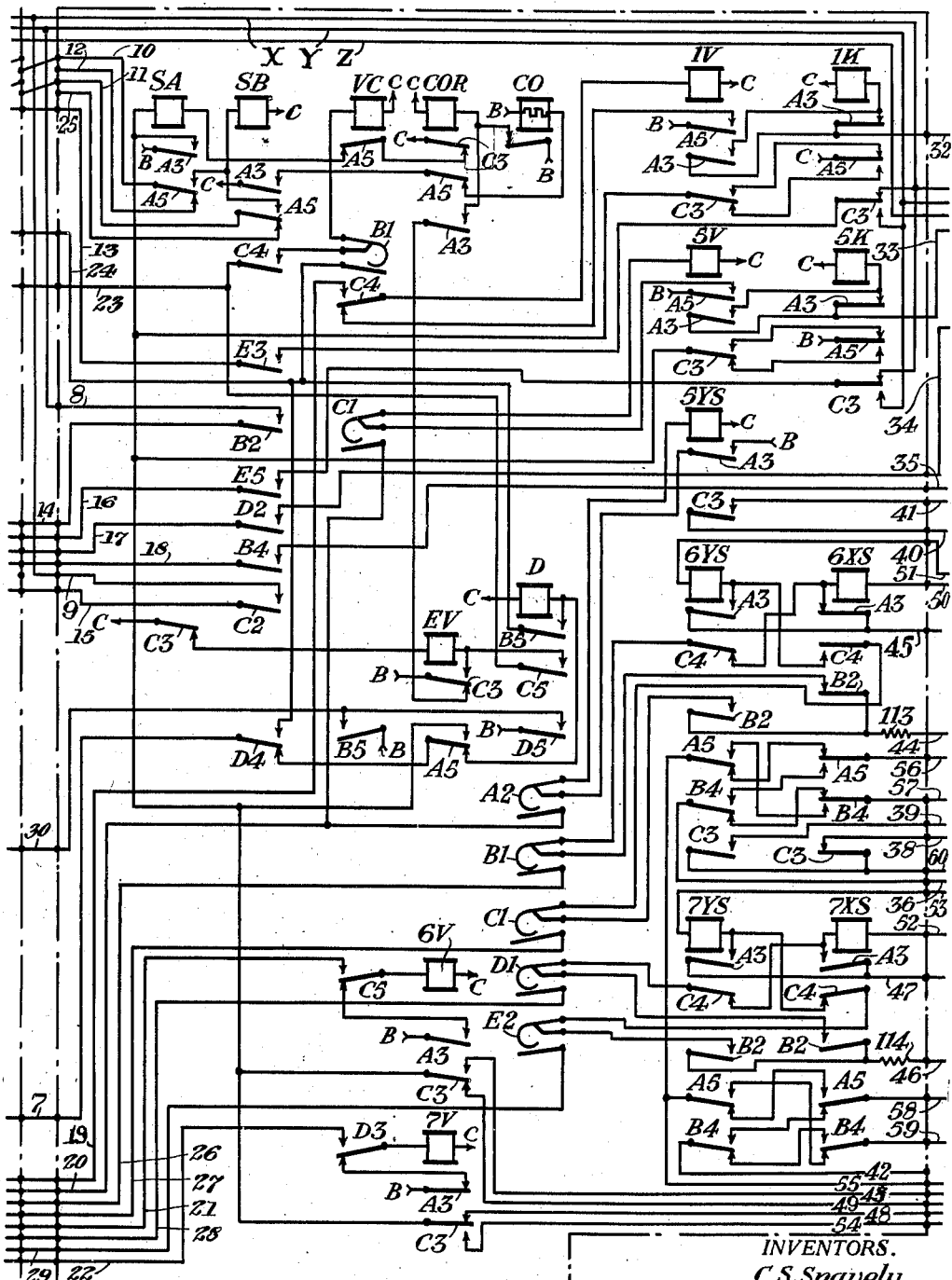
Figure 14:
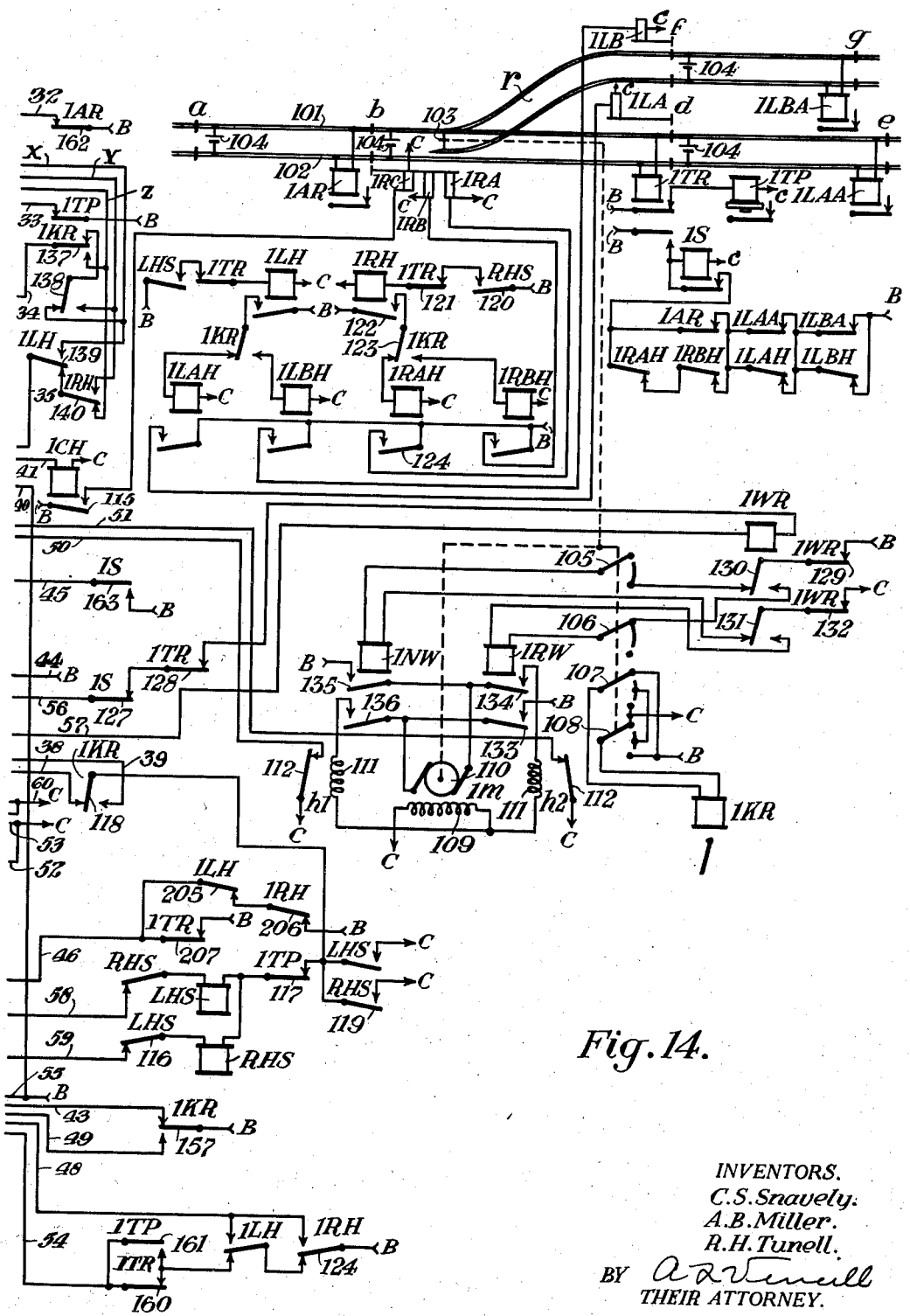

Remote control systems embodying our invention may be employed to control and indicate station devices of any suitable character, but for purposes of illustration we have shown at the station illustrated in Figs. 10 to 14, a railway track switch and its accompanying signals. Referring particularly to Fig. 14, the reference characters 101 and 102 designate the track rails of a stretch of railway track divided by the usual insulated joints to form a main track section b—d. This track section contains a railway track switch 103 of the usual form communicating with a siding r. The track rails of the stretch of track adjacent the main track section b—d are divided to form a plurality of approach sections a—b, f—g, and d—e, and each of these approach sections, as well as the main section b—d is provided with a track circuit including a track battery 104 and a track relay connected across the rails at opposite ends of the section. The track relay for the section containing the switch 103 is designated ITR, and the track relay for the approach section a—b is designated IAR. Relays ILBA and ILAA are the track relays for approach sections f—g and d—e, respectively.

Eastbound traffic over the switch 103 is controlled by two signals IRA and IRB, which as here shown are mounted upon a single mast also carrying a call-on signal IRC. Westbound traffic over the switch is controlled by two other signals ILB and ILA. The signals may be of any suitable form, and as here shown are of the usual semaphore type.

The switch 103 operates a plurality of circuit controllers 105, 106, 107 and 108 which are arranged to assume one position or another in response to the position of the switch in accordance with usual practice. Switch 103 is in turn operated by a motor Im having a field 109 and an armature 110, which motor is controlled in part by means under the control of the dispatcher. As here shown, the immediate control of the switch is accomplished by a polarized switch control relay IWR which is controlled, as will be described hereinafter, in accordance with control codes received from the office.

Associated with the track relay ITR is a slow acting repeater relay ITP, the circuit of which includes a front contact of tray relay ITR, so that relay ITP is deenergized when section b—d is occupied.

The signals at the station illustrated are controlled in part by two directional control or route relays ILH and IRH controlled by signal control relays LHS and RHS, respectively, in response to control codes originating at the office as will be described in detail hereinafter. The directional control relays ILH and IRH control four signal relays one for each of the signals except the call-on signal. Each signal relay is identified by a symbol formed by adding H to the designation of the corresponding signal.

The call-on signal IRC is controlled directly by a relay ICH controlled by codes received from the office.

The reference character IS designates a locking relay which is normally energized over a stick circuit including front contacts of approach relays IAR, ILAA, and ILBA in series. A back contact of signal control relay ILBH is connected around the front contact of relay ILBA in the above circuit, and a back contact of relay ILAH is connected around the front contact of relay ILAA. Furthermore, back contacts of relays IRAH and IRBH in series are connected around the front contact of relay IAR. It is plain therefore that the stick circuit for relay IS is normally closed, but that if a train enters any of the approach sections leading into section b—d, the opening of the corresponding approach relay will break the stick circuit for relay IS, provided the corresponding signal relay is energized to clear the appropriate signal. After relay IS has been deenergized, it can be picked up by the deenergization of track relay ITR, as by the entrance of a train into the main track section b—d. The locking relay IS is the usual approach locking relay customarily employed in systems of the type here involved, and the circuit shown is only one of several alternative forms well known in the art.

For the actual control of switch motor Im, we provide two electromagnetic contactors INW and IRW controlled by relay IWR, and we also provide two thermo-sensitive relays h1 and h2, each provided with a heating winding 111 and a contact 112 controlled thereby. The operation of these elements will be described more in detail as the description proceeds.

The reference character IKR designates an indication relay controlled by a pole changer including contacts 107 and 108 operated by the track switch 103. The relay IKR is polarized and is controlled to be energized in its normal or left-hand position when the track switch occupies its normal position in which it is illustrated in the drawings, and to be energized in its reverse or right-hand direction, when the switch 103 is reversed. When the switch 103 occupies any intermediate or unlocked position the relay IKR is deenergized in accordance with usual practice.

The system as a whole is of the all relay code type, comprising relays at the office and at each station which are grouped in separate units according to the function the relays perform. Thus each location is provided with a line unit including the line relays and the relays associated therewith. Each location is also provided with a coding unit the function of which is to generate the stepping action for code progression of codes originating at this point, as well as to follow the progressive action of received codes originating at other points, and to interpret and register the code character during the reception of the code for delivery to storage or registration units at the completion of the full code action.

In addition each location is provided with a storage unit which performs certain important functions with respect to both outgoing and incoming codes. The office storage unit includes relays selectively controlled by indication codes and also the relays which initiate control code action and determine the characters of control codes in accordance with the result which such codes are intended to accomplish. The station storage units contain certain stick relays which will be discussed in detail hereinafter, and which are selectively controlled by control codes originating at the office to govern the devices located at the corresponding station. It is, for example, the storage unit at the station illustrated in Figs. 10–14 that controls the switch relay IWR and the signal relays ICH, ILAH, ILBH, IRAH and IRBH shown on Fig. 14. In addition, each station storage unit contains relays which control the initiation of indication codes at the corresponding station for transmission to the office, and to impart to such indication codes the distinctive characteristics to insure proper indication at the office of the information intended to be conveyed concerning traffic conditions at the station.

In actual practice, we have found it convenient to house the relays forming the office line, coding and storage units in a control cabinet the front face of which carries a panel board divided into unit panels each of which contains the control and indication devices associated with a particular station.

The panel equipment may, of course, be varied to suit individual requirements, but for controlling the usual railway switch and its complement of signals as described at the station referred to above, we employ on each panel a two-position switch control lever and a three-position signal control lever. We also provide two switch indication lamps, three signal indication lamps and two track indication lamps one for reporting the condition of the main track circuit and the other for reporting the condition of an approach section at the corresponding station. The two track indication lamps are usually associated with a track diagram extending across the top of the panel board.

In addition to the foregoing, each panel is provided with a two-position push button for controlling an associated call-on signal, and a spring return two-position starting button for initiating code action.

In order to simplify the disclosure we have illustrated in the drawings only one complete panel corresponding to the single station which is illustrated in detail, and have shown a system capable of handling eighty-one separate and independent stations and panels. Portions of the office coding unit necessary for accomplishing the necessary selection between all of these eighty-one stations have been omitted for a similar reason, only enough of the apparatus being shown to clearly disclose the principles involved.

It will be noted that both office and station apparatus contains certain relays with similar functions, and to such relays we have applied similar reference characters, distinguishing the office relays by the prefix O. It will also be noted that in order to assist in tracing circuits in the detailed description which follows we have applied distinctive reference characters to different relay contacts. In order to avoid confusing nomenclature we have employed arbitrary symbols for relay contact designations such as A3, D5, etc., which symbols may be duplicated on a number of different relays. These symbols originated as designations of the tier and row occupied by a particular contact on the multiple control relays here employed, but for present purposes these significations may be ignored.

Before proceeding to a description of the operation of the apparatus, we shall describe in general the functions of certain of the relays employed in our system.

The "R" relays with "X" and "Y" suffixes are the line relays discussed above. The "T" relays with the "X", "Y" and "Z" suffixes are the transmitter relays which open the line circuits to produce code elements. Both of these groups are located in the line units.

The "LC", "LO" and "LOS" relays are the slow acting relays that protect the line from interference during code action. The "LC" relay repeats the line closed condition and bridges the line open intervals during code action. Correspondingly, the "LO" relay repeats the line open condition and bridges the line closed intervals during code action. The "LOS" relay is an auxiliary relay whose functions will appear later.

The "M" relays may be referred to as the master relays that must be operated at any given location for transmission of code.

The "T" and "R" relays with numerical suffixes constitute the chain or stepping group. This is the group that develops the action for transmission of code, and on reception follows the code action from the line circuit.

The "T" relays of the chain group have the double function of selecting the proper circuits for determining character of individual elements for code transmission as well as selecting the correct circuits for distribution of the various characters received on the different code elements in reception.

The "R" relays of the chain group have the function of releasing the line circuit and cutting the location free from the line upon the successful reception and registry of the character of each code element in succession.

The "X" and "Y" relays with numerical prefixes, located under the chain group, are the ones that register and store the characters received during the code progression, and on the last element of the code deliver the stored information to the stick relays of the storage group.

In reference to the office storage group, the "SA" relays are the starting relays picked up directly by the individual starting buttons for initiating control codes from individual panels.

The "SB" relays are code setting or sending relays which connect the successive stepping elements of the control code to the correct panel for character determination, depending upon the lever positions of the panel selected.

The "SD" relays have the function of selecting the proper panel or station. On the last element of the panel selection, the "DI" and "D" relays are operated. These relays are designated "delivery" relays because they function to deliver information from the intermediate storage group of the coding unit to the final stick relays of the correct panel for control of indication lamps.

The group of relays located to the right of the last OD and ODI relays are the stick relays associated with each panel. The nomenclature is as follows: "AK" and "TK" for approach and track indications respectively; "NWK" and "RWK" for normal and reverse switch indications respectively; "LHGK", "RHGK" and "RGK" for "left", "right" and "red" signal indications respectively. A set of relays corresponding to those shown will be provided for each panel.

In reference to the relays of the field storage unit, the "SA" and "SB" relays have functions similar to the corresponding relays of the office group.

The group of five relays having suffix "S" are the stick relays that are operated by control codes and in turn directly control the standard wayside signal equipment. In general, the number used in the relay nomenclature designates the step of the code to which this relay responds, while the "X," "Y" or "Z" in the nomenclature designates the character to which the particular relay responds.

The "IK" and "5K" relays are track circuit repeaters for indication purposes. The "V" relays have a function similar to a "valve" action and are for interrupting the established starting circuits upon the completion of indication codes, and in the same operation preparing new circuits for the next starting action. One of these "V" relays is associated with each step of the code that carries an indication function. The "VC" relay functions as a valve control or stop for control of the individual "V" relays to terminate transmission; that is, at the proper instant during each indication code the "VC" relay prepares the circuit connections for resetting the individual "V" relays so as to open the starting circuits for the code just completed. The "EV" relay is a "recall" relay for initiating a direct starting action upon receipt of a second control code provided the normal starting circuits have not already initiated such action. The "D" relay is a delivery relay which functions like the "D" and "DI" relays in the office storage group.

The numbered connections through the dot and dash line on the right-hand side of the field storage unit (Fig. 13) constitute the connections between the code equipment and the standard wayside signal equipment.

The field storage unit here illustrated is designed for handling the same combination of functions, both control and indication, as is handled by a unit "panel" of the control machine. In other words, for each control panel in the control machine at the office there exists in the field a corresponding storage unit. The same station code combination is used by the control panel in calling the field storage unit for delivery of "controls" as is used by the field storage unit in calling the correct panel for delivery of field indications.

In general, the functions of the different groups of equipment are as follows:

On a control code, the SA and SB relays of the office storage group create the starting action and set up the circuits, so that the code character will be determined by the correct panel. This starting action is then communicated to the office line and coding units, so that action may proceed provided the condition of the line circuit is satisfactory, this condition being determined by circuits controlled by the line relays and the slow acting relays protecting the line. Once in action, the chain circuit of the coding unit carries on the progression, the character of which receives its determination in the storage group and panel. Due to the line circuits having all line relays in series, this code progression must of necessity be repeated at all locations. The coding units of each location follow the code progression on the line circuit through the line units in so far as this action serves a useful purpose. The determining factors in this repeating action will appear later. At the station that responds to the selection elements of the particular control code in question, the chain circuit follows through, receiving the characters and storing them in the intermediate group of relays illustrated under the chain group, and on the last step the selection is completed by operating the delivery relay of the desired unit in accordance with the character of this step, and then the complete summation of the code action is simultaneously distributed by the operated delivery relay to the various stick relays of the selected storage unit, which in turn control the field equipment.

As regards the indication code, the scheme of the action is generally similar to that of the control code, except that the starting effort is obtained by automatic circuit action between the signaling devices in the field and the valve relays of the storage unit, whereas in the office the action is started by manual operation of a push button. After the starting relay SA of a field storage unit has been operated, in response to a change in condition of an associated device, the corresponding "SB" relay is picked up to store the change provided the line circuits are closed and conditions are correct. In the case of the field storage unit, the "SB" relays serve to connect the various operating circuits of the coding unit operated during the several code elements to the correct switch, signal and track devices so as to give proper character to the code for registry of the condition of these devices at the office. The general action of progression of code is similar for both controls and indications. In the case of the indication code, the office receives the code action through its line unit and coding unit, the information being stored in the intermediate group of relays in the coding unit until the final step, when the selection is completed by the operation of the delivery relays of the desired panel in accordance with the character of this step, and then simultaneous delivery of these functions is made by the operated delivery relays to the stick relays in the corresponding office storage unit, which relays in turn control the indication lamps of the associated panel.

As suggested above, we employ codes made up of code elements each of which may be an X, Y or Z element and which code elements are arranged in different patterns to produce distinctive codes. In the present embodiment of our invention we employ certain elements of each code to select a particular station or a particular panel and employ certain other elements to determine the function performed at the selected panel or station by that particular code. With the understanding that the particular number of elements in each code, and the arrangement or function of the several elements is not essential, it should be explained that we employ control and indication codes of eight elements each, which are apportioned as follows:

CONTROL CODE

| Elements | Character | Functions |
| --- | --- | --- |
| 1st | Always "Z" | Line check. |
| 2nd | X, Y, or Z | Station selection. |
| 3rd | X, Y, or Z | Do. |
| 4th | X, Y, or Z | Do. |
| 5th | X or Y | "Call-on" control. |
| 6th | X or Y | Switch controls. |
| 7th | X, Y, or Z | Signal controls. |
| 8th | X, Y, or Z | Station selection and delivery. |

INDICATION CODE

| Elements | Character | Functions |
| --- | --- | --- |
| 1st | X or Y | Line check and approach indication. |
| 2nd | X, Y, or Z | Station selection. |
| 3rd | X, Y, or Z | Do. |
| 4th | X, Y, or Z | Do. |
| 5th | X or Y | Track indication. |
| 6th | X, Y, or Z | Switch indications. |
| 7th | X, Y, or Z | Signal indications. |
| 8th | X, Y, or Z | Station selection and delivery. |

Current for operating the relays (except the line relays) and associated apparatus is supplied from local sources at each station but for the sake of simplicity we have illustrated the circuits diagrammatically, showing only terminals B and C of sources of energy not shown in the drawings.

In explaining the operation of the apparatus, we will first assume that all parts occupy the positions shown in the drawings, and that the operator wishes to clear signal IRA and the call-on signal IRC at the station. In order to accomplish this result he reverses the call-on button, swings the signal lever to the "R" position and operates the starting button on the corresponding control panel at the office. We will assume that this is the control panel having its circuits shown complete in the drawings. The operation of the starting button initiates the operation of the office equipment to send out a control code. The resulting code, as will appear more fully below may be represented as "ZXZYYXYX" and we will now describe the step-by-step operation of the apparatus during transmission of this code.

CONTROL CODE

1ST STEP—"Z"

*Starting button operated (Fig. 6)*

OFFICE RELAYS

Relay OSA(81) pick-up circuit is closed from terminal B, through contact of "Knock-Down" Button in normal position, winding of relay OSA(81), front contact of panel starting button to terminal C. The initial stick circuit connects from coil of relay OSA(81), through front contact C3 of relay OSA(81), and back contact B1 of relay OSB(81) to terminal C. The stick circuit during code action is described under relay OSB operation.

Relay OTZ (Fig. 1) becomes energized, its pick-up circuit passing from terminal B, through front contact A3 of relay ORY, front contact A3 of relay ORX, #1 terminal connection between line and coding units, back contact A3 of relay OLO, back contact D5 of relay OLOS, front contact A5 of relay OLC, #19 terminal connection between coding and storage units, front contact A3 of relay OSA(81), thence over "Z" bus connection on the relay OSB, and "Z" terminal connection between storage and coding units to line unit, through coil of relay OTZ, #5 terminal connection between line and coding unit, front contact B4 of relay OLC, back contact A2 of relay OLOS to terminal C. The stick circuit connects from coil of relay OTZ, through front contact A3 of relay OTZ, and #4 terminal connection between line and coding units, over back contact C1 of relay OLOS to terminal C. The energization of relay OTZ interrupts both line circuits and starts the first element of the code which is a Z element.

Relays ORX and ORY both release due to both line circuits being broken by back contact B1 of relay OTZ.

Relays OLO and OSB(81) receive energy simultaneously. Relay OLO receives energy from terminal B, through back contact A3 of relay ORY, back contact C3 of relay ORY, #2 terminal connection between line and coding units, direct through coil of relay OLO to terminal C. Relay OSB(81) receives energy from terminal B, through back contact A3 of relay ORY, back contact C3 of relay ORX, front contact C3 of relay OTZ, #12 terminal connection between line and coding units, back contact A4 of relay OLOS, back contact B1 of relay OM, #20 terminal connection between coding and storage units, back contacts A5 of all OSA relays in advance of the one picked up, front contact A5 of the relay OSA(81) that is picked up, through coil of relay OSB(81), and back contact of panel starting button, to terminal C. The stick circuit is described in connection with relay OM below. The relay OSB(81) in picking up transfers the stick circuit of the relay OSA(81) previously described from back contact B1 of relay OSB to front contact B1 of relay OSB, thence through the bus connections on the preceding OSB relays, through #22 terminal connection between storage and coding units, and back contact C2 of relay OR8 to terminal C for sticking the relay OSA(81) during code action.

Relays OT1 and OM pick up immediately after relays OLO and OSB(81) respectively. Relay OT1 receives energy from terminal B, through back contact A3 of relay ORY, back contact C3 of relay ORY, #2 terminal connection between line and coding units, back contact C1 of relay OLOS, front contact D3 of relay OLO, front contact B2 of relay OLC, back contact A2 of relay OR8, back contacts B1 of all the rest of the chain group, and coil of relay OT1 to terminal C. This pick-up circuit for the relay OT1 becomes the chain stick circuit when relay OLOS picks up. This circuit is described under relay OLOS below. The relay OM receives energy from the coil connection of the relay OSB that is now up, over front contact B5 of the same relay OSB, back contacts B5 of all previous relays OSB in the circuit, #21 terminal connection between storage and coding units, and the coil of relay OM to terminal C. Relay OM picking up cuts off energy from the pick-up circuit of relay OSB feeding through terminal connection #20 at back contact B1 of relay OM, and simultaneously completes a circuit from terminal B, through back contact B1 of relay OLOS, front contact C3 of relay OLC, and front contact C1 of relay OM to coil of relay OM, and thence through terminal connection #21 between coding and storage units and coil of relay OSB to terminal C for sticking both relays OM and OSB until the relay OLOS picks up. Another stick circuit is described further under relay OLOS.

Relay OLOS next picks up by a circuit from terminal B, through back contact A3 of relay ORY, back contact C3 of relay ORX, front contact C3 of relay OTZ, #12 terminal connection between line and coding units, back contact D5 of relay OT2, front contact C4 of relay OT1, front contact D3 of relay OM, and coil of relay OLOS to terminal C. Relay OLOS picking up completes its own stick circuit from terminal B, through front contact C5 of relay OLO, front contact D3 of relay OLOS, and coil of relay OLOS to terminal C. The relay OLOS in picking up transfers the stick circuit for the relays OM and OSB, described above, from back contact B1 of relay OLOS to front contact B1 of relay OLOS, through front contact B4 of relay OLO to terminal B. The relay OLOS in picking up also changes the energizing circuit for the relay OT1 from a pick-up circuit over the back contact C1 of relay OLOS, described above, to a stick circuit for all the chain relays over the front contact C1 of relay OLOS.

Relay OTZ releases due to its circuit having been broken at back contact A2 of relay OLOS, which is now picked up.

*Relays ORX and ORY.*—The line circuit at the office is now closed by back contact B1 of relay OTZ being made, and the line relays at the office and at each station pick up as soon as the line circuits throughout the entire territory become closed, thus terminating the first element of the code.

STATION RELAYS

*Relays RX and RY (Fig. 10).*—Since all line relays of each line circuit are connected in series, these relays release simultaneously with the relays ORX and ORY at the office, after the pickup of the relay OTZ for transmission of the first element of the control code.

*Relays LO and TZ.*—These relays receive energy simultaneously as follows: Relay LO receives energy from terminal B, through back contact A3 of relay RY, back contact C3 of relay RY, #2 terminal connection between line and coding units, and coil of relay LO to terminal C. Relay TZ receives energy from terminal B, through back contact A3 of relay RY, back contact C3 of relay RX, back contact A4 of relay M, coil of relay TZ, #5 terminal connection between line and coding units, front contact B2 of relay LC, and back contact A4 of relay LOS, to terminal C. It will be noted that relay TZ picking up opens both the "X" and "Y" line circuits at its back contact C1 and back contact B1, respectively. This action prevents the line circuits from closing fully and the code from progressing until the relay TZ has been released in the receiving station.

Relay T1 (Fig. 11) next receives energy from terminal B, through back contact A3 of relay RY, back contact of relay RX, #3 terminal connection between line and coding units, back contact C4 of relay M1, back contact B1 of relay LOS, front contact B2 of relay LO, front contact A3 of relay LC, back contact B1 of relay R8, the back contacts B1 of the relays of the chain group, and coil of relay T1 to terminal C. This pick-up circuit for the relay T1 becomes the chain stick circuit when relay LOS picks up. This circuit is described under relay LOS below.

Relay LOS (Fig. 10) receives energy from terminal B through back contact A3 of relay RY, back contact C3 of relay RX, front contact A3 of relay TZ, #9 terminal connection between line and coding units, back contact D5 of relay T2, front contact C2 of relay T1, and the coil of relay LOS to terminal C. Relay LOS on picking up completes its stick circuit from terminal B through front contact D3 of relay LOS, front contact D3 of relay LO, direct to the coil connection of relay LOS. The relay LOS in picking up changes the energizing circuit for the relay T1 from a pick-up circuit over the back contact B1 of relay LOS, described above, to a stick circuit for all the chain relays over the front contact B1 of relay LOS, back contact A4 of relay KD, and front contact C3 of relay LC to terminal B.

Relay TZ releases due to its circuit, previously traced, being opened at back contact A4 of relay LOS when the relay LOS picked up.

Line relays RX and RY pick up in synchronism with the corresponding line relays throughout the territory, due to the final line break having been closed by the release of the relay TZ.

SECOND STEP—"X"
OFFICE RELAYS

Relay OT2 (Fig. 1) receives energy from terminal B through front contact A3 of relay ORY, front contact A3 of relay ORX, #1 terminal connection between line and coding units, front contact A3 of relay OLO, front contact A5 of relay OT1, and the coil of relay OT2 to terminal C. It will be noted that relay OT2 on picking up simultaneously completes its own stick circuit from the back contacts B1 of the succeeding relays in the chain group, through its own front contact B1, direct to the coil connection.

*Relays OTX and OT1.*—When relay OT2 picked up, as described above, its contact B1, it will be noted, simultaneously made its own stick contact through the series chain circuit and opened the stick circuit holding relay OT1 energized. Accordingly, relay OT1 releases upon the breaking of back contact B1 of relay OT2. Relay OTX receives energy from terminal B through front contact D3 of relay OT2, #25 terminal connection between coding and storage units, the bus connections of relays OSB, front contact A3 of the relay OSB picked up, and the "X" terminal connection of the relay OSB, through the "X" bus connections to the line unit, the coil of relay OTX, #5 terminal connection between line and coding units, front contact B4 of relay OLC, front contact C2 of relay OT2, and back contact C2 of relay OR2 to terminal C. When relay OTX becomes energized, it opens line wire XL and initiates the second element of the control code.

Relay ORX releases due to the line circuit being open at back contact B1 of relay OTX.

Relay OSD(X) receives energy from terminal B through front contact A3 of relay ORY, back contact A3 of relay ORX, front contact A3 of relay OTX, #10 terminal connection between line and coding units, front contact B5 of relay OT2, #37 terminal connection between coding and storage units and coil of relay OSD(X) to terminal C. The stick circuit of relay OSD(X) receives energy from terminal B, through front contact B2 of relay OLO, #32 terminal connection between coding and storage units, front contact A3 of relay OSD(X), and the coil of this relay to terminal C. It will be noted that other OSD relays similar to relay OSD(X) would be provided in a complete system and controlled by contacts C4 and D5 of relay OT2 over terminal connections 38 and 39 between the coding and storage units in a manner similar to the control of relay OSD(X). These relays would be operated by codes having a second element consisting of a Y element or a Z element as will be readily understood from the foregoing.

Relay OR2 receives energy from the coil connection of relay OSD(X), through front contact A5 of this same relay, #33 terminal connection between storage and coding units, front contact A5 of relay OT2, and the coil of relay OR2, to terminal C. Relay OR2, in the same manner as relay OT2 and all of the rest of the chain group, makes its own stick circuit from the series connection through the succeeding relays of the chain groups, and simultaneously opens the stick circuit of the relay in the rear.

*Relays OTX and OT2.*—As mentioned above, the stick circuit of relay OT2 was opened by the back contact B1 of relay OR2 when relay OR2 picked up. Relay OTX is released due to its circuit, as traced above, being open at back contact C2 of relay OR2, which is now picked up.

Line relay ORX has one break in its circuit closed locally by back contact B1 of relay OTX. Relay ORX picks up as soon as the entire line circuit clears, thereby terminating the second element of the code.

STATION RELAYS

Relay T2 (Fig. 11) receives energy from terminal B, through front contact A3 of relay RY, front contact A3 of relay RX, #1 terminal connection between line and coding units, back contact C4 of relay KD, front contact A3 of relay LO, front contact A5 of relay T1, and coil of relay T2 to terminal C. The stick circuit for relay T2 is made in the same manner as explained for relay OT2.

Relay T1 releases due to its stick circuit being opened by back contact B1 of relay T2 when relay T2 picks up.

Line relay RX releases due to the opening of back contact B1 of relay OTX at the office to transmit the second code element.

Relay TX receives energy from terminal B, through front contact A3 of relay RY, back contact A3 of relay RX, back contact D2 of relay M, coil of relay TX, #5 terminal connection between line and coding units, front contact B2 of relay LC, front contact C2 of relay T2, and back contact C2 of relay R2 to terminal C.

Relay R2 receives energy from terminal B, through front contact A3 of relay RY, back contact A3 of relay RX, front contact C3 of relay TX, #7 terminal connection between line and coding units, front contact B5 of relay T2, #39 terminal connection which will be connected externally direct to #33 terminal for progression on an "X" character, through the coil of relay R2 to terminal C. Relay R2 makes its stick circuit in the usual manner.

*Relays TX and T2.*—Relay T2 is released due to its stick circuit having been opened in the usual manner by relay R2 picking up. Relay TX releases due to its circuit, as traced above, being opened at back contact C2 of relay R2 upon picking up relay R2.

*Relay RX.*—The line circuit of relay RX is closed at the field station by relay TX dropping, and closing back contact B1 of relay TX. Relay RX then picks up in synchronism with the other line relays throughout the territory.

THIRD STEP—"Z"
OFFICE RELAYS

Relay OT3 (Fig. 1) receives energy from terminal B, through front contact A3 of relay ORY, through front contact A3 of relay ORX, #1 terminal connection between line and coding units, front contact A3 of relay OLO, front contact A5 of relay OR2, and the coil of relay OT3 to terminal C. The stick circuit for the relay OT3 is made in the usual manner.

*Relays OTZ and OR2.*—Energy is cut off from the stick circuit holding relay OR2 energized in the usual manner when relay OT3 picks up, and relay OR2 accordingly drops. Relay OTZ receives energy from terminal B, through front contact D3 of relay OT3, #26 terminal connection between coding and storage units, bus connections of relay OSB, front contact C4 of the relay OSB picked up, "Z" terminal connection on relay OSB, through "Z" interconnections to the line unit, coil circuit of relay OTZ, #5 terminal connection between line and coding units, front contact B4 of relay OLC, front contact C2 of relay OT3, and back contact C2 of relay OR3 to terminal C. The energization of relay OTZ starts the third element of the code by opening both line circuits.

Line relays ORX and ORY release due to both line circuits being opened at back contact B1 of relay OTZ when relay OTZ picked up.

Relay OSD(XZ) receives energy from terminal B, through back contact A3 of relay ORY, back contact C3 of relay ORX, front contact C3 of relay OTZ, #12 terminal connection between line and coding units, front contact D5 of relay OT3, #42 terminal connection between coding and storage units, front contact C3 of relay OSD(X) relay, and coil circuit of relay OSD(XZ) to terminal C. The stick circuit for relay OSD(XZ) receives energy in the usual manner, through front contact B2 of relay OLO, through #32 terminal connection between coding and storage units, through front contact A3 of relay OSD(XZ) to the coil connection.

Relay OR3 receives energy from the coil connection of relay OSD(XZ), through front contact A5 of this same relay, through terminal connection #34 between units, through front contact A5 of relay OT3, through coil circuit of relay OR3 to common. The stick circuit is made in the usual manner.

*Relays OTZ and OT3.*—Stick energy is cut off and relay OT3 dropped in the usual manner by the pick-up of relay OR3. Relay OTZ releases due to its circuit being opened by back contact C2 of relay OR3 when relay OR3 picked up.

Line relays ORX and ORY now have their circuits closed locally through back contact B1 of relay OTZ, and will pick up as soon as both line circuits become fully closed, thereby terminating the third code element.

STATION RELAYS

Relay T3 (Fig. 11) receives energy from terminal B, through front contact A3 of relay RY, front contact A3 of relay RX, #1 terminal connection between line and coding units, back contact C4 of relay KD, front contact A3 of relay LO, front contact A5 of relay R2, and coil of relay T3 to terminal C. The T3 relay stick circuit functions in the usual manner.

Relay R2 also releases in the usual manner, due to relay T3 cutting off its stick circuit.

Line relays RX and RY release due to both line circuits being opened at the office.

Relay TZ receives energy from terminal B, through back contact A3 of relay RY, back contact C3 of relay RX, back contact A4 of relay M, coil of relay TZ, #5 terminal connection between line and coding units, front contact B2 of relay LC, front contact D3 of relay T3, and back contact C2 of relay R3 to terminal C.

Relay R3 receives energy from terminal B, through back contact A3 of relay RY, back contact C3 of relay RX, front contact A3 of relay TZ, #9 terminal connection between line and coding units, front contact D5 of relay T3, #52 terminal connection to external circuit, which for progression on a "Z" impulse, is directly connected to #34 terminal connection, and the coil of relay R3 to terminal C. Stick circuit for this relay is made in the usual manner.

*Relays TZ and T3.*—Relay T3 is released in the usual manner, due to its stick circuit having been opened by the pick-up of relay R3. Relay TZ is released due to its circuit, traced above, being opened at back contact C2 of relay R3 when relay R3 picked up.

Line relays RX and RY now have their circuits closed locally at back contact C1, and back contact B1 of relay TZ. Accordingly, the line relays will pick up as soon as the corresponding line circuits become fully closed.

FOURTH STEP—"Y"
OFFICE RELAYS

Relay OT4 (Fig. 2) receives energy from terminal B, through front contact A3 of relay ORY, front contact A3 of relay ORX, #1 terminal connection between line and coding units, front contact A3 of relay OLO, front contact A5 of relay OR3, and coil of relay OT4 to terminal C. The stick circuit of relay OT4 is made in the usual manner through its own front contact B1.

*Relays OTY and OR3.*—Stick energy is cut off and relay OR3 relased in the usual manner by relay OT4 picking up. Relay OTY receives energy from terminal B, through front contact D3 of relay OT4, #27 terminal conection between coding and storage units, bus conection of relays OSB, front contact D4 of the relay OSB picked up, "Y" code setting connection on relay OSB, "Y" interconnections to line units, thence through coil of relay OTY, #5 terminal connection between line and coding units, front contact B4 of relay OLC, front contact C2 of relay OT4, and back contact C2 of relay OR4 to terminal C. This operation of relay OTY starts the fourth code element.

Line relay ORY releases due to its circuit being opened at back contact B1 of relay OTY.

Relay OSD (XZY) receives energy from terminal B, through back contact A3 of relay ORY, front contact C3 of relay ORX, front contact A3 of relay OTY, #11 terminal connection between line and coding units, front contact C4 of relay OT4, #44 terminal connection between coding and storage units, front contact B4 of relay OSD(XZ), through coil of relay OSD(XZY) to terminal C. Stick circuit is provided through the usual channel from terminal B, over front contact B2 of relay OLO, #32 terminal connection between coding and storage units, and front contact A3 of relay OSD(XZY) to the relay coil connection, and thence to terminal C.

Relay OR4 receives energy from the coil connection of relay OSD(XZY), through front contact A5 of relay OSD(XZY), #35 terminal connection between storage and coding units, front contact A5 of relay OT4, and the coil of relay OR4 to terminal C. Stick circuit is made in the usual manner.

*Relays OTY and OT4.*—The stick circuit of relay OT4 is opened and the relay released in the usual manner by relay OR4 picking up. The circuit for relay OTY, traced above, is opened at back contact C2 of relay OR4 and relay OTY is thereby released, when relay OR4 picked up.

Line relay ORY now has its circuit closed through the office unit because back contact B1 of relay OTY was closed upon relay OTY releasing. Accordingly, relay ORY picks up as soon as external line conditions permit, thereby terminating the fourth element of the code.

STATION RELAYS

Relay T4 (Fig. 11) receives energy from terminal B, through front contact A3 of relay RY, front contact A3 of relay RX, #1 terminal connection between line and coding units, back contact C4 of relay KD, front contact A3 of relay LO, front contact A5 of relay R3, and the coil of relay T4 to terminal C. Stick circuit is made in the usual manner.

Relay R3 releases in the usual manner by having its stick circuit opened at back contact B1 of relay T4 upon relay T4 picking up.

Line relay RY releases because its circuit was opened when the code element was transmitted from the office.

Relay TY receives energy from terminal B, through back contact A3 of relay RY, front contact C3 of relay RX, back contact A2 of relay M, coil of relay TY, #5 terminal connection between line and coding units, front contact B2 of relay LC, front contact D3 of relay T4, and back contact C2 of relay R4 to terminal C.

Relay SD (Y) receives energy from terminal B, through back contact A3 of relay RY, front contact C3 of relay RX, front contact C3 of relay TY, #8 terminal connection between line and coding units, front contact C4 of relay T4, coil circuit of relay SD(Y) to terminal C. The stick circuit for relay SD receives energy from terminal B through front contact B4 of relay LO, front contact A3 of relay SD(Y) to its coil connection. An auxiliary stick circuit, described under relay D below, is provided for this relay.

Relay R4 receives energy from the stick circuit traced above for relay SD(Y), through front contact A5 of relay SD(Y), front contact C2 of relay T4, and the coil of relay R4 to terminal C. Stick circuit is made as usual.

*Relays TY and T4.*—Stick circuit is cut off and relay T4 is opened in the usual manner by relay R4 picking up. The circuit for relay TY traced above, is opened at back contact C2 of relay R4 just picked up, and relay TY opens.

Line relay RY now has its circuit completed through the field location by relay TY releasing and closing its back contact B1. Accordingly, relay RY picks up in synchronism with the rest of the line relays RY as soon as line conditions permit.

FIFTH STEP—"Y"

OFFICE RELAYS

Relay OT5 (Fig. 2) receives energy from terminal B, through front contact A3 of relay ORY, front contact A3 of relay ORX, #1 terminal connection between line and coding units, front contact A3 of relay OLO, front contact A5 of relay OR4, and the coil of relay OT5 to terminal C. Relay OT5, upon picking up, makes it own stick circuit in the usual manner.

*Relays OTY and OR4.*—The stick circuit for relay OR4 is opened and the relay is released in the usual manner by the pick-up of relay OT5. Relay OTY receives energy from terminal B, through front contact D3 of relay OT5, #28 terminal connection between coding and storage units, through bus connections of the relays OSB, and front contact C2 of the relay OSB picked up, the lower contact of the "call-on" push button of the panel associated with the relay OSB in action, through the "Y" bus interconnections to line unit, and the coil of relay OTY, #5 terminal connection between line and coding units, front contact B4 of relay OLC, front contact C2 of relay OT5, and back contact C2 of relay OR5 to terminal C. When relay OTY closes, the consequent opening of the line circuit through wire YL starts the fifth code element.

Line relay ORY releases due to relay OTY picking up, and opening the line circuit at its back contact B1.

Relay OR5 receives energy from terminal B, through back contact A3 of relay ORY, front contact C3 of relay ORX, front contact A3 of relay OTY, #11 terminal connection between line and coding units, front contact C4 of relay OT5, and coil of relay OR5 to terminal C. The stick circuit for relay OR5 is made through its front contact B1 upon picking up in the usual manner.

*Relays OTY and OT5.*—Energy is cut off from the stick circuit and relay OT5 released in the usual manner by relay OR5 picking up. The circuit for relay OTY is broken at back contact C2 of relay OR5, and relay OTY is released upon relay OR5 picking up.

Line relay ORY has its circuit through the office units closed by back contact B1 of relay OTY closing when relay OTY released. Accordingly, relay ORY is ready to pick up as soon as the entire line circuit clears at the termination of the fifth element of the code.

STATION RELAYS

Relay T5 (Fig. 11) receives energy from terminal B, through front contact A3 of relay RY, front contact A3 of relay RX, #1 terminal connection between line and coding units, back contact C4 of relay KD, front contact A3 of relay LO, front contact A5 of relay R4, and the coil of relay T5 to terminal C. The stick circuit is made in the usual manner upon picking up, through its own front contact B1.

Relay R4 has its stick circuit cut off in the usual manner by relay T5 picking up, and accordingly releases.

Line relay RY releases due to the fifth code element transmitted over the line circuit from the office.

Relay TY receives energy from terminal B, through back contact A3 of relay RY, front contact C3 of relay RX, back contact A2 of relay M, coil of relay TY, #5 terminal connection between line and coding units, front contact B2 of relay LC, front contact D3 of relay T5, and back contact C2 of relay R5 to terminal C.

Relay 5Y receives energy from terminal B, through back contact A3 of relay RY, front contact C3 of relay RX, front contact C3 of relay TY, #8 terminal connection between line and coding units, front contact C4 of relay T5, and coil of relay 5Y to terminal C. The stick circuit for this relay passes from terminal B, through front contact B4 of relay LO, front contact A3 of relay 5Y to coil of the relay and thence to terminal C. An auxiliary stick circuit, described under relay D below, is provided for this relay.

Relay R5 receives energy from the stick circuit of relay 5Y, through front contact A5 of relay 5Y, front contact C2 of relay T5, and the coil circuit of relay R5 to terminal C. The stick circuit is made in the usual manner through its own front contact B1 upon picking up.

*Relays TY and T5.*—Energy is cut off from the stick circuit and relay T5 released in the usual manner by relay R5 picking up. Relay TY is released due to its circuit, traced above, being opened at the back contact C2 of relay R5 upon relay R5 picking up.

The circuit for line relay RY is now closed locally through back contact B1 of relay TY released. Accordingly, relay RY picks up as soon as the entire line circuit is clear.

SIXTH STEP—"X"

OFFICE RELAYS

Relay OT6 (Fig. 2) receives energy from terminal B, through front contact A3 of relay ORY, front contact A3 of relay ORX, #1 terminal connection between line and coding units, front contact A3 of relay OLO, front contact A5 of relay OR5, and coil of relay OT6 to terminal C. The stick circuit for relay OT6 is made in the usual manner through its own front contact B1.

*Relays OTX and OR5.*—Energy is cut off from the stick circuit and relay OR5 released in the usual manner by relay OT6 picking up. Relay OTX receives energy from terminal B, through front contact D3 of relay OT6, #29 terminal connection between coding and storage units, bus connections of relays OSB, front contact D2 of the relay OSB now picked up, front contact C2 of switch lever of the particular panel associated with the relay OSB in action, "X" bus connections to line unit, the coil of relay OTX, #5 terminal connection between line and coding units, front contact B4 of relay OLC, front contact C2 of relay OT6, and back contact C2 of relay OR6 to terminal C. The opening of line wire XL by closing relay OTX initiates the sixth element of the code.

Line relay ORX releases due to its circuit being opened at back contact B1 of relay OTX upon the pick-up of relay OTX.

Relay O6X (Fig. 4) receives energy from terminal B, through front contact A3 of relay ORY, back contact A3 of relay ORX, front contact A3 of relay OTX, #10 terminal connection between line and coding units, front contact B5 of relay OT6, and coil of relay O6X to terminal C. The stick circuit for relay O6X receives energy through the front contact B2 of relay OLO, and its own front contact A3.

Relay OR6 receives energy from the stick circuit of relay O6X, through front contact A5 of relay O6X, front contact A5 of relay OT6, and coil of relay OR6 to terminal C. The stick circuit is made in the usual manner, through its own front contact B1.

*Relays OTX and OT6.*—Energy is cut off the stick circuit and relay OT6 released in the usual manner by relay OR6 picking up. The circuit of relay OTX, traced above, is broken at back contact C2 of relay OR6 and relay OTX accordingly releases.

Line relay ORX has its circuit completed locally through back contact B1 of relay OTX due to relay OTX releasing, and picks up as soon as the entire line circuit is completed at the conclusion of the sixth code element.

STATION RELAYS

Relay T6 (Fig. 12) receives energy from terminal B, through front contact A3 of relay RY, front contact A3 of relay RX, #1 terminal connection between line and coding units, back contact C4 of relay KD, front contact A3 of relay LO, front contact A5 of relay R5, and coil of relay T6 to terminal C. The stick circuit for relay T6 is made in the usual manner through its own front contact B1.

Relay R5 releases due to its stick circuit being cut off in the usual manner by relay T6 picking up.

Line relay RX releases in response to the sixth element of the code transmitted from the office.

Relay TX receives energy from terminal B, through front contact A3 of relay RY, back contact A3 of relay RX, back contact D2 of relay M, coil of relay TX, #5 terminal connection between line and coding units, front contact B2 of relay LC, front contact D3 of relay T6, and back contact C2 of relay R6 to terminal C.

Relay 6X receives energy from terminal B, through front contact A3 of relay RY, back contact A3 of relay RX, front contact C3 of relay TX, #7 terminal connection between line and coding units, front contact B5 of relay T6, coil circuit of relay 6X to terminal C. The stick circuit receives energy from terminal B, through front contact B4 of relay LO, and front contact A3 of relay 6X to the coil circuit. An auxiliary stick circuit, described under relay D below, is also provided for relay 6X.

Relay R6 receives energy from the stick circuit of relay 6X, through front contact A5 of relay 6X, front contact C2 of relay T6, the coil of relay R6 to terminal C. The stick circuit is made in the usual manner through its own front contact B1.

*Relays TX and T6.*—The stick circuit of relay T6 is cut off and the relay released in the usual manner by relay R6 picking up. The circuit for relay TX, traced above, is opened at back contact C2 of relay R6 when relay R6 picked up and relay TX accordingly released.

The circuit for line relay RX was completed locally through back contact B1 of relay TX when relay TX released, and relay RX accordingly picks up upon the closing of the entire line circuit.

SEVENTH STEP—"Y"

OFFICE RELAYS

Relay OT7 (Fig. 2) receives energy from terminal B, through front contact A3 of relay ORY, front contact A3 of relay ORX, #1 terminal connection between line and coding units, front contact A3 of relay OLO, front contact A5 of relay OR6, and coil of relay OT7 to terminal C. The stick circuit of this relay is made in the usual manner, through its own front contact B1.

*Relays OTY and OR6.*—Energy is cut off the stick circuit and relay OR6 released in the usual manner by relay OT7 picking up. Relay OTY receives energy from terminal B, through front contact D3 of relay OT7, #30 terminal connection between coding and storage units, bus connections of relays OSB, front contact E2 of the relay OSB in action, front contact A2 of the signal lever of the particular panel associated with the relay OSB in operation, the "Y" bus interconnection to the line unit, the coil circuit of relay OTY, #5 terminal connection between line and coding units, front contact B4 of relay OLC, front contact C2 of relay OT7, and back contact C2 of relay OR7 to terminal C. The opening of line wire XL due to the closing of relay OTY initiates the seventh element of the code.

Line relay ORY is released due to its circuit being opened at back contact B1 of relay OTY, which just picked up.

Relay O7Y receives energy from terminal B, through back contact A3 of relay ORY, front contact C3 of relay ORX, front contact A3 of relay OTY, #11 terminal connection between line and coding units, front contact C4 of relay OT7, and the coil of relay O7Y to terminal C. The stick circuit receives energy through front contact B2 of relay OLO, and front contact A3 of relay O7Y to the coil circuit.

Relay OR7 receives energy from the stick circuit of relay O7Y, through front contact A5 of relay O7Y, front contact A5 of relay OT7, and the coil of relay OR7 to terminal C. Stick circuit is made in the usual way through its own front contact B1.

*Relays OTY and OT7.*—The stick circuit is cut off and relay OT7 released in the usual manner by relay OR7 picking up. The circuit for relay OTY, traced above, is opened at back contact C2 of relay OR7 and accordingly releases.

Line relay ORY has its circuit completed locally through back contact B1 of relay OTY released, and accordingly picks up as soon as the entire line circuit becomes closed, upon the completion of the seventh element of the code.

STATION RELAYS

Relay T7 (Fig. 12) receives energy from terminal B, through front contact A3 of relay RY, front contact A3 of relay RX, #1 terminal connection between line and coding units, back contact C4 of relay KD, front contact A3 of relay LO, front contact A5 of relay R6, and coil of relay T7 to terminal C. The stick circuit is made in the usual manner through its own front contact B1.

Relay R6 releases due to its stick circuit being cut off in the usual manner by relay T7 picking up.

Line relay RY releases due to the transmission of the seventh element of the code from the office.

Relay TY receives energy from terminal B, through back contact A3 of relay RY, front contact C3 of relay RX, back contact A2 of relay M, coil circuit of relay TY, #5 terminal connection between line and coding units, front contact B2 of relay LC, front contact D3 of relay T7, and back contact C2 of relay R7 to terminal C.

Relay 7Y receives energy from terminal B, through back contact A3 of relay RY, front contact C3 of relay RX, front contact C3 of relay TY, #8 terminal connection between line and coding units, front contact C4 of relay T7, and coil circuit of relay 7Y to terminal C. The stick circuit receives energy from terminal B, through front contact B4 of relay LO, and front contact A3 of relay 7Y to the coil circuit. An auxiliary stick circuit, described under relay D below, is provided for this relay.

Relay R7 receives energy from the stick circuit of relay 7Y, through front contact A5 of relay 7Y, front contact C2 of relay T7, and the coil of relay R7 to terminal C. The stick circuit is made in the usual manner through its own front contact B1.

*Relays TY and T7.*—Energy is cut off from the stick circuit and relay T7 released in the usual manner by relay R7 picking up. The circuit for relay TY, traced above, is opened at back contact C2 of relay R7 and accordingly releases.

Line relay RY now has its circuit closed locally through back contact B1 of relay TY released and accordingly picks up as soon as the entire line circuit becomes closed.

EIGHTH STEP—"X"

OFFICE RELAYS

Relay OT8 (Fig. 2) receives energy from terminal B, through front contact A3 of relay ORY, front contact A3 of relay ORX, #1 terminal connection between line and coding units, front contact A3 of relay OLO, front contact A5 of relay OR7, and the coil of relay OT8 to terminal C. The stick circuit is made in the usual manner through its own front contact B1.

*Relays OTX and OR7.*—Energy is cut off from the stick circuit, and relay OR7 is released in the usual manner by the pick-up of relay OT8. Relay OTX receives energy from terminal B, through front contact A5 of relay OT8, #31 terminal connection between coding and storage units, bus connection of relays OSB, front contact E4 of relay OSB in operation, the permanent code setting connection to "X" terminal bus on relay OSB in question, "X" bus connection to line unit, coil of relay OTX, #5 terminal connection between line and coding units, front contact B4 of relay OLC, front contact D3 of relay OT8, and back contact C4 of relay OR8 to terminal C. The opening of the line wire XL by operation of relay OTX starts the eighth element of the code.

Line relay ORX releases, due to its circuit being opened at back contact B1 of relay OTX picked up.

Relay OR8 receives energy from terminal B, through front contact A3 of relay ORY, back contact A3 of relay ORX, front contact A3 of relay OTX, #10 terminal connection between line and coding units, front contact B5 of relay OT8, #46 terminal connection between coding and storage units, front contact B2 of relay OSD(XZY), front contact A5 of relay OSB in operation, bus connection of preceding relays OSB, #36 terminal connection between storage and coding units, coil of relay OR8 to terminal C. A stick circuit is provided in the usual manner for relay OR8 through its own front contact A2.

Relays OTX, OT8, OSA, NWK and RGK all release when relay OR8 picks up as follows: The circuit for relay OTX is broken by back contact C4 of relay OR8. The stick circuit is deenergized and relay OT8 releases in the usual manner by the picking up of relay OR8. Relay OSA is released due to its stick circuit previously described being opened by back contact C2 of relay OR8. Relays NWK and RGK have their circuit broken by back contact B4 of relay OR8, the previously existing circuit for these relays passing from terminal B, over back contact B4 of relay OR8, #51 terminal connection between coding and storage units, relay OSB bus connections, front contact F2 of relay OSB in operation, through front contacts A3 of all switch or signal stick indication relays that are energized (in this case relays NWK and RGK), thence through back contact A5 of relay OD1 and back contact D5 of relay OD, respectively, and the coil circuits of relays NWK and RGK to terminal C.

Line relay ORX has its circuit completed locally through back contact B1 of relay OTX released, and will accordingly pick up as soon as the entire line circuit becomes closed, upon the termination of the eighth code element.

STATION RELAYS

Relay T8 (Fig. 12) receives energy from terminal B, through front contact A3 of relay RY, front contact A3 of relay RX, #1 terminal connection between line and coding units, back contact C4 of relay KD, front contact A3 of relay LO, front contact A5 of relay R7, and coil of relay T8 to terminal C. The stick circuit of relay T8 is made in the usual manner through its own front contact B1.

Relay R7 releases due to its stick circuit being cut off in the usual manner by relay T8 picking up.

Line relay RX releases in response to the eighth element of the control code transmitted from the office.

Relay TX receives energy from terminal B, through front contact A3 of relay RY, back contact A3 of relay RX, back contact D2 of relay M, coil of relay TX, #5 terminal connection between line and coding units, front contact B2 of relay LC, front contact D3 of relay T8, and back contact C4 of relay R8 to terminal C.

Relay D receives current over a circuit from terminal B, through front contact A3 of relay RY, back contact A3 of relay RX, front contact C3 of relay TX, #7 terminal connection between line and coding units, front contact B5 of relay T8, front contact C3 of relay SD(Y), #43 terminal connection of the coding unit to storage unit having its #7 terminal connected to #43 coding unit terminal for code setting, thence through back contact D4 of relay SB, back contact A5 of relay EV, and coil of relay D to terminal C. A stick circuit is provided for relay D when relay R8 picks up, as described under relay R8 below. The relay D picking up provides an auxiliary circuit for the relays 5D, 5Y, 6X and 7Y from terminal B, over front contact D5 of relay D, #30 terminal connection between storage and coding units, the front contacts A3 of the respective relays to the several relay coils.

Relays R8, 5YS, 6XS and 7YS next pick up, as follows: Relay R8 receives energy from the coil connection of relay D, through front contact B5 of relay D, #24 terminal connection between storage and coding units, and coil of relay R8 to terminal C. Relay R8 provides its stick circuit through its own front contact B1 in the usual manner, and also provides a stick circuit for relay D from front contact B1 of relay R8, through terminal connection #24 between coding and storage units, front contact B5 of the relay D, and coil of relay D, to terminal C. Relay 5YS receives current from terminal B, through front contact C3 of relay 5Y, #20 terminal connection between coding and storage units, front contact A2 of relay D, and coil of relay 5YS to terminal C. Stick circuit for relay 5YS is described under relay D below. Relay 6XS receives energy from terminal B, through front contact C3 of relay 6X, #26 terminal connection between coding and storage units, front contact B1 of relay D, back contact C4 of relay 6YS, and coil of relay 6XS, #50 terminal connection to external circuits and thence through contact 112 of thermal relay h1 to terminal C. A normal stick circuit for relay 6XS is described under relay D below. Relay 7YS receives energy from terminal B, through front contact C3 of relay 7Y, #29 terminal connection between coding and storage units, front contact E2 of relay D, back contact C4 of relay 7XS, coil of relay 7YS, #53 terminal connection to terminal C. A normal stick circuit for relay 7YS is described under relay D below.

*Relays TX and T8.*—The stick circuit is broken and relay T8 released in the usual manner due to relay R8 picking up. The circuit for relay TX, traced above, is broken at back contact C4 of relay R8, and relay TX accordingly releases.

Line relay RX has its circuit complete locally through back contact B1 of relay TX released, and accordingly picks up as soon as the entire line circuit becomes closed.

The control code now being completed, it is necessary to restore the code system to its normal conditions, and to set up stick circuits for maintaining the control functions which have been delivered to the selected storage unit at the selected station. We will now explain how this is performed.

*Station release*
(FIGS. 1–8, INCLUSIVE)
OFFICE RELAYS

The circuit for relay OLO is opened when back contact A3 of relay ORX opens upon the completion of the last element of the code, and since relay OLO is a slow release relay, it releases at the end of its time element.

Relays OM, OSB, OR8, all OSD relays, and relays O6X and O7Y release as follows: The stick circuit of relays OM and OSB is broken at front contact B4 of relay OLO released. Accordingly, the relays OM and OSB release simultaneously. The relay OR8 which was held energized over the chain relay stick circuit previously described, releases at this time due to the relay OLO releasing and breaking the chain stick circuit at its front contact D3. The three relays OSD and the intermediate relays O6X and O7Y, release due to their stick circuits being broken by the front contact B2 of relay OLO released.

Relay OLOS has its stick circuit broken at front contact C5 of relay OLO upon relay OLO releasing. The relay OLOS, a slow release relay, releases at the end of its time element.

(FIGS. 10–14, INCLUSIVE)
STATION RELAYS

*Relays LO and EV.*—Relay EV receives energy upon the restoration of the line circuits to their normal closed condition, current flowing from terminal B, through front contact A3 of relay RY, front contact A3 of relay RX, #1 terminal connection between line and coding units, back contact C4 of relay KD, front contact A3 of relay LO, front contact C3 of relay R8, #23 terminal connection between coding and storage units, front contact C5 of relay D of the storage unit selected, coil of relay EV, and back contact C3 of relay SA to terminal C. Relay EV, upon picking up, completes a stick circuit through its own front contact C3. Relay LO has its circuit opened, when relay RX becomes energized, at back contact A3 of relay RX. Relay LO, being a slow release relay, releases at the end of its time element.

*Relays D and R8.*—The stick circuit for relays D and R8 includes front contact B2 of relay LO. Accordingly, the relays D and R8 release, when relay LO opens as explained above. On the release of the relay D, stick circuits are completed for the relays 5YS, 6XS and 7YS as follows: The stick circuit for relay 5YS receives energy from terminal B, over the front contact A3 of relay 5YS, through back contact A2 of relay D, and coil of relay 5YS to terminal C. Energy for the normal relay 6XS stick circuit is provided externally through terminal B, connection #44, a resistor 113, front contact B2 of relay 6XS, back contact B1 of relay D, back contact C4 of relay 6YS and coil of relay 6XS to terminal C. Energy for the normal relay 7YS stick circuit originates with terminal B and passes through various external signal circuits, depending upon conditions desired, and described in detail hereinafter, through terminal connection #46, a resistor 114, front contact B2 of relay 7YS, back contact E2 of relay D, back contact C4 of relay 7XS, and coil of relay 7YS to terminal C.

Relays SD, 5Y, 6X and 7Y all release due to their common stick circuit being broken at front contact D5 of relay D.

Relay LOS has its stick circuit broken at front contact D3 of relay LO. Accordingly, relay LOS being a slow acting relay releases at the end of its time element.

It will be noted that during the transmission of the control code just described, certain of the code elements selected a storage unit at a particular field station, in accordance with the particular characters of these elements and the sequence in which they were received. Certain other elements in the code were effective to control all of the apparatus of a selected storage unit at the selected station in accordance with the condition of the switch lever, signal lever, and call-on button on the panel at which the control code originated.

Referring particularly to the apparatus of the selected storage unit, it will be remembered that relay 5YS (Fig. 13) was energized by the control code and this relay is stuck up after the completion of the code. Current therefore flows from terminal B, through terminal connection #40 on the storage unit, front contact C3 of relay 5YS and the coil of relay 1CH to terminal C. Relay 1CH is therefore energized, and completes, over front contact 115 thereof, the operating circuit for the call-on signal 1RC, which signal then indicates proceed. Had the call-on button occupied its normal position at the panel where the control code originated the fifth element of the code would have been an "X" element and the code would not have energized relay 5YS at the station. In this event the relay 1CH would be deenergized and signal 1RC would indicate stop.

During the sixth element of the code, relay 6XS was energized and the relay remains energized after the completion of the code, but since relay 1WR (Fig. 14) controlling the switch 103 at the station was already energized in its normal position, this operation produced no change in the condition of the switch.

If the switch control lever is reversed on the office panel at which the control code originates, the sixth element of the code will consist of a "Y" element, and under these conditions, relay 6YS at the corresponding station will be picked up by the code and will be subsequently stuck up over circuits similar to those previously described in connection with relay 6XS. When relay 6YS is energized, and relay 6XS is deenergized, a circuit is completed for the switch control relay 1WR which passes from terminal B, through terminal #55 of the storage unit, front contact 95 of relay 6YS, back contact B4 of relay 6XS, terminal #57 of the storage unit, coil of relay 1WR, front contact 128 of relay 1TR, front contact 127 of the locking relay 1S, terminal #56 of the storage unit, back contact A5 of relay 6XS, front contact B4 of relay 6YS and terminal #36 of the storage unit to terminal C. Current supplied over the circuit just traced energizes relay 1WR in its normal direction, thereby completing a pick-up circuit for the reverse switch contactor 1RW, from terminal B, over front contact 129 and normal contact 130 of relay 1WR, contact 106 operated by the switch 103, coil of contactor 1RW and normal contact 131 and front contact 132 of relay 1WR to terminal C. When the contactor 1RW becomes energized, the switch operating motor 1m is energized by current which flows from terminal B, over front contact 133 of contactor 1RW, armature 110 of motor 1m, front contact 134 of contactor 1RW, heating element 111 of the reverse thermal relay h2 and field 109 of motor 1m to terminal C. The switch motor 1m is therefore operated to move the switch 103 to its reverse position. When the switch attains its full reverse position, contact 106 opens and contactor 1RW becomes deenergized, thereby discontinuing the supply of current to the motor 1m.

If now a control code is received at the station with a sixth element consisting of an "X", the relay 6XS becomes energized and relay 1WR again becomes energized in the normal direction, picking up contactor 1NW and operating motor 1m in the reverse direction to restore the switch 103 to its normal position. When the switch attains its normal position, the opening of contact 105 deenergizes contactor 1NW and discontinues the supply of current to motor 1m.

It should be noted that when either operating circuit for the switch motor 1m is closed, the heating element 111 of an appropriate one of the thermal relays *h1* or *h2* is included in the motor circuit. If for some reason the motor circuit is overloaded, or if the circuit is closed for longer than the predetermined time or which the relays are designed the corresponding contact 112 of the thermal relay opens. It will be remembered that the stick circuit for relay 6XS includes contact 112 of thermal relay *h1* which is operated to move the switch to its normal position, and the stick circuit for relay 6YS is controlled by the contact 112 of thermal relay *h2* which is associated with the circuit controlled by contactor IRW which serves to move the switch to its reverse position. It follows that the operation of either thermal relay *h1* or *h2* due to a motor overload, breaks the stick circuit for relay 6YS or 6XS and thereafter prevents operation of the switch motor until a new control code is sent from the office to pick up the appropriate relay.

In the main operating circuit for the switch control relay IWR, we insert a front contact 128 of the track relay ITR (Fig. 14) to prevent operation of the switch when section *b—d* is occupied by a train. Furthermore, front contact 127 of locking relay IS is inserted in this circuit to afford "approach locking" of the switch. Thus it will be seen that if a train enters any approach section leading into the main switch section *b—d* when a signal admitting traffic from such approach section to the main section is cleared, the locking relay IS will be deenergized, thereby breaking the circuit for the switch control relay IWR and preventing operation of the switch 103.

Since the seventh element of the code was a "Y" element, relay 7YS is now stuck up. When this relay became energized, the signal stick relay RHS was energized over a circuit which passed from terminal B, over terminal #55 of the storage unit, front contact A5 of relay 7YS, back contact B4 of relay 7XS, terminal #59 of the storage unit, back contact 116 of relay LHS, coil of relay RHS, front contact 117 of relay ITP, normal contact 118 of relay IKR, terminal #38 of the storage unit, front contact C3 of relay 6XS and terminal #60 of the storage unit to terminal C. Relay RHS therefore becomes energized, whereupon a branch is completed for the circuit just traced, from front contact 117 of relay ITP, through front contact 119 of relay RHS, direct to terminal C. When relay RHS is energized, the route relay IRH is energized, current flowing from terminal B, over front contact 120 of relay RHS and front contact 121 of relay ITR through the coil of relay IRH to terminal C. When relay IRH becomes energized, current flows from terminal B over front contact 122 of relay IRH and normal contact 123 of relay IKR through the coil of signal relay IRAH to terminal C. The consequent energization of relay IRAH completes, at front contact 124 thereof, the operating circuit for signal IRA which thereupon indicates proceed. It should be observed that had switch 103 occupied its reverse position, so that relay IKR occupied its reverse position, when relay IRH became energized, the signal relay IRBH would have been energized to clear signal IRB instead of the operation previously described. Signals ILB and ILA are controlled by signal relays ILAH and ILBH which are in turn controlled by the route relay ILH in a manner which will be apparent from the drawings without further explanation. It should be pointed out that the route relay ILH is controlled by the signal stick relay LHS in the same manner that route relay IRH is controlled by relay RHS. It follows that if the seventh element of a control code is an "X" element for picking up relay 7XS instead of relay 7YS, a westbound signal will be cleared at the selected station instead of the eastbound signal previously described.

With the circuits arranged as here shown, the cleared signal may be restored to stop manually or automatically. To restore the signal to stop manually, the operator sends a control code in which the seventh element is a "Z" element. In that case, relays 7Y and 7X both remain released, and on the last step, the energized stick relay 7YS or 7XS becomes released due to the opening of its stick circuit at contact E2 or D1 of relay D.

The signal circuits are also arranged so that when a signal is put to stop automatically by a train entering the first track section of a route, it remains at stop after this section is vacated and the signal can be restored to its proceed condition only by sending another control code having its seventh element a "Y" or an "X" element, as the case may be. This feature is known as "stick control" of the signals, and is provided by including the front contact 207 of the track relay ITR in the external connections to terminal B for the stick circuits of relays 7YS and 7XS. These stick circuits also include, in multiple with the front contact of the track relay, a back contact of another relay controlled by a front contact of the track relay, so that the interruption of the stick circuit, insofar as the external connections are concerned, is but momentary. This arrangement possesses the advantage in that it permits a signal clear code to be properly registered by relays 7YS and 7XS regardless of the condition of the track section *b—d*, consequently the operator may send a control code to set up a route for a second train as soon as he is apprised by his indication apparatus that a first train has entered its route, and traffic delays are thereby minimized. In its specific embodiment as shown, the stick circuits for relays 7YS and 7XS have two branches, one being closed when the track relay ITR is energized and the other being closed when the signal is in its most restrictive condition, the last mentioned branch including back contacts 205 and 206 of the route relays LH and RH, which relays are controlled by the signal stick relays LHS and RHS and by the track relay ITR, as required.

The reason for inserting the contact 118 of the switch indication relay IKR in the pick-up circuits of the signal stick relays LHS and RHS is to insure that the position of the switch corresponds with the positions of the relays code-controlled relays 6XS and 6YS which determine the switch position, before permitting a signal to be cleared. In the particular instance previously described, relays 6XS was energized, and under these conditions, the switch should occupy its normal position. If, however, for some reason the switch is unlocked or reversed so that normal contact 118 of relay IKR is open, the pick-up circuit for relay RHS previously described will be incomplete and it will be impossible to clear a signal at the selected station.

Assuming now that signal IRA indicates proceed, and that a train enters section *b—d*; relay ITR will release, deenergizing relays 7YS, IRH and ITP. Relay 7YS, upon releasing, will open its stick circuit at its contact B2, and so remains deenergized. Relays 7YS and ITP open contacts in the circuit for relay RHS which therefore releases. Relay IRH upon releasing deenergizes relay IRAH, which therefore releases, restoring signal IRA to the stop position. Relay 7YS maintains relay RHS deenergized after relay ITP picks up, and relay RHS maintains relay IRH deenergized after relay ITR picks up. Relay IRH, at its back contact 205 prepares a new stick circuit for relays 7YS and 7XS to render these relays responsive to the next control code, as already explained.

In order to control indication apparatus associated with the several panels in the office in accordance with the conditions at the corresponding field stations, means are provided for initiating indication codes at each field storage unit for transmission to the office. For this purpose, each field storage unit is provided with a starting relay SA provided with a plurality of starting circuits for registering changes in condition of any of the associated devices, and also with a code setting or change storing relay SB, as will be described in detail hereinafter. In response to the particular control code described in detail above, the movement of signal IRA to its proceed position initiates the return indication.

We shall now proceed to describe in step-by-step fashion the transmission of the indication code following the control code described hereinbefore.

*Indication code*

FIRST STEP—"X"

STATION RELAYS

Relay SA of the station storage unit associated with signal IRA receives energy over a circuit which becomes closed when relay IRH picks up, this circuit passing from terminal B, over front contact 124 of relay IRH, Fig. 14, terminal #48 of the storage unit, front contact C3 of relay 7V, coil of relay SA, back contact A5 of relay VC and back contact C3 of relay COR to terminal C. A stick circuit is completed for relay SA from terminal B, over front contact A3 of relay SA, direct to the coil connection as soon as the relay becomes energized. Subsequent interruptions in the starting circuit connecting with terminal connection #48 therefore do not affect the relay SA.

*Relays SB and EV.*—The relay SB receives energy over a series hunting circuit which includes the front contact A5 of relay SA of the same storage unit and in series therewith the back contact A5 of relay SA of each storage unit preceding the one functioning. As indicated in Figs. 12 and 13, this circuit is prepared by connecting terminal #10 of the coding unit to terminal #10 of the first storage unit and by connecting terminal #10 of each remaining storage unit to terminal #12 of the next preceding unit, terminals #10 and #12 of each storage unit being normally connected together over back contact A5 of relay SA as shown in Fig. 13. Assuming that relay SA of the last storage unit is energized the circuit for relay SB of that unit may be traced from terminal B, through front contact A3 of relay RY, front contact A3 of relay RX, #1 terminal connection between line and coding units, front contact A5 of relay LC, back contact A2 of relay LOS, back contact D4 of relay LO, back contact B1 of relay M1, #10 terminal connection of the coding unit, #10 terminal of the first storage unit, thence as described over back contact A5 of relay SA and #12 terminal of each storage unit in advance of the one functioning, to #10 terminal of that storage unit, thence over front contact A5 of relay SA, and the coil circuit of relay SB to terminal C. The relay EV, which was picked up at the end of the preceding control code, now releases due to its stick circuit being broken at back contact C3 of relay SA.

*Relays M and M1.*—These relays receive energy from a circuit which is a branch of the circuit for relay SB just described and which includes front contact A5 of relay SB of the storage unit that is functioning and in series therewith the back contact A5 of relay SB of each storage unit in advance of the one functioning. This circuit is prepared by connecting terminal #11 of the coding unit to terminal #11 of the first storage unit, and by connecting terminal #11 of each remaining storage unit to terminal #25 of the next preceding storage unit. As shown in Fig. 13, terminals #11 and #25 of each storage unit are normally connected together over back contact A5 of relay SB. This circuit may be traced from terminal B, front contact A3 of relay RY, thence as already described for relay SB to terminal #10 of the storage unit that is functioning, front contacts A5 of relays SA and SB, terminal #11 of that storage unit to terminal #25 of the next preceding storage unit, thence in series as described over back contact A5 of relay SB of each preceding storage unit, #11 terminal of the first storage unit to #11 terminal of coding unit, the coil of relay M1, #4 terminal connection between coding and line units, the coil of relay M, #12 terminal connection between line and coding units, and back contact A2 of relay R8 to terminal C. Relay M1, upon picking up, opens the pick-up circuit of relay SB at back contact B1 of relay M1, but simultaneously provides a combined stick circuit for relays M1, M and SB which may be traced from terminal B, through front contact B4 of relay LC, back contact C1 of relay LOS, back contact C1 of relay LO, front contact A2 of relay M1, and thence to #11 terminal of the coding unit. The circuit branches at this point, one branch passing through the coils of relays M1 and M, #12 terminal, back contact A2 of relay R8 to terminal C. The other branch, comprising the stick circuit for relay SB extends from the #11 terminal connection of the coding unit to #11 terminal of the first storage unit, back contact A5 of relay SB of that unit to its terminal #25, thence to terminal #11 of the next unit and so on to terminal #11 of the storage unit that is functioning, and thence over the front contact A5 of the relay SB that is picked up, and the coil of relay SB to terminal C. Transfers of the source of battery for the stick circuits of the above relays are described under relays LO and LOS below. When relay M becomes energized, its contacts C1 and B1 open the line wires XL and YL to all stations more remote and connect these line wires with line wire ZL at the transmitting station through resistors 125 and 126, respectively, to compensate for the resistances of the line relays thus cut out. This sectionalizing action, and also certain related locking and checking operations incidental to transmission of codes will be discussed in detail hereinafter.

Relay TX receives energy from terminal B, through back contact D3 of relay LOS, front contact D3 of relay M1, #13 terminal connection from coding to storage unit, front contact E3 of relay SB, front contact C3 of relay IK, "X" interconnections to line unit, and relay coil TX, #5 terminal connection between line and coding units, front contact B2 of relay LC, back contact A4 of relay LOS to terminal C. When relay TX closes, it opens line XL to the office and initiates the first element of the code.

Line relay RX releases due to its circuit being opened at back contact B1 of relay TX.

Relay LO receives energy from terminal B, through front contact A3 of relay RY, back contact A3 of relay RX, front contact C3 of relay RY, #2 terminal connection between line and coding units, and coil of relay LO to terminal C. When relay LO picks up the source of battery for the stick circuits for the relays M, M1 and SB, previously traced, is transferred from back contact C1 of relay LO to front contact C1 of relay LO, and thence passes through back contact C1 of relay LOS, front contact B5 of relay M1, #6 terminal connection between coding and line units, front contact A3 of relay TX, back contact A3 of relay RX, and front contact A3 of relay RY to terminal B.

Relay T1 receives energy from terminal B, through front contact C4 of relay M1, back contact B1 of relay LOS, front contact B2 of relay LO, front contact A2 of relay LC, back contacts B1 of the chain group of relays in series, and the coil of relay T1 to terminal C. This pick-up circuit for the relay T1 becomes the stick circuit for the chain relays when relay LOS picks up. This action is described under relay LOS below.

Relay LOS receives energy from terminal B, through front contact A3 of relay RY, back contact A3 of relay RX, front contact C3 of relay TX, #7 terminal connection between line and coding units, back contact B5 of relay T2, front contact B5 of relay T1, and coil of relay LOS to terminal C. The stick circuit for relay LOS is made from terminal B over its own front contact D3, front contact D3 of relay LO to the coil of relay LOS. When relay LOS picks up, it transfers the stick circuit for the relays M, M1 and SB from back contact C1 of relay LOS to front contact C1 of relay LOS, and front contact B4 of relay LC to terminal B. When the relay LOS picks up, the pick-up circuit for the relay T1 becomes the stick circuit for the chain relays through front contact B1 of relay LOS, back contact A4 of the relay KD, and front contact C3 of the relay LC to terminal B.

The circuit for relay TX, traced above, is opened by both back contacts D3 and A4 of relay LOS, and relay TX accordingly releases.

Line relay RX has its circuit closed locally through back contact B1 of relay TX, due to relay TX releasing, and will pick up as soon as the portion of the line circuit extending from the transmitting station to the office becomes closed upon the termination of the first element of the code.

OFFICE RELAYS

Line relay ORX releases due to transmission of the first code element from the field station.

*Relays OLO and OTX.*—Energy is fed to relay OTX, from terminal B, through front contact A3 of relay ORY, back contact A3 of relay ORX, #7 terminal connection between line and coding units, back contact B5 of relay OM, "X" terminal connection between coding and line units, coil of relay OTX, #5 terminal connection between line and coding units, front contact B4 of relay OLC, and back contact A2 of relay OLOS, to terminal C. Relay OLO receives energy from terminal B, through front contact A3 of relay ORY, back contact A3 of relay ORX, front contact C3 of relay ORY, #2 terminal connection between line and coding units, and coil circuit of relay OLO to terminal C.

Relay OT1 receives energy from terminal B, through front contact A3 of relay ORY, back contact A3 of relay ORX, front contact C3 of relay ORY, #2 terminal connection between line and coding units, back contact C1 of relay OLOS, front contact D3 of relay OLO, front contact B2 of relay OLC, back contact A2 of relay OR8, back contacts B1 of the rest of the chain group in series, and the coil of relay OT1 to terminal C. This pick-up circuit for the relay OT1 becomes the stick circuit for the chain relays when the relay OLOS picks up. This action is described under relay OLOS below.

Relay O1X receives energy from terminal B, through front contact A3 of relay ORY, back contact A3 of relay ORX, front contact A3 of relay OTX, #10 terminal connection between line and coding units, back contact B5 of relay OT2, through front contact B5 of relay OT1, and the coil circuit of relay O1X to terminal C. The stick circuit for relay O1X passes from terminal B, through front contact B2 of relay OLO, front contact A3 of relay O1X and coil of relay O1X to terminal C. An auxiliary stick circuit described under relay OD below is also provided for relay O1X.

Relay OLOS receives energy from the stick circuit previously traced for relay O1X, through front contact A5 of relay O1X, front contact C2 of relay OT1, and the coil of relay OLOS to terminal C. The stick circuit for this relay passes from terminal B, through front contact C5 of relay OLO, front contact D3 of relay OLOS, and the coil of relay OLOS to terminal C. When the relay OLOS picks up, the pick-up circuit for the relay OT1 becomes the stick circuit for the chain relays, through front contact C1 of relay OLOS to terminal B.

The circuit for relay OTX, traced above, is opened at back contact A2 of relay OLOS, and the relay OTX accordingly releases.

Line relay ORX has its circuit closed locally at back contact B1 of relay OTX, and picks up as soon as the line circuit from the transmitting station is fully closed.

SECOND STEP—"X"
STATION RELAYS

Relay T2 receives energy from terminal B, through front contact A3 of relay RY, front contact A3 of relay RX, #1 terminal connection between line and coding units, back contact C4 of relay KD, front contact A3 of relay LO, front contact A5 of relay T1, and the coil of relay T2 to terminal C. A stick circuit is provided for relay T2 through its own front contact B1 in the usual manner.

*Relays TX and T1.*—Energy is cut off from the stick circuit and relay T1 released in the usual manner by relay T2 picking up. Relay TX receives energy from terminal B, through front contact C2 of relay M1, front contact A5 of relay T2, #41 terminal connected externally to "X" interconnection between coding and line units, coil of relay TX #5 terminal connection between line and coding units, front contact B2 of relay LC, front contact C2 of relay T2, and back contact C2 of relay R2 to terminal C. When relay TX closes, the resulting opening of line XL to the office starts the second element of the code.

Line relay RX releases due to its circuit being opened locally at back contact B1 of relay TX.

Relay R2 receives energy from terminal B, through front contact A3 of relay RY, back contact A3 of relay RX, front contact C3 of relay TX, #7 terminal connection between line and coding units, front contact B5 of relay T2, #39 terminal connection, and external jumper to #33 terminal connection and thence through the coil circuit of relay R2 to terminal C. A stick circuit is provided for relay R2 through its own front contact B1 in the usual manner.

*Relays TX and T2.*—The stick circuit is opened, and relay T2 dropped, in the usual manner by picking up relay R2. The circuit for relay TX, traced above, is opened at back contact C2 of relay R2, and the relay TX accordingly releases.

Line relay RX has its circuit closed locally at back contact B1 of relay TX and picks up as soon as the portion of the line circuit extending to the office is closed at the conclusion of the second element of the indication code.

OFFICE RELAYS

Relay OT2 receives energy from terminal B, through front contact A3 of relay ORY, front contact A3 of relay ORX, #1 terminal connection between line and coding units, front contact A3 of relay OLO, front contact A5 of relay OT1, and the coil of relay OT2 to terminal C. A stick circuit is provided for relay OT2 through its own front contact B1 in the usual manner.

*Relay OT1.*—The supply of energy is disconnected from the stick circuit and relay OT1 released in the usual manner by relay OT2 picking up.

Line relay ORX releases in response to the "X" code element transmitted by the station.

Relay OTX receives energy from terminal B, through front contact A3 of relay ORY, back contact A3 of relay ORX, #7 terminal connection between line and coding units, back contact B5 of relay OM, "X" terminal connection between coding and line units, the coil of relay OTX, #5 terminal connection between line and coding units, front contact B4 of relay OLC, front contact C2 of relay OT2, and back contact C2 of relay OR2 to terminal C.

Relay OSD (X) receives energy from terminal B, through front contact A3 of relay ORY, back contact A3 of relay ORX, front contact A3 of relay OTX, #10 terminal connection between line and coding units, front contact B5 of relay OT2, #37 terminal connection between coding and storage units, and the coil of relay OSD(X) to terminal C. A stick circuit for relay OSD (X) is completed from terminal B, through front contact B2 of relay OLO, #32 terminal connection between coding and storage units, front contact A3 of relay OSD(X), and coil of relay OSD(X) to terminal C. An auxiliary stick circuit, described under relay OD below, is also provided for this relay.

Relay OR2 receives energy from the stick circuit of relay OSD(X), through front contact A5 of relay OSD(X), #33 terminal connection between storage and coding units, front contact A5 of relay OT2, and coil of relay OR2 to terminal C. A stick circuit is provided for relay OR2 through its own front contact B1 in the usual manner.

*Relays OTX and OT2.*—The stick circuit is cut off and relay OT2 released in the usual manner by the picking up of relay OR2. The circuit for relay OTX, traced above, is opened at back contact C2 of relay OR2, and relay OTX accordingly releases.

Line relay ORX has its circuit closed locally at back contact B1 of relay OTX, and accordingly picks up as soon as the corresponding line circuit is fully closed.

THIRD STEP—"Z"
STATION RELAYS

Relay T3 receives energy from terminal B, through front contact A3 of relay RY, front contact A3 of relay RX, #1 terminal connection between line and coding units, back contact C4 of relay KD, front contact A3 of relay LO, front contact A5 of relay R2, and coil of relay T3 to terminal C. A stick circuit is provided for relay T3 through its own front contact B1 in the usual manner.

*Relays TZ and R2.*—The stick circuit for relay R2 is broken and this relay is released in the usual manner by relay T3 picking up. Relay TZ receives energy from terminal B, through front contact C2 of relay M1, front contact A5 of relay T3, thence through #53 terminal connection, and the external code setting jumper to "Z" bus connections to line unit, the coil of relay TZ, #5 terminal connection between line and coding units, front contact B2 of relay LC, front contact D3 of relay T3, and back contact C2 of relay R3 to terminal C. When relay TZ picks up, it initiates the third element of the code.

Line relays RX and RY both release due to both line circuits being opened at back contact D2 of relay TZ. The local portion of the circuit for relay RX extends from line wire XL, through the coil of relay RX, back contact B1 of relay TX, through front contact C1 of relay M, external resistance 125, and back contact D2 of relay TZ to line wire ZL. The local portion of the circuit for relay RY is from line wire YL, through the coil of relay RY, back contact B1 of relay TY, front contact B1 of relay M, external resistance 126, and back contact D2 of relay TZ to line wire ZL.

Relay R3 receives energy from terminal B, through back contact A3 of relay RY, back contact C3 of relay RX, front contact A3 of relay TZ, #9 terminal connection between line and coding units, front contact D5 of relay T3, #52 terminal connection and external code setting jumper to #34 terminal connection, and the coil of relay R3 to terminal C. A stick circuit is made for relay R3 through its own front contact B1 in the usual manner.

*Relays TZ and T3.*—The stick circuit is opened, and relay T3 releases in the usual manner by relay R3 picking up. The circuit for relay TZ, traced above, is opened at back contact C2 of relay R3 and the relay accordingly releases.

Line relays RX and RY have their circuits closed locally at back contact D2 of relay TZ, and accordingly picks up as soon as the corresponding line circuits become fully closed at the conclusion of the third element of the code.

OFFICE RELAYS

Relay OT3 receives energy from terminal B, through front contact A3 of relay ORY, front contact A3 of relay ORX, #1 terminal connection between line and coding units, front contact A3 of relay OLO, front contact A5 of relay OR2, and coil of relay OT3 to terminal C. The stick circuit for relay OT3 is made through its own front contact B1 in the usual manner.

*Relay OR2.*—The stick circuit for this relay is opened and the relay releases in the usual manner upon relay OT3 picking up.

Line relays ORX and ORY release due to the

"Z" code element being transmitted from the field.

Relay OTZ receives energy from terminal B, through back contact A3 of relay ORY, back contact C3 of relay ORX, #9 terminal connection between line and coding units, back contact A5 of relay OM, "Z" bus connections to line unit, coil of relay OTZ, #5 terminal connection between line and coding units, front contact B4 of relay OLC, front contact C2 of relay OT3, and back contact C2 of relay OR3 to terminal C.

Relay OSD(XZ) receives energy from terminal B, through back contact A3 of relay ORY, back contact C3 of relay ORX, front contact C3 of relay OTZ, #12 terminal connection between line and coding units, front contact D5 of relay OT3, #42 terminal connection between coding and storage units, front contact C3 of relay OSD(X), and the coil of relay OSD(X) to terminal C. The stick circuit for relay OSD(X) passes from terminal B, through front contact B2 of relay OLO, #32 terminal connection between coding and storage units, and front contact A3 of relay OSD(XZ) and the coil of relay OSD(XZ) to terminal C. An auxiliary stick circuit described under relay OD below is also provided for relay OSD(XZ).

Relay OR3 receives energy from stick circuit of relay OSD(XZ), through front contact A5 of relay OSD(XZ), #34 terminal connection between storage and coding units, front contact A5 of relay OT3, and the coil of relay OR3 to terminal C. The stick circuit for relay OR3 is made through its own front contact B1 in the usual manner.

*Relays OTZ and OT3.*—The stick circuit for relay OT3 is broken, and this relay released in the usual manner upon relay OR3 picking up. The circuit for relay OTZ, traced above, is opened at back contact C2 of relay OR3 and relay OTZ accordingly releases.

Line relays ORX and ORY have their circuits closed locally at back contact B1 of relay OTZ and accordingly pick up when the corresponding line circuits become fully closed.

FOURTH STEP—"Y"

STATION RELAYS

Relay T4 receives energy from terminal B, through front contact A3 of relay RY, front contact A3 of relay RX, #1 terminal connection between line and coding units, back contact C4 of relay KD, front contact A3 of relay LO, front contact A5 of relay R3, and the coil of relay T4 to terminal C. The stick circuit for relay T4 is made through its own front contact B1 in the usual manner.

*Relays TY and R3.*—The stick circuit is broken and relay R3 releases in the usual manner upon relay T4 picking up. Relay TY receives energy from terminal B, through front contact C2 of relay M1, front contact A5 of relay T4, #14 terminal connection between coding and storage units, front contact B2 of relay SB of the storage unit in action, #8 terminal connection and the external code setting jumper to "Y" bus connections to line unit, the coil of relay TY, #5 terminal connection between line and coding units, front contact B2 of relay LC, front contact D3 of relay T4, and back contact C2 of relay R4 to terminal C. When relay TY picks up the opening of its back contact B1 initiates the fourth element of the indication code.

Line relay RY releases due to the corresponding line circuit being opened at back contact B1 of relay TY. All relays on the available portion of the "Y" line circuit of course release simultaneously.

Relay SD(Y) receives energy from terminal B, through back contact A3 of relay RY, front contact C3 of relay RX, front contact C3 of relay TY, #8 terminal connection between line and coding units, front contact C4 of relay T4, and the coil of relay SD(Y) to terminal C. A stick circuit is provided for relay SD(Y) from terminal B, through front contact B4 of relay LO, front contact A3 of relay SD(Y), and coil of relay SD(Y) to terminal C. An auxiliary stick circuit, described under relay VC below, is also provided for relay SD(Y).

Relay R4 receives energy from the stick circuit of relay SD(Y), through front contact A5 of relay SD(Y), front contact C2 of relay T4, and the coil of relay R4 to terminal C. The stick circuit is made for relay R4 through its own front contact B1 in the usual manner.

*Relays TY and T4.*—The stick circuit for relay T4 is broken and this relay releases in the usual manner when relay R4 picks up. The circuit for relay TY, traced above, is opened at back contact C2 of relay R4, and accordingly relay TY releases.

Line relay RY has its circuit closed locally at back contact B1 of relay TY, and will pick up as soon as the corresponding line circuit becomes fully closed upon the completion of the fourth code element.

OFFICE RELAYS

Relay OT4 receives energy from terminal B, through front contact A3 of relay ORY, front contact A3 of relay ORX, #1 terminal connection between line and coding units, front contact A3 of relay OLO, front contact A5 of relay OR3, and the coil of relay OT4 to terminal C. The stick circuit for relay OT4 is made through its own front contact B1 in the usual manner.

Relay OR3 loses its stick circuit and releases in the usual manner when relay OT4 picks up.

Line relay ORY releases due to the reception of the fourth element of the indication code which is being transmitted from the field station.

Relay OTY receives energy from terminal B, through back contact A3 of relay ORY, front contact C3 of relay ORX, #8 terminal connection between line and coding units, back contact A3 of relay OM, "Y" bus connections to line unit, the coil of relay OTY, #5 terminal connection between line and coding units, front contact B4 of relay OLC, front contact C2 of relay OT4, and back contact C2 of relay OR4 to terminal C.

Relay OSD(XZY) receives energy from terminal B, through back contact A3 of relay ORY, front contact C3 of relay ORX, front contact A3 of relay OTY, #11 terminal connection between line and coding units, front contact C4 of relay OT4, #44 terminal connection between coding and storage units, front contact B4 of relay OSD(XZ), and the coil circuit of relay OSD(XZY) to terminal C. A stick circuit is provided for relay OSD(XZY) from terminal B, through front contact B2 of relay OLO, #32 terminal connection between coding and storage units, front contact A3 of relay OSD(XZY), and coil of relay OSD(XZY) to terminal C. An auxiliary stick circuit, described under relay OD below, is also provided for relay OSD(XZY).

Relay OR4 receives energy from the stick circuit of relay OSD(XZY), through front contact A5 of relay OSD(XZY), #35 terminal connection between storage and coding units, front contact A5 of relay OT4, and coil of relay OR4 to terminal C. A stick circuit is provided for relay OR4 through its own front contact B1 in the usual manner.

*Relays OTY and OT4.*—The stick circuit is broken and relay OT4 released in the usual manner when relay OR4 picks up. The circuit for relay OTY, traced above, is opened at back contact C2 of relay OR4, and accordingly the relay releases.

Relay ORY has its circuit closed locally at back contact B1 of relay OTY, and accordingly picks up when the corresponding line circuit becomes fully closed.

FIFTH STEP—"X"
STATION RELAYS

Relay T5 receives energy from terminal B, through front contact A3 of relay RY, front contact A3 of relay RX, #1 terminal connection between line and coding units, back contact C4 of relay KD, front contact A3 of relay LO, front contact A5 of relay R4, and the coil of relay T5 to terminal C. A stick circuit for relay T5 is made through its own front contact B1 in the usual manner.

*Relays TX and R4.*—The stick circuit is broken and relay R4 released in the usual manner when relay T5 picks up. Relay TX receives energy from terminal B, through front contact C2 of relay M1, front contact A5 of relay T5, #16 terminal connection between coding and storage units, front contact E5 of relay SB of the storage unit in action, front contact C3 of relay 5X, "X" bus connections to line unit, coil of relay TX, #5 terminal connection between line and coding units, front contact B2 of relay LC, front contact D3 of relay T5, and back contact C2 of relay R5 to terminal C. When relay TX opens its back contact B1, it initiates the fifth element of the code.

Line relay RX releases due to the corresponding line circuit being opened at back contact B1 of relay TX. All relays on the available portion of the "X" line circuit accordingly release simultaneously.

Relay R5 receives energy from terminal B, through front contact A3 of relay RY, back contact A3 of relay RX, front contact C3 of relay TX, #7 terminal connection between line and coding units, front contact B5 of relay T5, and coil of relay R5 to terminal C. The stick circuit for relay R5 is made through its own front contact B1 in the usual manner.

*Relays TX and T5.*—The stick circuit is broken and relay T5 releases in the usual manner when relay R5 picks up. The circuit for relay TX, traced above, is opened at back contact C2 of relay R5 and relay TX accordingly releases.

Line relay RX has its circuit closed locally at back contact B1 of relay TX, and accordingly picks up as soon as the corresponding line circuit is fully closed upon the conclusion of the fifth element of the code.

OFFICE RELAYS

Relay OT5 receives energy from terminal B, through front contact A3 of relay ORY, front contact A3 of relay ORX, #1 terminal connection between line and coding units, front contact A3 of relay OLO, front contact A5 of relay OR4, and the coil of relay OT5 to terminal C. A stick circuit is completed for relay OT5 through its own front contact B1 in the usual manner.

Relay OR4 has its stick circuit broken and releases in the usual manner when relay OT5 picks up.

Line relay ORX releases due to the reception of the fifth code element transmitted from the field station.

Relay OTX receives energy from terminal B, through front contact A3 of relay ORY, back contact A3 of relay ORX, #7 terminal connection between line and coding units, back contact B5 of relay OM, "X" bus connections to line unit, coil circuit of relay OTX, #5 terminal connection between line and coding units, front contact B4 of relay OLC, front contact C2 of relay OT5, and back contact C2 of relay OR5 to terminal C.

Relay O5X receives energy from terminal B, through front contact A3 of relay ORY, back contact A3 of relay ORX, front contact A3 of relay OTX, #10 terminal connection between line and coding units, front contact B5 of relay OT5, and coil of relay O5X to terminal C. The stick circuit for relay O5X passes from terminal X, through front contact B2 of relay OLO, front contact A3 of relay O5X and coil of relay O5X to terminal C. An auxiliary stick circuit, described under relay OD below, is also provided for this relay.

Relay OR5 receives energy from the stick circuit of relay O5X, through front contact A5 of relay O5X, front contact A5 of relay OT5, and the coil of relay OR5 to terminal C. A stick circuit for relay OR5 is made through its own front contact B1 in the usual manner.

*Relays OTX and OT5.*—The stick circuit is broken and relay OT5 released in the usual manner when relay OR5 picks up. The circuit for relay OTX, traced above, is opened at back contact C2 of relay OR5 and relay OTX accordingly releases.

Line relay ORX has its circuit closed locally at back contact B1 of relay OTX, and accordingly picks up as soon as the corresponding line circuit becomes fully closed.

SIXTH STEP—"X"
STATION RELAYS

Relay T6 receives energy from terminal B, through front contact A3 of relay RY, front contact A3 of relay RX, #1 terminal connection between line and coding units, back contact C4 of relay KD, front contact A3 of relay LO, front contact A5 of relay R5, and coil circuit of relay T6 to terminal C. The stick circuit for relay T6 is made through its own front contact B1 in the usual manner.

*Relays TX and R5.*—The stick circuit is broken and relay R5 released in the usual manner by relay T6 picking up. Relay TX receives energy from terminal B, through front contact C2 of relay M1, front contact A5 of relay T6, #17 terminal connection between coding and storage units, front contact D2 of relay SB of the storage unit in action, #34 terminal of the storage unit, front contact 137 and normal contact 138 of relay 1KR, through "X" bus connections to line unit, coil of relay TX, #5 terminal connection between line and coding units, front contact B2 of relay LC, front contact D3 of relay T6, and back contact C2 of relay R6 to terminal C. When relay TX becomes energized, the sixth element of the indication code is initiated.

Line relay RX releases due to the corresponding line circuit being broken at back contact B1 of relay TX, and the sixth element of the code is transmitted to the office by simultaneous release of all line relays in the portion of the "X" line circuit extending to the office.

Relay 6X receives energy from terminal B, through front contact A3 of relay RY, back contact A3 of relay RX, front contact C3 of relay TX, #7 terminal connection between line and coding units, front contact B5 of relay T6, and the coil of relay 6X to terminal C. A stick circuit is provided for relay 6X from terminal B, through front contact B4 of relay LO, front contact A3 of relay 6X, and coil of relay 6X to terminal C. An auxiliary stick circuit, described under relay VC below, is provided for this relay.

Relay R6 receives energy from the stick circuit of relay 6X, through front contact A5 of relay 6X, front contact C2 of relay T6, and the coil of relay R6 to terminal C. A stick circuit for relay R6 is made through its own front contact B1 in the usual manner.

*Relays TX and T6.*—The stick circuit is broken and relay T6 releases in the usual manner when relay R6 picks up. The circuit for relay TX, traced above, is opened at back contact C2 of relay R6, and relay TX accordingly releases.

Line relay RX has its circuit closed locally at back contact B1 of relay TX, and picks up as soon as the portion of the line circuit extending to the office has been completed after the termination of the sixth code element.

OFFICE RELAYS

Relay OT6 receives energy from terminal B, through front contact A3 of relay ORY, front contact A3 of relay ORX, #1 terminal connection between line and coding units, front contact A3 of relay OLO, front contact A5 of relay OR5, and the coil of relay OT6 to terminal C. A stick circuit for relay OT6 is made through its own front contact B1 in the usual manner.

Relay OR5 has its stick circuit broken and releases in the usual manner upon relay OT6 picking up.

Line relay ORX releases due to transmission of the sixth code element from the field station.

Relay OTX receives energy from terminal B, through front contact A3 of relay ORY, back contact A3 of relay ORX, #7 terminal connection between line and coding units, back contact B5 of relay OM, "X" bus connection to line unit, the coil circuit of relay OTX, #5 terminal connection between line and coding units, front contact B4 of relay OLC, front contact C2 of relay OT6, and back contact C2 of relay OR6 to terminal C.

Relay O6X receives energy from terminal B, through front contact A3 of relay ORY, back contact A3 of relay ORX, front contact A3 of relay OTX, #10 terminal connection between line and coding units, front contact B5 of relay OT6, and the coil of relay O6X to terminal C. A stick circuit is provided through front contact B2 of relay OLO, front contact A3 of relay O6X, and the coil of relay O6X to terminal C. An auxiliary stick circuit described below under relay OD is provided for relay O6X.

Relay OR6 receives energy from the stick circuit of relay O6X, through front contact A5 of relay O6X, front contact A5 of relay OT6, and the coil of relay OR6 to terminal C. The stick circuit for relay OR6 is made through its own front contact B1 in the usual manner.

*Relays OTX and OT6.*—Stick circuit is broken and relay OT6 released in the usual manner when relay OR6 picks up. The circuit for relay OTX, traced above, is broken at back contact C2 of relay OR6, and relay OTX accordingly releases.

Line relay ORX has its circuit closed locally at back contact B1 of relay OTX, and accordingly picks up as soon as the available portion of the corresponding line circuit becomes closed.

SEVENTH STEP—"Y"

STATION RELAYS

Relay T7 receives energy from terminal B, through front contact A3 of relay RY, front contact A3 of relay RX, #1 terminal connection between line and coding units, back contact C4 of relay KD, front contact A3 of relay LO, front contact A5 of relay R6, and coil of relay T7 to terminal C. A stick circuit for relay T7 is made through its own front contact B1 in the usual manner.

*Relays TY and R6.*—The stick circuit is broken and relay R6 released in the usual manner when relay T7 picks up. Relay TY receives energy from terminal B, through front contact C2 of relay M1, front contact A5 of relay T7, #18 terminal connection between coding and storage units, front contact B4 of relay SB to storage unit in action, #35 terminal on storage unit, back contact 139 of relay 1LH, front contact 140 of relay 1RH, "Y" bus connections to line unit, coil of relay TY, #5 terminal connection between line and coding units, front contact B2 of relay LC, front contact D3 of relay T7, and back contact C2 of relay R7 to terminal C. The energization of relay TY initiates the seventh element of the indication code.

Line relay RY releases due to its line circuit being broken at back contact B1 of relay TY, and accordingly all line relays on the available portion of the "Y" line circuit release simultaneously.

Relay 7Y receives energy from terminal B, through back contact A3 of relay RY, front contact C3 of relay RX, front contact C3 of relay TY, #8 terminal connection between line and coding units, front contact C4 of relay T7, and the coil of relay 7Y to terminal C. A stick circuit is provided for relay 7Y from terminal B, through front contact B4 of relay LO, front contact A3 of relay 7Y, and coil of relay 7Y to terminal C. An auxiliary stick circuit described under relay VC below is provided for this relay.

Relay R7 receives energy from the stick circuit of relay 7Y, through front contact A5 of relay 7Y, front contact C2 of relay T7, and the coil of relay R7 to terminal C. A stick circuit for relay R7 is made through its own front contact B1.

*Relays TY and T7.*—The stick circuit is broken and relay T7 releases in the usual manner when relay R7 picks up. The circuit for relay TY, traced above, is opened at back contact C2 of relay R7 and relay TY accordingly releases.

Line relay RY has its circuit closed locally at back contact B1 of relay TY, and accordingly picks up as soon as the portion of the line circuit extending to the office becomes closed at the conclusion of the seventh element of the code.

OFFICE RELAYS

Relay OT7 receives energy from terminal B, through front contact A3 of relay ORY, front contact A3 of relay ORX, #1 terminal connection between line and coding units, front contact A3 of relay OLO, front contact A5 of relay OR6, and the coil of relay OT7, to terminal C. The stick circuit for relay OT7 is completed through its own front contact B1 in the usual manner.

Relay OR6 has its stick circuit opened and releases in the usual manner when relay OT7 picks up.

Line relay ORY releases in response to the seventh code element transmitted from the field station.

Relay OTY receives energy from terminal B, through back contact A3 of relay ORY, front contact C3 of relay ORX, #8 terminal connection between line and coding unit, back contact A3 of relay OM, "Y" bus connection to line unit, coil of relay OTY, #5 terminal connection between line and coding units, front contact B4 of relay OLC, front contact C2 of relay OT7, and back contact C2 of relay OR7 to terminal C.

Relay O7Y receives energy from terminal B, through back contact A3 of relay ORY, front contact C3 of relay ORX, front contact A3 of relay OTY, #11 terminal connection between line and coding units, front contact C4 of relay OT7, and the coil of relay O7Y to terminal C. A stick circuit for relay O7Y is made from terminal B, through front contact B2 of relay OLO, front contact A3 of relay O7Y, and the coil of relay O7Y to terminal C. An auxiliary stick circuit described under relay OD below is provided.

Relay OR7 receives energy from the stick circuit of relay O7Y, through front contact A5 of relay O7Y, front contact A5 of relay OT7, and the coil of relay OR7 to terminal C. A stick circuit is provided for relay OR7 through its own front contact B1 in the usual manner.

*Relays OTY and OT7.*—The stick circuit is broken and relay OT7 releases in the usual manner when relay OR7 picked up. The circuit for relay OTY traced above, is opened at back contact C2 of relay OR7 and relay OTY accordingly releases.

Line relay ORY has its circuit closed locally at back contact B1 of relay OTY, and accordingly picks up simultaneously with the other line relays in that line circuit.

EIGHTH STEP—"X"

STATION RELAYS

Relay T8 receives energy from terminal B, through front contact A3 of relay RY, front contact A3 of relay RX, #1 terminal connection between line and coding units, back contact C4 of relay KD, front contact A3 of relay LO, front contact A5 of relay R7, and coil of relay T8 to terminal C. A stick circuit is provided from terminal B, through its own contact B1 in the usual manner.

*Relays TX and R7.*—Stick circuit is broken and relay R7 released in the usual manner when relay T8 picks up. Relay TX receives energy from terminal B, through front contact C2 of relay M1, front contact A5 of relay T8, #15 terminal connection between coding and storage units, front contact C2 of relay SB of storage unit in action, #9 terminal connection, external code setting jumper to "X" bus connection, and interconnections to line circuit, thence through coil of relay TX, #5 terminal connection between line and coding units, front contact B2 of relay LC, front contact D3 of relay T8, and back contact C4 of relay R8 to terminal C. The energization of relay TX initiates the eighth element of the code.

Line relay RX releases due to its line circuit being broken at back contact B1 of relay TX, and accordingly an "X" code element is transmitted to the office on the eighth step.

Relay R8 receives energy from terminal B, through front contact A3 of relay RY, back contact of relay RX, front contact C3 of relay TX, #7 terminal connection between line and coding units, front contact B5 of relay T8, front contact C3 of relay SD(Y), #43 terminal connection to #7 terminal connection of the storage unit in action, front contact D4 of relay SB, #24 terminal connection between storage and coding units, and the coil of relay R8 to terminal C. A stick circuit is provided through its own front contact B1 in the usual manner.

*Relays TX, T8, M and M1.*—The stick circuit of relay T8 was broken and relay T8 released in the usual manner upon picking up of relay R8. When the relay R8 picks up, the circuit for the relays M and M1 in series over back contact A2 of relay R8 is broken and simultaneously terminal C is connected over front contact A2 of relay R8, and resistance 141 to coil of relay M1; therefore relay M1 remains energized and relay M releases. The circuit for relay TX, traced above, is opened at back contact C4 of relay R8, and relay TX accordingly releases.

Line relay RX has its circuit closed locally at back contact B1 of relay TX, and accordingly picks up as soon as the portion of the corresponding line circuit extending to the office is closed at the conclusion of the eighth element of the indication code.

OFFICE RELAYS

Relay OT8 receives energy from terminal B, through front contact A3 of relay ORY, front contact A3 of relay ORX, #1 terminal connection between line and coding units, front contact A3 of relay OLO, front contact A5 of relay OR7, and the coil of relay OT8 to terminal C. The stick circuit for relay OT8 is made through its own front contact B1 in the usual manner.

Relay OR7 loses its stick circuit and releases in the usual manner when relay OT8 picks up.

Line relay ORX releases due to the reception of the eighth element of the indication code from the field station.

Relay OTX receives energy from terminal B, through front contact A3 of relay ORY, back contact A3 of relay ORX, #7 terminal connection between line and coding units, back contact B5 of relay OM, "X" bus connection to line unit, coil of relay OTX, #5 terminal connection between line and coding units, front contact B4 of relay OLC, front contact D3 of relay OT8, and back contact C4 of relay OR8 to terminal C.

Relays OD(81) and OD1(XZYX) receive energy from terminal B, through front contact A3 of relay ORY, back contact A3 of relay ORX, front contact A3 of relay OTX, #10 terminal connection between line and coding units, front contact B5 of relay OT8, #46 terminal connection between coding and storage units, front contact B2 of relay OSD(XZY), back contact A5 of relay OSB, the coil of relay OD(81), and the coil of relay OD1(XZYX) to terminal C. The stick circuit for relays OD(81) and OD1(XZYX) is described under relay OR8 below. When the relay OD(81) picks up, stick circuits for intermediate relays O1X, O5X, O6X, O7Y, OSD(X), OSD(XZ) and OSD(XYZ) are provided from terminal B, over front contact D3 of relay OD(81) front contacts A3 of all OSD relays to their coils, and through #32 terminal connection between storage and coding units, and front contacts A3 of the intermediate relays to their coils.

*Relays OR8, NWK, RHGK, AK and TK.*—A circuit is now closed for relay OR8 from coil circuit of relay OD(81), through front contact A3 of relay OD(81), bus connecting front contacts A5 of all OSB relays, #36 terminal connection between storage and coding units, and the coil of relay OR8 to terminal C. A stick circuit is provided for relay OR8 through its own front contact A2 in the usual manner. Also, when relay OR8 picks up, the stick circuit for the relay OR8 furnishes stick energy through the pick-up path of relay OR8 back to relays OD(81) and ODI(XZYX). Relay NWK receives energy from terminal B, through front contact B2 of relay O6X, #52 terminal connection between coding and storage units, bus connection of relays ODI, front contact A5 of relay ODI(XZYX), and the coil circuit of relay NWK to terminal C. A stick circuit described under relays OD and ODI below is provided for relay NWK. Relay RHGK receives energy from terminal B, through front contact B2 of relay O7Y, #59 terminal connection between coding and storage units, bus connection of OD relays, front contact CI of relay OD(81) in action, and the coil of relay RHGK to terminal C. A stick circuit described under relays OD and ODI below is provided for relay RHGK. Relay AK is normally stuck up over a circuit which passes from terminal B, through its own front contact A3, back contact BI of relay ODI, and the coil of relay AK to terminal C. When the relay ODI(XZYX) picks up, this stick circuit for relay AK is broken, but simultaneously the front contact BI makes and connects the coil of relay AK, through the bus connection of the relays ODI, #49 terminal connection between storage and coding units, and front contact C3 of relay OIX to terminal B. This maintains energy on the relay AK during the time the relay ODI is energized. The action of the relay TK is identical with that of the relay AK, the stick circuit obtaining the energy from terminal B, over its own front contact A3, and back contact CI of relay ODI to the coil of relay TK, and its pick-up circuit obtaining energy from terminal B, over front contact C3 of relay O5X, #55 terminal connection between coding and storage units, bus connection on relays ODI, and front contact CI of relay ODI to the coil of relay IK.

*Relays OTX and OT8.*—Stick circuit is broken and relay OT8 releases in the usual manner when relay OR8 picks up. The circuit for relay OTX, traced above, is broken at back contact C4 of relay OR8 and relay OTX accordingly releases.

Line relay ORX has its circuit closed locally at back contact BI of relay OTX, and accordingly picks up as soon as line conditions permit.

The indication code is now completed, but it is necessary to release the locking and checking relays, restore the station and office relays to their normal conditions and place the apparatus in condition to receive or transmit codes from any station or the office. We will now explain how these functions are performed.

*Station relays*

OFFICE RELAYS

*Relays LO and VC.*—Energy for relay VC is received from terminal B, through front contact A3 of relay RY, front contact A3 of relay RX, #1 terminal connection between line and coding units, back contact C4 of relay KD, front contact A3 of relay LO, front contact C3 of relay R8, #23 terminal connection between coding and storage units, front contact C4 of relay SB of storage unit in operation, back contact BI of relay VC, and the coil of relay VC to terminal C. The stick circuit for relay VC passes from the stick circuit of relay R3, previously described, through #24 terminal connection between coding and storage units, and front contact BI of relay VC to its coil. Relay LO has its circuit opened at back contact A3 of relay RX and being of the slow release type, releases at the end of its time element. When relay VC picks up a stick circuit for relays SD(Y), 6X and 7Y is provided from terminal B, over front contact B5 of relay VC, #30 terminal connection between storage and coding units, and front contacts A3 of each of relays SD(Y), 6X, and 7Y to the coil of the corresponding relay and thence direct to terminal C.

*Relays 7V and SA.*—The stick circuit for relay SA is broken at back contact A5 of relay VC, and accordingly relay SA releases. Relay 7V is transferred from its stick circuit to its pick-up circuit by contact D3 of relay VC when relay VC picks up and relay 7V accordingly releases, because its pick-up circuit is now open at back contact B2 of relay 7Y. The pick-up circuit for relay 7V normally passes from terminal B, through back contact B2 of relay 7X, through back contact B2 of relay 7Y, #22 terminal connection between coding and storage units, front contact D3 of relay VC, and the coil of relay 7V to terminal C. The stick circuit for relay 7V is completed when relay VC releases, through front contact A3 of relay 7V, and back contact D3 of relay VC.

*Relays MI, SB, R8 and VC.*—The circuit of relay MI is broken at front contact CI of relay LO, and relay MI accordingly releases. Relay SB also releases simultaneously, because its stick circuit originates from the coil connection of relay MI. Relay R8 has its circuit opened at front contact B2 of relay LO and accordingly releases. Relay VC, which receives stick circuit energy from the same source as the relay R8, also releases.

Relays SD(Y), 6X and 7Y release simultaneously due to their stick circuits being opened at front contact B5 of relay VC.

Relay LOS has its stick circuit opened at front contact D3 of relay LO, and being of the slow release type accordingly releases at the end of its time element. The station apparatus is now restored to its normal condition ready to receive or transmit a code.

OFFICE RELAYS

Relay OLO has its circuit opened at back contact A3 of relay ORX, when the latter relay picked up at the end of the indication code, and relay OLO being of the slow release type accordingly releases at the end of its time element.

*Relays OD(81), OD1(XZYX) and OR8.*—The circuit of relay OR8 is opened at front contact D3 of relay OLO and accordingly releases. Relays OD(81) and ODI(XZYX) release simultaneously with relay OR8, as their stick circuits derive their energy from the stick circuit of relay OR8. When relays OD(81) and ODI(XZYX) release, stick circuits are provided for relays NWK and RHGK. Relay NWK receives energy from terminal B, over back contact F2 of relay OSB(81), front contact A3 of relay NWK, and back contact A5 of relay ODI(XZYX) to coil of relay NWK. Relay RHGK receives energy from terminal B, over back contact F2 of relay OSB(81), front contact A3 of relay RHGK, and back contact C1 of relay OD to coil of relay RHGK.

All OSD relays, and relays O1X, O5X, O6X and O7Y release simultaneously due to their combined stick circuit being opened at front contact D3 of relay OD.

Relay OLOS has its stick circuit opened at front contact C5 of relay OLO, and being of the slow release type, accordingly releases at the end of its time element.

As suggested before, the group of indication relays associated with each panel control the indication lamps on the panel selectively to inform the operator concerning the condition of the apparatus at the corresponding station. We have shown that the second, third, fourth and eighth elements of an indication code are given definite characters depending upon the station at which the code originates, and the office has equipment responsive to the characters of these particular elements and to the sequence in which they are received, to select the corresponding panel. At the panel selected, relay AK is controlled by the first element of the code to control the approach track indication lamp 147 on the corresponding panel.

In the particular indication code described above, the first element of the code was an "X," and relay AK at the office was energized and remains stuck up after the completion of the code. The track indication lamp 147 is therefore extinguished. If, however, a train occupies the approach section a—b, the relay IAR will be deenergized, and the first element of the code issuing from the station will be a "Y" as explained in detail hereinafter. When this code is received at the office, relay O1X will not become energized, and there will be no pick-up circuit for relay AK to hold the relay energized while relay OD1 (XZYX) is closed following the last element of the code. When relay AK is deenergized, current is supplied to indication lamp 147 direct over back contact A5 of relay AK and the lamp is lighted.

It will be understood that in all indication codes the first element is an "X" or a "Y," as distinguished from the "Z" element which initiates all control codes. The purpose of this arrangement will be explained hereinafter.

Relay TK controls track indication lamp 148 in the same manner that relay AK controls lamp 147, it being sufficient to state that in the indication code described above, the fifth element was an "X" so relay TK is energized and lamp 148 is extinguished. If section b—d is occupied, however, the resulting code from the station will have its fifth impulse a "Y," and relay TK will be deenergized because the fifth element of the code will fail to energize relay O5X controlling the pick-up circuit of relay TK. When relay TK is deenergized lamp 148 is lighted over back contact A5 of relay TK to indicate the occupancy of the corresponding section.

Since the sixth element of the indication code was an "X", relay NWK is energized, and normal switch lamp 142 is lighted over back contact A5 of relay OD(81) and front contact C3 of relay NWK. If the switch is reversed at the station where the indication code originates, terminal #34 of the field storage unit is connected, over front contact 137 and reverse contact 138 of relay 1KR, with the "Y" bus connection and the sixth element of the code will be a "Y". The resulting code will pick up relay RWK and drop relay NWK, so that lamp 142 will be extinguished, but lamp 143 will be lighted over back contact A5 of relay OD(81) and front contact C3 of relay RWK to indicate to the operator that the switch at the station is reversed. If the switch is in transit, unlocked, or stopped in an intermediate position when the code is transmitted from the station, relay 1KR is deenergized, and terminal #34 of the field storage unit is connected with the "Z" bus connection through back contact 137 of relay 1KR. The resulting code will then have a "Z" for its sixth element and both relays NWK and RWK at the selected panel will be deenergized to extinguish both lamps 142 and 143 and display a distinctive "unlocked" indication of the switch condition.

In similar manner the seventh element of the indication code is selected by contact 139 of relay 1LH and by contact 140 of relay 1RH, to produce an "X" if an eastbound signal is clear, a "Y" if a westbound signal is clear, or a "Z" if all signals are at stop. In the indication code described, the seventh element was an "X", and relay RHGK is closed to light lamp 146. Had the seventh element been a "Y" relay LHGK would have been energized to light lamp 144, and had the seventh element been a "Z", the relay RGK would have been closed to light lamp 145.

The switch and signal lamp indications of each panel are cancelled on the last element of each control code from the panel in question. Referring to the office circuit diagram (Figs. 6, 7 and 8), it will be noted that the stick circuit for relays NWK, RWK, LHGK, RHGK and RGK is transferred when relay OSB(81) picks up, from back contact F2 to the front contact F2 of the relay OSB(81). After this transfer the indication relays in question receive battery for their stick circuits from terminal B, through back contact B4 of relay OR8, #51 terminal connection between office coding and storage units, the bus connection on contacts F2 of relays OSB, front contact F2 of the relay OSB(81) in operation, front contacts A3 of the stick indication relays in question, through the back contacts of the relays OD1 and OD to the coil circuits of the indication relays. Thus all switch and signal indication relays of the selected panel are released every time chain relay OR8 picks up on a control code from the panel in question.

The reason for this arrangement is that there is no possibility of interfering with the status of the field switch and signal equipment until the last step of the code is reached. Accordingly, the record of the previous indication code is maintained as useful information until a new action progresses to the point where there is a possibility of changing the switch or signal arrangement. As soon as this point is reached, the switch and signal indications are cancelled, and the lamps remain extinguished until a new indication code is received from the corresponding station storage unit.

The circuits are arranged to cause a "flicker" of the switch and signal panel lamp indications on the last element of all indication codes affecting the panel in question.

This flicker is produced by deenergizing the lamp circuits for a short interval without in any way interfering with the circuits of the stick indication relays. This is accomplished by carrying the circuits for the switch and signal indication lamps for each panel through the back contact A5 of the relay OD of the panel in question. This flicker, of course, will occur only on indication codes that originate in the field, due to other than direct control action by the operator, for the reason that the switch and signal indication lamps are extinguished upon successful conclusion of all control codes, and remain out until relighted by an indication code. Accordingly, the only condition under which the switch and signal indication lamps are lighted during the reception of indication codes from the corresponding station storage unit is when these codes originate due to some action or change of condition in the field.

One advantage of this arrangement is that in case any condition causes a succession of repeats of an indication code without change of function, the flicker of the panel lamps will serve to identify the station transmitter that is in operation.

The track lamp indications are changed only in response to a change of conditions in the field as reported by indication codes. The track lamps are connected so that they serve at all times as direct repeaters of the track circuits that they are indicating.

Arbitrary outage or flicker of track lamp indications, as described above for the switch and signal lamp indications is objectionable on account of the graphic recorder of train movements being operated directly from the track indication circuits, as described below. Temporary arbitrary outage would erroneously record train movement on the graphic recorder. Flickers also tend to confuse the record, as a flicker in the middle of the record of a normal train occupancy of a track circuit would tend to indicate the passage of two trains during the period in question instead of one train movement. For this reason we have provided circuits so that the track indications will operate normally at all times without artificial interference by outages or flickers.

The track indication relays AK and TK (Fig. 8) have contacts A5, for control of indication lamps, provided with both front and back contacts. In case a normally lighted track model is desired by the railroad, the track indication lamps are connected through the front contacts A5. In case the railroad prefers a normally dark panel board with lamps lighted only during train occupancy, the track lamp circuits are connected through the back contacts A5 as shown in the drawings. Thus, our circuits are arranged so that by connecting the track indication lamp circuits to the front or back contacts A5 of the track relays, we can provide either a normally lighted or a normally dark track model as required by local conditions.

A single stroke bell 149 (Fig. 6) is provided for announcing the entrance of all trains into any given portions of the territory desired. The bell indications usually include two classes of information; namely, "approach" indications and "OS" indications. The "approach" indications originate from long track circuits external to but approaching the interlocking or end-of-siding territory in which switching moves are involved. The "OS" indications originate from the short track circuits that locally protect against unsafe movement of switches and are included within the interlocking home limits or "fouling" limits of the end-of-siding switch. Frequently, audible indications are desired only for announcing "approach" of trains. Accordingly, we have provided a positive two-position push button for preventing the audible indications for "OS" track circuits.

The circuit for the approach audible indication is from terminal B, through back contact C3 of relay OIX, #50 terminal connection between office coding and storage units, the bus connection on contacts A3 of relays ODI, front contact A3 of the relay ODI in operation, front contact C3 of relay AK, and the single stroke bell 149 to terminal C. It should be noted that this circuit is intact only from the instant the relay ODI picks up on the last step of the indication code until the relay AK releases due to loss of its stick circuit at back contact BI of the relay ODI. This provides for the short energization for operation of the single stroke bell. It should also be noted that this bell circuit functions only when the approach circuit is being reported occupied (relay OIX down) in combination with the stick indication relay AK in the energized position. This means that the audible indications are provided only for codes reporting train occupancy when the existing indication on the track model indicates clear track. After a given indication code drops the relay AK, all successive codes received during the period of occupancy of the track circuit in question will not give an audible indication as the relay AK is not again picked up until a track clear indication is again received. This same circuit arrangement is used for both of the track indications for each panel. The advantage of this arrangement is that each audible indication received will actually indicate another train movement rather than successive indications of the same train movement as would be the case should the bell be operated directly upon the receipt of all codes indicating track occupancy.

The gong 149 may also be operated by a circuit controlled by each relay TK similar to that traced above for the relay AK, but including the cut-out button 150 so that the operation of the gong for "OS" indications may be prevented by operating the button 150.

When an automatic record of train movements at different points of the territory is desired, we provide a graphic recorder of usual form which is built into the control cabinet and which contains an individual pen for recording the track relay operations at each point desired in the territory controlled from the office. These pens are all mounted in a row in the same order in which a train passes over the track circuits in traveling through the territory. Each pen in turn, as its corresponding track relay is released due to presence of train, is operated, and so remains until the track circuit clears. These offsets in the various lines produced by the pens represent time of train occupancy of the particular location in question.

The movement of the individual pens is produced by small electromagnets each controlled by a back contact C4 of the associated stick indication relay. Thus magnet 151 is controlled by relay AK to record the condition of section $a$—$b$, and magnet 152 is controlled by relay TK to record the condition of section $b$—$d$.

As explained above, the characters of the control code function elements 5, 6 and 7 are determined by the code setting relay OSB operated, and the position of control levers and push button of the panel associated with the given code setting relay. As the stepping relays operate, terminal B is connected successively over contacts D3 of relays OT5, OT6 and OT7 to bus wires #28, #29 and #30 (Fig. 2), and thence over contacts C2, D2 and E2 of the operated code setting relay OSB (Fig. 7) and the lever contacts (Fig. 6) to complete a circuit on each of these steps over one or another of the character busses X, Y, Z, to energize the corresponding transmitter relay on each of these steps. The characters of the indication code function elements 1, 5, 6 and 7 are likewise determined by the relay SB of the field storage unit in question and the status of the signal devices that are being indicated. Thus terminal B at contact C2 of relay M1 (Fig. 10) is connected over contacts A5 of relays T5, T6 and T7 (Figs. 11 and 12) successively to bus wires #16, #17 and #18 leading to the storage unit, and thence over contacts E5, D2 and B4 of the operated relay SB (Fig. 13) and contacts of signaling devices connected thereto, to the character busses X, Y, Z for energizing one or another of the transmitter relays of Fig. 10 on each of these steps.

The station selection elements 2, 3, 4 and 8 of control codes have their characters determined by the permanent jumper connections made on each relay OSB between the front contacts A3, C4, D4 and E4 of the relay OSB and the character busses X, Y, Z. These contacts connect the character busses to the bus wires #25, #26, #27 and #31 (Fig. 7), and thence to terminal B at contacts D3 of relays OT2, OT3, OT4, and contact A5 of relay OT8, respectively. Thus, the code for station selection is arbitrarily and permanently set for each relay OSB. A different combination of connections to the busses X, Y and Z is used for each relay OSB.

Figure 11:
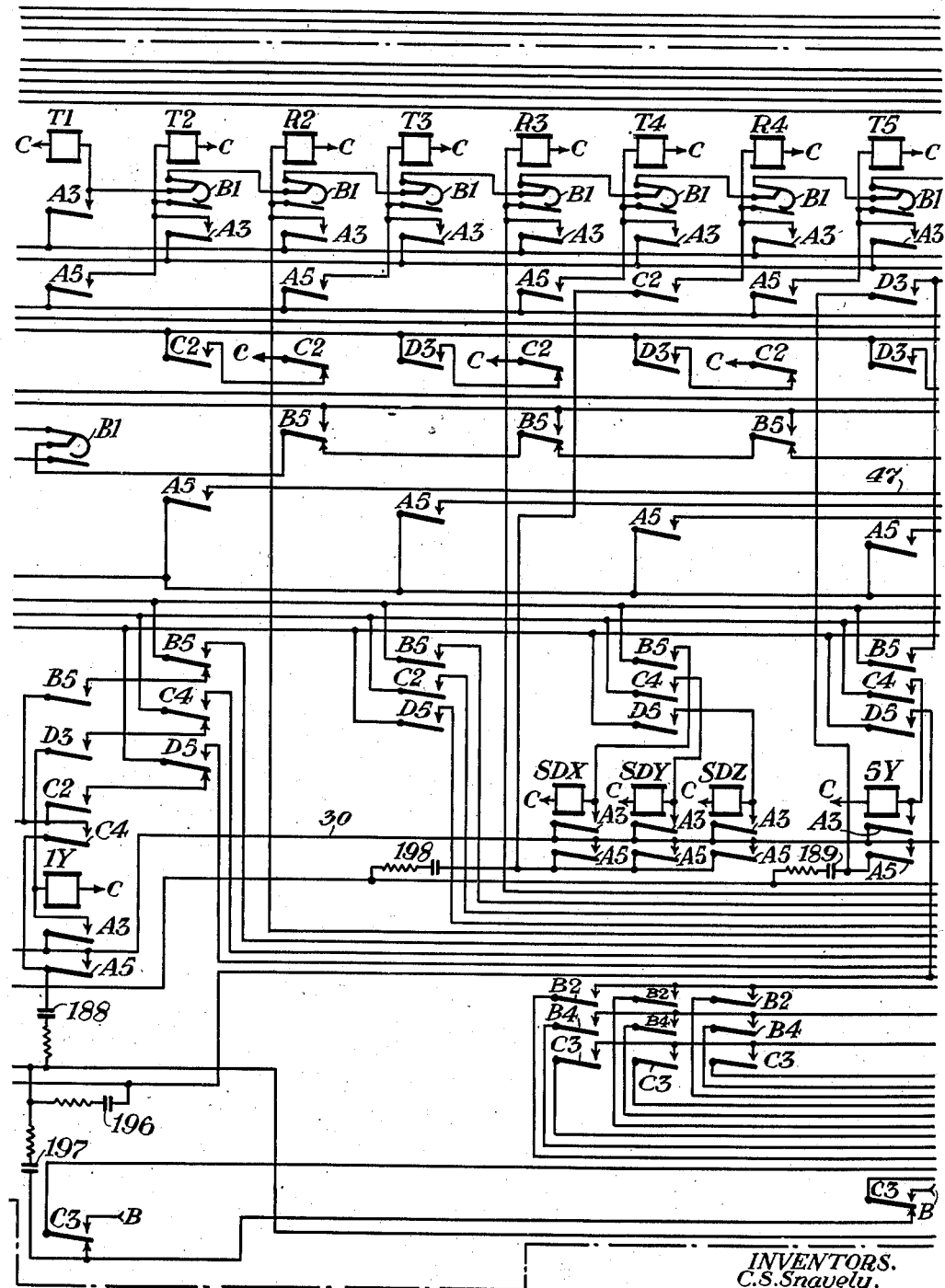

The characters of the station selecting elements 2, 3, 4 and 8 of indication codes are determined by permanent jumper connections made externally on the field coding and field storage units (see Fig. 12). The characters of the second and third steps are determined by code setting jumpers connecting terminals #47 and #53, respectively, of the field coding unit to either one or another of the character busses X, Y and Z. These terminals are connected to terminal B over contacts A5 of relays T2 and T3 (Fig. 11). The characters of the fourth and eighth steps are determined by code setting jumpers connecting #8 and #9 terminals, respectively, of the field storage unit in question to either "X," "Y" or "Z" terminals on the same unit. The storage unit terminals #8 and #9 are connected over contacts B2 and C2 of the code setting relay SB to terminals #14 and #15 of the field coding unit and thence to terminal B over contacts A5 of relays T4 and T8, respectively.

The corresponding receiving connections for selection of the correct field storage unit comprise a plurality of branched channel circuits. These extend from terminal B at contact A3 of relay RY (Fig. 10) as shown, to the bus wires #7, #8 and #9 of the field coding unit where they are divided into branches, a different branch being prepared upon each operation of the stepping relays. The branched circuits including the wires #7, #8 and #9 correspond respectively to the three characters X, Y and Z. The branches for the second step comprise connections from these wires over contacts B5, C4 and D5 of relay T2 (Fig. 11) to terminals #39, #45 and #51 (Fig. 12). One of the three terminals #39, #45 or #51 is connected to terminal #33 leading to relay R2 for code progression on the second step, depending upon whether an "X," "Y" or "Z" character is required. Similar branches extend over contacts B5, C2 and D5 of relay T3 to terminals #40, #46 and #52, and for code progression on the third step, one of the three terminals #40, #46, or #52 is permanently connected through an external jumper to terminal #34 leading to relay R3, depending upon whether this element is required to be an "X," "Y" or "Z" character respectively. The branches for the fourth step, in addition to controlling relay R4, control the relays SDX, SDY and SDZ (Fig. 11), respectively, and the contacts B2, B4 and C3 of these relays serve to divide the three branches for the eighth step into three groups of three, so that the code combinations of the fourth and eighth steps permit a maximum selection of nine individual field storage units. These nine selections are made by direct connection of the #7 terminal leading to relay D of the individual field storage unit to one of the following nine terminals of the field coding unit; namely, #38, #44, #50, #43, #49, #32, #25, #31 and #37. Each of these nine selections represents a different combination of characters for the last two station selection elements of the code. It will be seen, therefore, that the fourth element prepares a plurality of delivery circuits, and that on the last step a particular one of these prepared circuits is completed, depending upon the character of the last element. The two terminals out of each group of three that are not connected to terminals #33 and #34 for code progression are connected permanently to terminal #56 for operation of the relay KD. Likewise, all terminals in the group of nine used for selecting field storage units that are not needed at a given location are permanently connected to terminal #56 for operation of the relay KD.

The branches of the channel circuits for the intervening steps 5, 6 and 7, employed for function selection, control the intermediate register relays 5Y, 6X or 6Y, and 7X or 7Y provided these steps are of the corresponding character, and in addition control the stepping relays R5, R6 and R7. As already explained, these register relays store the characters of the corresponding code elements for simultaneous delivery to the stick relays of the proper group when the selected delivery relay is operated.

Figure 8:
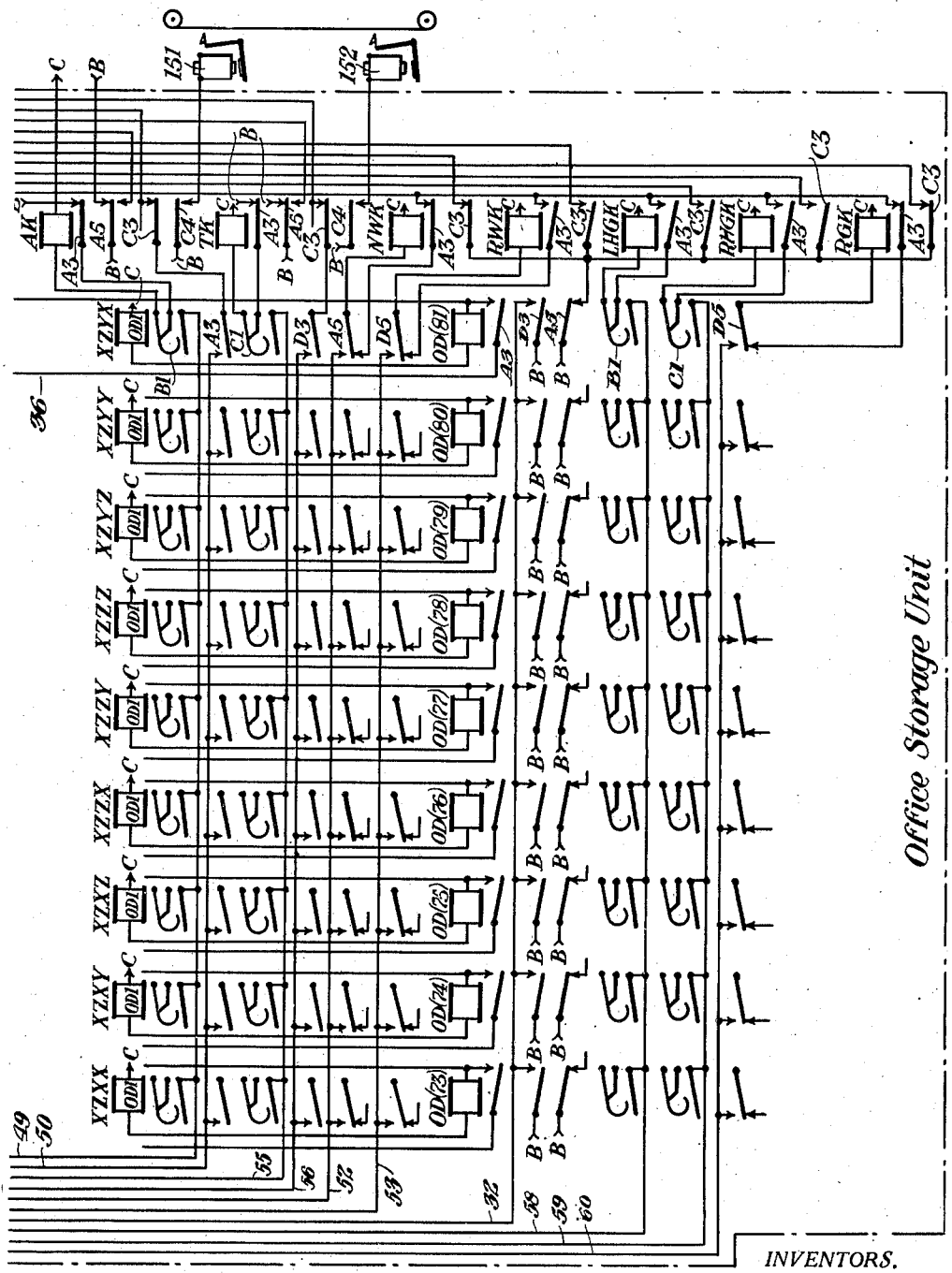
Figure 10:
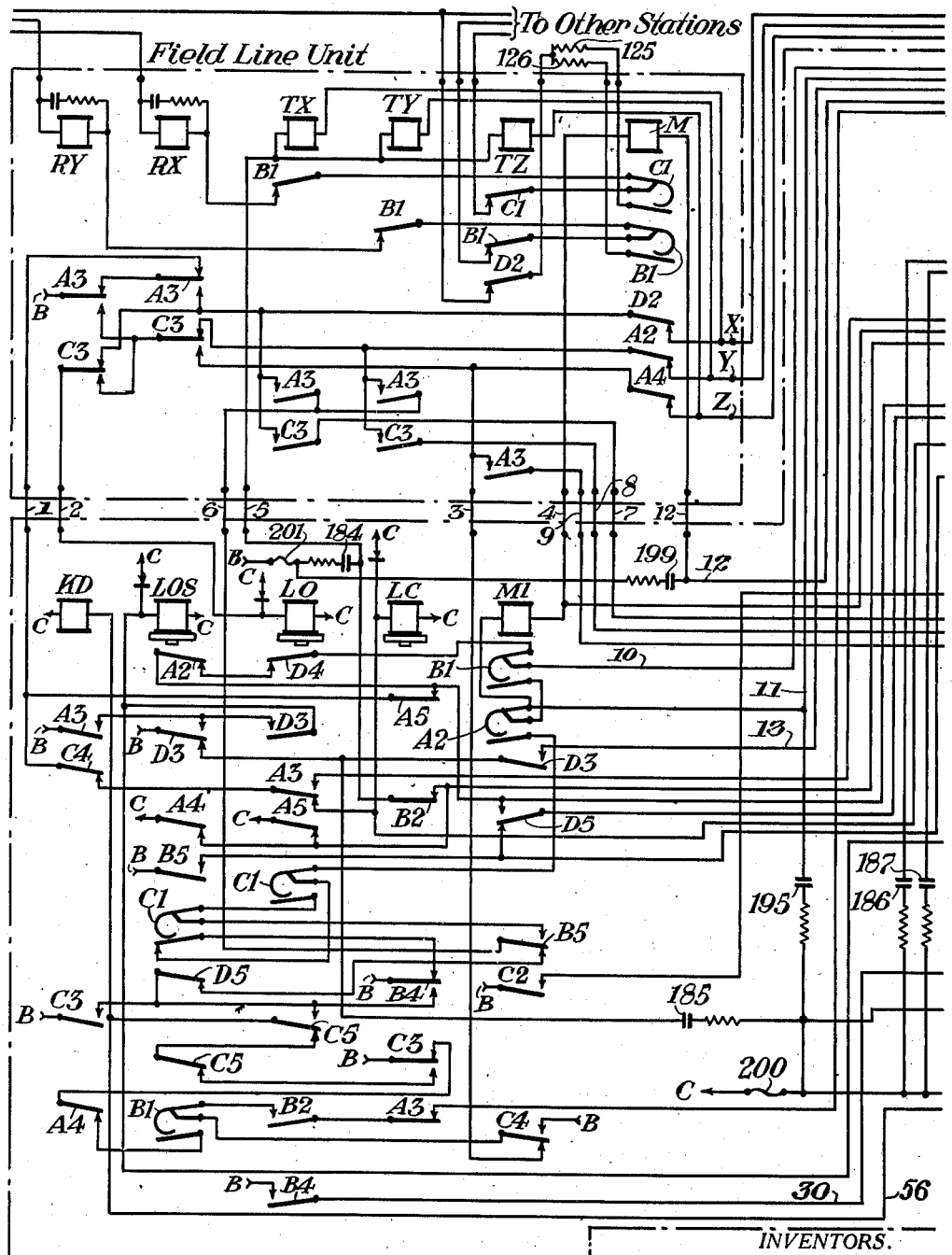

The receiving connections at the control office also include branched channel circuits, but since these are generally similar to those just described, it is believed that they will be readily understood without detailed explanation further than to point out that they extend from terminal B at contact A3 of relay ORY over terminals #10, #11 and #12 (Fig. 1) of the office coding unit to the various intermediate register relays of Figs. 3, 4, 5 and 7, and to the delivery relays of Fig. 8, and that they serve to prepare circuits for a group of delivery relays in accordance with the character of elements 2, 3 and 4 of the code, to operate a particular delivery relay in accordance with the character of the eighth element, and to effect the simultaneous operation of a group of indication devices by the delivery relay in accordance with the character of intervening elements.

The function of the knock-down relay KD of the field station coding unit (Fig. 10) is to stop the action of any given field station in response to control codes as soon as the code has progressed sufficiently far to insure that the station in question is not the one to be called by the particular control code. Thus, as far as the codes are in agreement all field stations will follow a given control code due to the code setting jumpers feeding battery to the relays R of the chain for progression. As soon as the receiving apparatus of a given station receives an element not in agreement with its local code, the code setting jumper for the character in question supplies energy to the relay KD, which stops the code, instead of to the relay R of the chain for code progression.

The relay KD when operated stops further code action by opening the stick circuit to the chain group of relays at back contact A4 of relay KD. The relay KD when picked up establishes its own stick circuit from terminal B, through front contact C3 of relay KD, front contact C5 of relay LO, and the coil of relay KD to terminal C. Thus, the relay KD remains stuck up until the relay LO releases at the end of the code action on the line circuits. Accordingly, any station when once locked out by its relay KD, remains locked out until the code action is completed, and the slow acting relays that protect the line are released.

It will now be apparent that all field stations will follow through the first step of control codes in accordance with the action previously described. On the second, third, fourth and eighth steps the field stations will either follow or drop out, depending upon the arrangement of code setting jumpers at each individual station; that is, each character received on the steps mentioned will in accordance with the code setting jumpers be connected either to the relays R of the chain for progression or to the relay KD for stopping the action.

In systems of the character here contemplated, since codes may originate at the office or at any station, special provisions must be made to avoid interference between the different codes and to prevent confusion or conflict in received indication. We will now explain how we accomplish these results, having reference also to Fig. 15 showing the line circuits.

Each field station, in order to transmit an indication code must first have its relays M and MI picked up. The relay M upon picking up opens both series line circuits on the side of the station farthest from the home plan at its back contacts CI and BI. Simultaneously, front contacts CI and BI connect the line circuits from the home office through sectionalizing resistors to compensate for the portion of the line in the rear eliminated. This line sectionalizing action, it will be noted, leaves both series line circuits permanently open through all stations beyond the station in action for the duration of the code. In effect, the field station delivering the indication code is then the farthest station from the office on the portion of the line circuits responding to code action.

In case of more than one field station starting simultaneously, it is obvious that all except the station nearest the office will receive a permanent "Z" element from the line circuits. In order to obtain code progression, however, there must be a time interval in which both series line circuits are energized between the successive deenergized intervals of code action. Accordingly all stations in the rear of a sectionalized point of the line circuit will progress through the first step of the code, but can go no farther in view of the absence of energized intervals of the line circuits. Thus, all stations in the rear of the one in action are prevented from tranmitting.

At the end of each indication code it will be noted, as traced above, that line sectionalizing relay M is released by the pick-up of chain relay R8, while the relay MI does not release until after relay LO drops. The reason for the advance release action of relay M as compared with relay MI is in order to synchronize the clearing action in the portions of the line circuits in the rear and ahead of the field station which sectionalized the line. The relay R8 releases the transmitting relay which governs the last code element for clearing the line circuits between the field sending station and the office. Thus, by also releasing relay M simultaneously with the transmitting relay (TX, TY or TZ) because of chain relay R8 picking up, the line circuits will be closed to pick up the line relays in the rear of the sectionalized point at the same time as between this point and the office. Accordingly, the slow release action of the relays LO throughout the entire territory will start at the same instant.

As regards field stations between the one that is transmitting an indication code and the office, it is obvious that in case they did not start simultaneously with the one that is sending, they will be locked out, inasmuch as the common requirement for starting of any station is that both line relays be energized at the instant of starting, and also that both the slow acting relays LO and LOS be down. If any of the in-between stations mentioned should have started simultaneously with the sending field station, it is of course obvious that the station nearest to the office would be the one to again predominate, thus preventing code transmission from all stations beyond the new sending station.

In addition, circuits are provided in the relay action of the first step at all field stations to positively prevent code action beyond the first step at any intermediate station beween a field station delivering an indication code and the office. It will be noted that all indication codes originate with either an "X" or a "Y" element, while all control codes use a "Z" element for the first step. Accordingly, a direct circuit is provided at each field station for picking up the relay KD in case either an "X" or a "Y" is received on the line as a first code step with the relay MI deenergized. In other words, in case the station in question is not sending, and it receives an "X" or a "Y", meaning that another field station is sending, then the relay KD at the receiving station is operated directly and further action of the receiving station in question is prevented. The circuit for operation of the relay KD, under these conditions, passes from terminal B, through front contact A3 of relay RY, back contact A3 of relay RX, and front contact A3 of relay TX, or from terminal B, through back contact A3 of relay RY, front contact C3 of relay RX, and front contact A3 of relay TY, thence over #6 terminal connection between field line and coding units, back contact B5 of relay MI, back contact D5 of relay LOS, front contact C5 of relay LO, and the coil of relay KD to terminal C.

Thus, assuming the receipt of an initial "X" element at a field station that is not in transmitting action, the transmitter relay TX will pick up in the usual manner simultaneously with the relay LO. The circuit just traced above will then operate the relay KD, which in turn will remain picked up due to its stick circuit until the relay LO again releases which will not occur until the conclusion of the code then being transmitted. The chain relays cannot get into action inasmuch as no energy is supplied from the "Z" circuit through #3 terminal connection between field line and coding units, and back contact C4 of relay M1, etc. to the relays of the counting chain. Since relay T1 of the chain cannot pick up, the usual agreement circuit through its contacts for operating relay LOS and releasing the line fails to function. Accordingly, relay LOS picks up only after the relay KD operates through a circuit from battery B, through front contact A3 of relay KD, front contact D3 of relay LO, and the coil of relay LOS to terminal C. Thus, the knock-down action is guaranteed before the line circuit can be released by the pick-up of relay LOS and dropping of relay TX.

In case a control code and an indication code should start simultaneously, circuits have been provided whereby the control code will take preference. The indication code will be temporarily delayed but will be transmitted after the control code has completed. As previously stated the element "Z" is used for the first step of all control codes, while all indication codes originate with an "X" or a "Y." The "X" and "Y" characters have like action as far as the check circuit is concerned, but are selected in order to give additional character to the first step of the code when registered at the control plant for indication of a field function, in the present instance, the approach section.

We will assume that an indication code has started and progressed, as before explained, to the point where the relays SA, SB, M, M1 and TX at the station have picked up. Relay TX picking up opens the "X" line and releases all line relays in that line. It will be noted that relay OTZ, which must pick up at the start of a control code, receives its pick up energy over front contacts A3 of both office line relays. Accordingly, if a control code is to start at all it must have progressed to the point where the relay OTZ is up just prior to the releasing of the relay ORX. We will assume this to be the case; that is, relay OTZ picked up just prior to the releasing of relay ORX. It is obvious that any time a field station initiates a code starting with an "X" or a "Y" element and the office succeeds in transmitting a "Z" element, the entire line will assume the "Z" character as soon as the relays in the "Y" line releases, since a "Z" character simply represents both series lines being open in place of only one or the other. While the line is assuming the "Z" character put on by the relay OTZ, the "X" character put on the line by the field station has released all the relays in the "X" line and the relay LO picks up. As soon as the relay LO picks up, the relays T1 and LOS must follow serially before the line circuit can be released at the field station, and during this time interval the relays M, M1 and SB at field station can remain picked up only through the agreement circuit originating with terminal B and passing over front contact A3 of relay RY, back contact A3 of relay RX, front contact A3 of relay TX, #6 terminal connection between line and coding units, front contact B5 of relay M1, back contact C1 of relay LOS, front contact C1 of relay LO, and front contact A2 of relay M1 to coils of relays M, M1 and SB. If, as explained above, the control station succeeds in transmitting a "Z" element, the holding circuit for relays M, M1 and SB, traced above, will be broken at front contact A3 of relay RY, when relay LO picks up, and these relays will release. Relay M releasing breaks the sectionalizing of the line circuit and places all field stations, beyond the one at which the line was sectionalized, in a position to receive a control code. The releasing of the relays M1 and SB put the station that had tried to transmit an indication code in a position to receive a control code. Releasing of relay M1 breaks its front contact D3 and disconnects terminal B from the pick-up circuit of relay TX previously described. Releasing of relay M1 also closes its back contact C4 and energy is now furnished to the chain group of relays from terminal B, through back contact A3 of relay RY, back contact C3 of relay RX, #3 terminal connection between line and coding units, back contact C4 of relay M1, etc., as described in detail above in connection with the step-by-step explanation of code operation. Accordingly, any interference with an indication code by the control station, as described above, will reset the field stations for reception and the control code will predominate. It should be noted, however, that the relay SA, which originates the indication code that was interfered with, did not release when the relays M, M1, and SB released; therefore, as soon as the control code is completed, the indication code, that was temporarily delayed, will again start action.

The transmitter relays TX, TY and TZ at the station and the corresponding relays OTX, OTY and OTZ at the office, are provided primarily for transmission of codes to the line circuits. The line relays ORX, ORY and RX and RY at each station serve to repeat the line action into each station for reception. In addition, an auxiliary set of pick-up circuits is provided for the transmitter relays through the back contacts of the line relays when the stations in question are receiving so that they may immediately transmit direct to the line each character as received from the line relays, and maintain the given character on the line circuits by local action until reception and registry of such character at the given station has been completed. It will be noted throughout the code actions already illustrated that upon reception of any code element the line relays first release, then the transmitter relays must next function to impose locally upon the line circuits the same character as received, before any further action can take place. This transmitter action, in effect, maintains the given character on the line circuits until registry action is completed. The sequence of relay operations is—line relays down, transmitter relays of like character up, after which the intermediate relay, if any, functions, the relay R of the counting chain picks up, and finally the transmitter relay releases and permits the line to clear.

Thus, the general action resulting is that when the sending station puts an element of given character on the line, the receiving station locks that element on the line, maintaining the lock until registry of the element is completed. In the meantime, the sending station completes its action and restores the line circuits. By this means the receiving station may take as much time as is needed to complete its action, provided the time element of the slow release relays is not exceeded. Thus the time of reception is entirely independent of the time required for the sending station to put the code element on the line, complete its action and drop out. This arrangement avoids the necessity of providing time margins for the several steps for character reception by excess time elements to take care of variables. Each code can progress only as fast as the slowest station in the system receiving that code permits. This action, it will be noted, automatically takes care of the natural variables in time element created by voltage changes, variations in calibration, temperature changes, etc. of the individual relays involved in the reception at different locations. Certain other incidental advantages are gained by this type of circuit inasmuch as it requires an agreement between the transmitting relays and the line relays at the transmitting station in order to maintain progression of action. Thus, if an "X" element is transmitted on a given step and for some reason, due to outside interference, the "Y" line circuit is opened simultaneously, the result as regards the line relays will be a "Z" element, which in the line unit circuits will be matched against the "X" character. Accordingly, energy is not supplied to any of the three agreement circuits at the transmitting station and coding action will be stopped. As the code in this case is not completed, a repeat action will follow after the line circuit has cleared and the slow acting relays have released.

As already stated only two series line circuits are used for producing three characters "X", "Y" and "Z" for code transmission. This arrangement uses the three line wires to the maximum advantage. As a precaution to insure that both line circuits will be opened when intending to transmit a "Z" element, it will be noted that the "Z" element is always imposed upon the line by a single contact of the transmitter relays TZ or OTZ opening the common return line wire ZL rather than by individually opening the two control line wires. Referring to the office apparatus, it will be noted that "Z" element is transmitted by back contact BI of relay OTZ. Similarly, all field stations transmit the "Z" element by the back contact D2 of the transmitter relays TZ. This arrangement is possible because the line sectionalizing action makes the field sending station the last station on the line during code action. Accordingly, the common portion of the "X" and "Y" circuits can readily be broken for "Z" character transmission without having to open the main common return line wire extending throughout the territory. By thus simultaneously opening both control circuits for the "Z" element, we have the maximum assurance of correct transmission as long as any action at all is produced. On the other hand, individual contacts CI and BI are provided on the transmitter relays TZ of the field stations for "line lock" action as the two control line wires XL and YL must be kept separated throughout the entire territory during the transmission of control codes, and these contacts have no influence on transmission of correct character of elements. Incidentally, another advantage of opening both control circuits by a single contact at the transmitting station is that the two control lines remain connected together after the line circuits are opened, and all the relays in that portion of the line which is operating on a particular code element release on closed circuit. In case there tends to be any slight difference in time of release of the relays on either line XL or YL as regards the other, the inductive impulse due to armature release of the relays in one circuit discharges into the relays of the other circuit, thus tending to synchronize the release action of both lines. In other words, the inductive "kicks" of the two lines tend to match and neutralize each other when they occur simultaneously, and in case of differences tending to exist, this factor helps in synchronizing the relay action.

In the previous discussion, we have repeatedly referred to the relay counting chain, by which we mean relays OTI, ORI, OT2, etc., at the office, and the corresponding relays at the station. The fundamental requirements of the chain relay system are: first, that integrity of the complete chain be checked before each code action; second, that the proper sequence of relay operation be insured; third, that there be no overlapping of relays due to circuit or slow release action during code progression; fourth, that the chain action be maintained as long as conditions are correct by continuous energization of a simple circuit, the breaking of which at any time will discontinue operation of the chain and reset the constituent relays for new code action. It will be noted that we have provided a special design of contact called a "continuity" transfer contact on each relay of the counting chain. This is the contact BI throughout the chain except for the relay OR8 where it is designated as contact A2. The upper member of the contact BI combination serves as the transfer element. The middle member is the back contact, which makes contact with the transfer member during deenergized periods of the relay. The lower member is what is ordinarily designated as a "front" contact and makes contact with the transfer member during the energized periods of the relay. Thus, when the relay becomes energized, the lower member must of necessity make contact with the transfer member before the contact between the transfer member and the back member can be broken. This arrangement guarantees the making of the stick circuit for each chain relay when picking up before breaking the stick circuit in the rear, which releases the previous chain relay in operation and breaks the pick-up circuit of the relay just picked up. This pick-up circuit in each case is controlled by the previous chain relay, that is, each chain relay controls the energization of the succeeding one and the deenergization of the preceding one.

Thus the sequence of action of a chain relay is: first, pick-up action starts from energy selected over a contact of previous chain relay in operation; second, the relay completes its own stick circuit approximately at armature mid-stroke; third, the next increment of motion opens the stick circuit holding up the chain relay in the rear; fourth, while the relay is completing its stroke the relay next in the rear is releasing due to loss of its stick circuit; fifth, the relay in the rear in releasing opens the pick-up circuit of the relay that just operated.

From a study of these actions, it will be obvious that they must of necessity follow in a definite predetermined sequence, each step of the sequence waiting for the next action, while at the same time these actions are of such character that the complete sequence of action is practically instantaneous. Thus, while the chain progression is positive and definite, the transfer action from one chain relay to the next is so rapid that there is practically no overlap time in the operation of the successive relays.

In studying the chain circuit it will be plain that the series circuit through the continuity transfer contacts provides a check for integrity of the chain group before starting action; also, that the chain group is controlled from a stick circuit which serves as the check and starting circuit on the first step of code action. The pick-up circuits are only effective in succession for sufficient periods of time to cause chain progression. Each pick-up circuit is individually opened the instant it has served its purpose, thus leaving only the stick circuit for control of chain progression.

Referring now to the relays OLC and LC which check the line clear, each of these relays is made slow releasing by the use of a rectifier connected in multiple with the relay circuit in such manner as to oppose the flow of current from the control circuit of the relay through the rectifier, but to furnish a path for the inductive discharge of the relay coil upon releasing, by way of the common connection through the rectifier to the control circuit, and thence through the relay coil in the normal direction. This path furnishes a low resistance snubbing circuit for the relay by means of which slow release is obtained, without interfering with the normal quick pick-up of the relay. The function of the relays OLC and LC is to repeat the clear or energized condition of the line circuits, and by means of their slow release feature to bridge deenergized periods of the line during regular code action. If either line circuit remains deenergized for a sufficient period of time to drop the relay LC, the code action will be instantly stopped, the line locks released, and the line cleared for new code action.

Relays OLC and LC are the only ones in the coding unit that are normally energized. This is done so that the units are at all times ready for instant reception and at the same time have the circuit set up for cutting the station free from the line in case of trouble. It will be noted that the relay LC not only stops all chain action instantly when releasing, but also opens the common circuit of all transmitter relays, thus at the same time releases the "line lock" and permits the restoration of the apparatus to normal without delay.

Referring particularly to relay OLC and the office circuits, it will be noted that the pick-up circuit for relay OLC is from terminal B, through front contact A3 of relay ORY, front contact A3 of relay ORX, #1 terminal connection between the line and coding units, back contact D4 of relay OLO, and the coil circuit of relay OLC to terminal C. A stick circuit is provided, receiving energy from the above circuit, as far as #1 terminal connection, and thence through front contact A3 of relay OLC, back contact B2 of relay OR8, back contacts B5 of relays OR7, OR6, OR5, OR4, OR3 and OR2, and back contact B1 of relay OT1 to the coil of relay OLC. Thus, after being released, the relay OLC cannot again pick up until relay OLO releases at the end of code action, although, as long as relay OLC remains picked up, due to its time element not having been exceeded on the open periods, it receives energy at intervals throughout the code through the stick circuit just traced.

The first element of any code deenergizes one or both of the line relays, which in turn cuts off energy to the relay OLC through #1 terminal connection just traced above. As soon as relays OT1 and OLOS pick up, a circuit for relay OLC is provided from terminal B, through front contact B5 of relay OLOS, front contact B1 of relay OT1, and coil of relay OLC to terminal C. Due to chain progression, this circuit is broken at front contact B1 of relay OT1 when the latter relay opens, but during the energized line interval the relay OLC again receives energy through the stick circuit traced above. As soon as the next code element is received, the circuit for relay OLC is again broken at the front contact of the line relay deenergized, until the element has been received and registered as indicated by relay OR2 picking up. The circuit for relay OLC is then from terminal B, through front contact B5 of relay OLOS, front contact B5 of relay OR2, back contact B1 of relay OT1, and coil of relay OLC to terminal C. Thus, relay OLC receives energy during the open line intervals of the code elements, through the front contacts B5 of the relays OR of the chain group as they pick up in turn, as well as through its stick circuit during the line clear intervals.

It will be noted that energy is supplied to the relay OLC during the open line intervals of successive code elements only through the front contacts of relay OLOS and the relays OR of the counting chain. These relays pick up only upon completion of the receiving stepping action and cut the station free from the line. The slow release feature of the relay OLC is needed to clear the line only in case trouble prevents normal completion through the chain relays. Hence, this circuit scheme annuls the slow release feature of the relay OLC by application of direct battery as long as the station can function normally, but leaves the slow release feature operative should trouble prevent code progression.

The relays LC in the field coding units function on the same principle as the relay OLC in the office except that the locking action over front contacts of the "R" relays of the counting chain is omitted for all steps of indication codes except the first or "line check" step. The pick-up circuit of relay LC passes from terminal B, through front contact A3 of relay RY, front contact A3 of relay RX, #1 terminal connection, back contact C4 of relay KD, back contact A3 of relay LO, and the coil of relay LC to terminal C. The stick circuit, which supplies energy to the relay during clear line periods, passes over the circuit traced above as far as #1 terminal connection, and thence through front contact A5 of relay LC, back contacts B5 of chain relays R8, R7, R6, R5, R4, R3 and R2, back contact B1 of relay T1, and coil of relay LC to terminal C.

The lock circuit for the first code element, whether sending or receiving, passes from terminal B, through front contact B5 of relay LOS, front contact B1 of relay T1, and coil of relay LC to terminal C. After the first code element, relay LC becomes locked up when the relays R of the counting chain pick up only in case relay M1 is released, that is, only on control codes. The circuit for relay LC then passes from terminal B, through front contact B5 of relay LOS, back contact D5 of relay M1, front contacts B5 of the various relays R of the chain group in series, back contact B1 of relay T1, and coil of relay LC to terminal C. Thus, the office relay OLC is locked up upon successful reception of each element of both control and indication codes, while the field relays LC are locked only on all steps of control codes and the first step of all indication codes. The reason for this arrangement is that all field stations take part in the action of control codes as far as their codes are in agreement. It would otherwise be possible for trouble at one particular field station, even though it was not being selected by the control code then being transmitted, to prevent successful reception at another field station which it is desired to select. With this locking arrangement, all stations in difficulty will be side-stepped and the remainder of the stations will function properly. The only way in which difficulty at a station not being called will become apparent will be to cause a delay on the element that cannot be completed, which delay will be long enough for the damaged station to drop out, after which the coding action will be completed in the remainder of the territory. On the other hand, in the case of indication codes there are only two equipments involved after the "line check" step, namely, the sending station and the office station, and if there is trouble on either of these stations the code in action will be interfered with in any case. Accordingly, the locking action is provided for the first or "line check" step, in which all stations are involved; and in case of trouble on later steps of indication codes, the time element of the relays LC will be effective for stopping code action and will thus result in an automatic repeat of the same code until it is successfully completed or until stopped by other means described later.

The particular object in providing the repeat action for indication codes is that indications of train movements supply the fundamental information to the operator at the control office for operation of the system, and as indications originate in the field, the code if lost would probably result in delaying train movements. By using the automatic repeat arrangement for indications, therefore, there is greater opportunity for successful conclusions of a code in the case of trouble in the system, and the existence of trouble is more likely to be observed by the operator, as the repeat indication code actions are indicated on the control panel by tell-tale lamps described hereinafter. In regard to the repeat action, in case of trouble on indication codes, additional margin for time of clearing the line as between the field sending and office receiving station is provided by a rectifier 154 connected to back contact B4 of relay OLC in the office coding unit. Thus, if relay OLC releases while an office transmitter relay is energized, the rectifier will provide a snubbing path from battery B, through back contacts of line repeater relays, through terminal connection 7, 8 or 9, depending upon the character of the element being received, and a back contact of relay OM, the "X", "Y" or "Z" connections, and thence through the coil of the transmitter relay that matches the element character, #5 terminal connection, back contact B4 of relay OLC, and rectifier 154 back to terminal B. The slow action of the transmitter relays in releasing prolongs the lock on the line circuits at the office and accordingly gives a greater range of time for the dropping out of the field station for repeat action in case of trouble. In connection with this repeat action pertaining to indication codes, it is necessary to introduce sufficient time element between repeat actions to insure that the receiving station can reset itself to start again. Accordingly, we have provided circuits for picking up the relay KD upon dropping of the relay LC. Circuits are also provided so that the relay KD can be picked up by relay LC dropping even at any stage of progression of the first step prior to the time that the slow acting relays all get into position for protecting code action. Thus, in case relay LO fails to pick up at the start of code action, a pick-up circuit is closed for relay KD, from terminal B, through back contact C3 of relay LC, back contact C5 of relay LOS, back contact C5 of relay LO, and coil of relay KD to terminal C. In case failure of the equipment occurs after relay LO picks up, we have a circuit from terminal B, through back contact B4 of relay LC, through front contact C5 of relay LO, and coil of relay KD to terminal C. When relay KD picks up, it opens the pick-up circuit of relay LC at back contact C4 of relay KD. Relay KD is also stuck up over front contact C5 of relay LO, and accordingly, remains picked up until relay LO drops at the end of its slow release period. On control codes, any field station failing to operate successfully will be locked out for the duration of the code by the relay KD after the relay LC drops due to local trouble. Accordingly, any station that is being side-stepped due to faulty action will be locked out for the duration of the particular code in action, but will function on the next code action the same as all other stations unless again side-stepped due to repetition of trouble. By this means, there is good opportunity for minor difficulties, such as faulty contacts, correcting themselves by repeat action and successfully completing the desired operation after several trials.

Relays OLO and LO are made slow releasing while at the same time maintaining their normal pick-up condition by the use of rectifiers connected in the same manner as described for the relays LC. These relays function to repeat the line open intervals and are provided with sufficient release time element to bridge the normal closed line intervals during which battery is cut off from the relays LO. Thus, code action progresses as long as the closed line circuit intervals do not exceed the time element of the relays LO. In case this time element is exceeded, the relays LO, which must be picked up in order to start code action will release and stop further code action until the circuits have restored to the normal condition, when the code will start over again. The relay OLO in the office and the relays LO in the field function in the same manner.

Relays OLOS and LOS are made slow releasing by the use of rectifiers in the same manner as the relays LC and LO. These relays perform the same function on the first step of a code as the relays R in the counting chain perform on succeeding steps in the code, namely, upon completion of reception and registry of the first element, they open the common circuit of the associated transmitter relays, thereby releasing these transmitter relays and unlocking the line circuit for further progression. An additional function of the relay LOS is to give an added time element after the release of the relays LO before new code action can start in order to insure that all relays LO in the system have had opportunity to release in order to be ready for reception. A station can start to receive as soon as the relay LO releases, whereas, no station can transmit until both relays LO and LOS are released. Since a station can receive with the relay LO down and the relay LOS up, an additional contact, back contact A5, is provided on relays LO to complete the common circuit of the transmitter relays so that they can pick up instantly upon reception in case this common circuit should at the time be incomplete at back contact A4 of relay LOS. It will be noted that the relay LOS is permanently energized during the code action, and its slow release feature comes into play only at the end of the code after relay LO releases. Accordingly, only the relays LC and LO have the function of bridging code elements, and the relay LC bridging action is eliminated upon the successful completion of each code element by the application of direct battery for control codes as well as the first step of indication codes.

Due to the fact that the starting circuit that initiates any particular code action remains effective until completion of the particular code in question, it is obvious that with the arrangement of slow acting relays used to protect code action, certain types of trouble might produce automatic repeats indefinitely until the code initiation circuit is broken. This feature was discussed briefly above in connection with the relays LC at the station.

In the case of control codes the starting circuits can readily be broken by direct action on the part of the operator. Accordingly, we have provided a knock-down button on the control cabinet through which energy is supplied to all relays OSA. In case of repeat action of control codes, all storages existing at the time can be broken down by pushing the knock-down button. After the chain action is stopped, the individual panels can be tried one at a time in order to locate the difficulty. If the trouble is local to the particular panel, then other panels can be used as needed independently of the defective panel.

On indication codes, in case the difficulty causing the repeat action should be in one of the field stations, it is obvious that the cut-out must of necessity be of an automatic nature. Accordingly, we have provided a thermal relay CO in each of the field storage units. This thermal relay of each unit is energized during the entire time that the relay SB of the same unit is picked up over a circuit passing from terminal B, through the cut-out relay heater coil, back contact A5 of relay COR, and front contact A3 of relay SB to terminal C. The thermal cut-out relays are designed so that they will close their front contacts only in case they are continuously energized for a period equivalent to the time required to send a number of separate codes. In actual practice, a system of the type here disclosed requires approximately one and one-third seconds to complete a code of eight elements, and the relay CO may be adjusted to have a time interval of approximately twenty seconds. Accordingly, in case one field storage unit should remain continuously in action trying to deliver a code for a time longer than twenty seconds, the thermal relay will close its front contact and energize relay COR. A stick circuit for relay COR is made from terminal B, through back contact C3 of relay EV, front contact A3 of relay COR, and coil of relay COR to terminal C. Relay COR is thus picked up and stuck up permanently until relay EV picks up to open the stick circuit for relay COR. Relay COR, picking up, stops the repeat action and prevents any further indication code action from this unit as it opens and maintains open the common circuit of the relay SA at the back contact C3 of the relay COR. Relay EV picks up only upon receipt of a control code, and accordingly, the lock-out persists until a control code is received in the storage unit in question. Thus in case of repeat action on an indication code extending beyond the duration of the time element of the thermal relay, the storage unit in question is cut out due to the circuit for relay SA being broken and being maintained open until receipt of another control code at this storage unit. The new control code, by picking up the relay EV will drop the relay COR, and as soon as the line clears will start the whole action over again, in which case it will cut out again provided the code cannot successfully complete itself.

In order to give the operator full knowledge as to the condition of the line circuit and nature of the action taking place at any time, we have provided two separate tell-tale lamps 155 and 156 on the control panel located just above the knock-down button. (See Fig. 6.) One of these lamps 155 repeats control codes and the other lamp 156 repeats indication codes. Thus in case of automatic repeat action, the operator can determine whether he should use the knock-down button at the control plant or whether the action is caused externally, in which case the cut-out will follow automatically. Furthermore, these lamps are connected so that one or the other will indicate at all times in case of any interruptions of either or both series line circuits. The purpose of this arrangement is to give immediate indication in case of any failure of the main control channels of the system. The circuits for the tell-tale lamps originate over the contacts of the line relays, passing from terminal B, through the back contacts of either or both of relays ORX and ORY, #2 terminal connection between line and coding units, back contact C1 of relay OLO, front contact C5 of relay OM, #23 terminal connection between coding unit and panel, and the control code lamp 155 to terminal C. In case the relay OM is down during code action, as will be the case when a code is being received at the office, this tell-tale circuit will follow the same path traced above as far as back contact C5 of relay OM, and thence passes through #24 terminal connection between coding unit to panel, and the indication code lamp 156 to terminal C. When relay OLO picks up, transfer is made so that current flows from terminal B, over front contact C1 of relay OLO, and front contact C5 or back contact C5 of relay OM, etc., as traced above.

In connection with control code starting circuits, it will be noted that the relays OSA are each operated independently by an individual starting button. Accordingly, storages may be made individually, or in any combination desired, at any time desired, regardless of the condition of the line circuit. In case multiple storages are made, the sequence in which control codes are delivered is determined by the series "hunting" circuit from #20 terminal connection between office coding and storage units, through the back contacts A5 of the relays OSA in series until the first panel is reached containing an energized relay OSA, where the series circuit will be diverted by the relay OSA through its front contact for operation of the associated code setting relay OSB for delivery of the control code. Likewise, after each control code is completed a new search is automatically made through this same series "hunting" circuit for the next relay OSA that is picked up, which in turn selects its relay OSB for delivery of its control code. Thus, it is obvious that the control code will be delivered serially in the order in which the series "hunting" circuit through the relays OSA is wired for selection of the code setting relays OSB. It should be noted that any relay OSA picking up breaks the series "hunting" circuit for all relays OSB beyond, and that the relay OM picking up immediately after the relay OSB, breaks the "hunting" circuit for all relays OSB in advance. Accordingly, only one relay OSB can be picked up at a time for delivery of control codes regardless of when storages of relays OSA are made, and regardless of the location of the relays OSA either in advance of or beyond the relay OSB in action.

Control codes may be stopped at any time before completion by operating the starting button on the panel sending the code. The common circuit of the code setting relay OSB is connected through the back contact of the starting button. As the relay OSB must be picked up for control code progression, further action is stopped instantly upon pressing the starting button. Pushing the starting button during code action instantly cancels the rest of the code in operation. This same action automatically creates a new storage which causes a repeat of the same code until it succeeds in completing itself. If repeat action is not desired after cancelling any particular code, all storages can be cancelled by pushing the knock-down button before releasing the starting button. This feature gives the operator full control of all codes even during progression. Thus, in case a code for a given set-up is initiated and a change of plans is desired, the code action can be stopped instantly, the panel set-up changed, and the new code immediately sent out upon release of the starting button, provided, of course, that other control storages have not been made in the meantime on panels in advance of the panel in question. In case it is desired to stop the action entirely, the starting button should be held in until the knock-down button is operated and both buttons then released in the same sequence. This sequence of operations stops all further control code action until new storages are made by again operating the starting buttons.

It will be remembered that the transmission on an indication code was initiated by the completion of a starting circuit for relay SA at the station. In the particular case described in detail above, the starting circuit closed was one controlled by the route relay IRH and passing over front contact C3 of relay 7V. The relay SA has other circuits however, an individual starting circuit being provided for each element of information to be transmitted to the office. These circuits are all connected in multiple to the relay SA so that any one of the circuits can independently pick up the relay SA for starting an indication code. These starting circuits are arranged so that they become energized only on a change of status of the field equipment function being indicated. The relay SA remains energized until a complete indication code from the unit in question has been delivered. The energy is cut off the starting circuits by the action of the relays V at the end of the indication code. Thus, the status of the starting circuits depends upon the relative position of the function itself or its repeater relay, and the relay V associated with it.

As an example, the switch indication code starting circuit passes from terminal B, over a contact 157 of the relay KR, the front contact of which is connected to field storage unit terminal #43 and the back contact to terminal #49. Inside of the storage unit, #43 terminal is connected to front contact C3 of relay 6V, while #49 terminal is connected to back contact C3 of relay 6V. The middle member of the contact C3 of relay 6V is connected, through the coil of the relay SA, back contact A5 of relay VC, and back contact C3 of relay COR to terminal C. The stick circuit of the relay SA is made through its own front contact A3. This starting circuit, it will be noted, is energized only when relay KR and relay 6V are both picked up, or when they are both released. It will be noted that relay 6V is provided with a circuit passing from terminal B, through the back contacts B2 in series of relays 6X and 6Y of the field coding unit, #21 terminal connection between field coding and field storage units, front contact C5 of relay VC, and the coil of relay 6V to terminal C. A stick circuit is provided from battery B, through front contact A3 of the relay 6V, back contact C5 of relay VC, and the coil of relay 6V to terminal C. Since the switch normal and switch reverse indications are always transmitted with "X" and "Y" elements respectively, and since the relay VC is operated only on the last step of indication codes, it will be noted that the relay 6V will be left deenergized on the last step of indication codes reporting the switch locked up, namely, in which either the intermediate relay 6X or 6Y is picked up. If both relays 6X and 6Y are deenergized, which position reports a switch unlocked condition, then the relay 6V will become energized upon the pick-up of the relay VC and remain energized through its own stick circuit upon deenergization of the relay VC. Thus, the relay 6V will be left in the energized position by all codes reporting the switch unlocked, and in the deenergized position by all indication codes reporting the switch locked up.

Since the relay KR repeats the switch condition at all times, it will be obvious that a change of the switch condition will shift the position of the neutral contact of relay KR and create a starting circuit through the contact of relay 6V. This starting circuit will operate the relay SA, which will remain picked up through its own stick contact until an indication code reports the change of condition of the switch movement. The relay 6V is then reset on the last step of the indication code, depending upon the condition of the switch movement at the time the indication code was delivered.

Thus, assuming the indication code to have reported the switch unlocked, the relay 6V will be left in the picked-up position and further starting circuits will be broken through the relays KR and 6V until the relay KR again picks up. Hence, each action of the station equipment creates a starting circuit, which remains closed until the action is reported by an indication code at the end of which the relay V is reset and starting action cut off. It will be noted that the relays V are reset directly from the intermediate storage relays of the coding unit, which in turn are operated directly from the line relays of the line unit. Thus, the starting action is not disabled merely because of an indication code having been delivered, but is actually reset in accordance with the character of the indication as directly repeated back into the local station by the line relays. This arrangement gives maximum assurance against loss of indication codes as the starting action is not opened until a code of correct character has actually been received by the line circuit.

It should also be pointed out that the relay VC (Fig. 13) is normally operated on the last step of the indication code, but even then does not receive energy if the office equipment does not succeed in receiving the last element of the code and in restoring the line circuits to normal within the time limits of the slow acting relays of the sending station. In other words, the relay VC receives energy over a circuit including the front contacts of the line relays and of relay R8, which circuit requires both line circuits to be closed after transmission of the last element of the code before the transmitting station is dropped out by release of the relay LO. Thus, even if the field transmitting station puts the last element of the code on the line correctly, but the office equipment for some reason fails to complete the reception of the last character, a repeat code action will result as the relay VC at the sending station in this case will not receive energy and accordingly the relays V will remain in their original positions, maintaining the original starting circuit until an indication code is successfully received by the office, or until the thermal relay in the field storage unit is operated due to continuous repeat codes.

As indicated above, the starting circuits under the control of the signals, are closed when either route relay 1LH or 1RH changes its position. It will be noted that this starting circuit connects with terminal #54 of the field storage unit (and thence to back contact C3 of relay 1V) over front contact 160 of track relay 1TR and back contact 161 of relay 1TP in parallel. If a route relay 1LH or 1RH is energized to clear a signal at the station, and a train enters the track section the signal will be restored to the stop indication and the relay 1LH and 1RH will become deenergized. Contact 160 of relay 1TR will then be open, however, and the starting circuit will be held open during the slow release time of relay 1TP. When back contact 161 of relay 1TP closes, the starting circuit is completed, and the indication code is delivered to report a stop signal to the panel at the office. As will be described hereinafter, the operation of relay 1TP also closes another starting circuit for reporting the presence of the train in the section, and the contacts 160 and 161 are inserted in the signal starting circuit to insure that the signal starting circuit and the detector track starting circuit are closed at the same time, thus reporting the signal at stop and the section occupied by a single indication code.

The starting circuts for the track indications originate over relays 1K and 5K, which repeat the status of track circuits through terminal connections #32 and #33 respectively. Thus, the starting circuit for the approach indication depends upon the relative position of the relays 1K and 1V, while the starting circuit for the indication of track section b—d, is controlled by the relays 5K and 5V.

It will be noted that the starting circuit action described for signal and switch operation is fully automatic, so that in case of a change of function and a rapid return to its initial position, a starting circuit would of course be created and maintained by the stick circuit of the relay SA, but the code reported might, in this case, be the condition existing after the second change, which of course would be the same as the original existing indication. This arrangement is perfectly satisfactory for switch and signal positions of the equipment because the operator always wants to know the final status of these devices, which is exactly what is automatically reported.

In the case of the track sections, the full automatic action for the occupied indication may result in the loss of a record of train movement in the case of, for instance, a light engine running at speed over a short track section such as used for protecting against unsafe operation of switch movements. Accordingly, a stick circuit has been provided in the control of the track repeater relays 1K and 5K so that after being deenergized they cannot again pick up until after the relays V associated with them have functioned. Referring to the relays 1K and 1V, the pick-up circuit for relay 1K is from terminal B, through front contact 162 of relay 1AR, #32 terminal connection, front contact A3 of relay 1V, and coil of relay 1K to terminal C. The stick circuit is provided by the front contact A3 of relay 1K connected in multiple to contact A3 of relay 1V. The circuits for the fifth step which reports the condition of the approach section a—b are identical to those just described for the first step. Thus, after the relay K is dropped due to passage of a train over the track section in question, it must of necessity remain down until the occupancy is reported to the office by an indication code, which code resets the relay V and permits the relay K to act as a direct repeater again until arrival of another train. This arrangement for guarding against the loss of track indication is of particular advantage when the automatic train graph is used, as this system insures a record for all train movements passing through the territory.

In case of the simultaneous change of status of two or more devices that are indicated from the same field storage unit, the result will be identical with that resulting from a change of one device only. The only difference is that two or more of the starting circuit branches will simultaneously deliver energy to the relay SA for initiation of an indication code. One indication code will, of course, include all of the changes, and the relays V will be reset at the successful conclusion of the indication code, so that all of the starting circuits will be cut off, provided, of course, that all the conditions of the devices were all correctly reported in the code completed.

Since we have constructed this system so that any combination from one up to nine field storage units may be connected to and operated from one field coding and one field line unit, it is, of course, natural that frequently simultaneous storages will be made in different storage units associated with the same coding unit. In this case the general scheme of functioning is similar to that already described in connection with the office equipment, namely, that a hunting circuit connected through contacts of the relays SA in series will locate the first storage unit in the circuit having the relay SA picked up. This storage unit will deliver its code. As soon as the line again clears, energy will be furnished through the same circuit to locate the next storage unit, and so on in order until all of the codes are delivered. This circuit in question is the one connecting from field coding unit terminal #10 to the first storage unit through the back contact A5 of the relay SA of the first storage unit, through #12 terminal connection of first storage unit to #10 terminal connection of the second storage unit, etc. In case of simultaneous change of function of field equipment affecting field storage units connected to different coding and line units, the action resulting will be that of two different field stations starting simultaneously. This action has already been described.

The circuits for determining the characters of the various steps of the indication codes are prepared through contacts of the relay SB in the field storage unit that succeeds in getting into action. These circuits have already been traced in the indication code illustrated herein. In the case of the track circuits, each of the indication code elements is selected over the front or back contacts of the relays K to give either an "X" or a "Y" element respectively, while in the case of the switch and signal indications, the individual elements are connected through terminal connections #34 and #35 to select between three-way circuits to give an "X", "Y" or "Z" element, respectively. It is obvious from the nature of these circuits that as far as the code system is concerned, it is immaterial what functions the indication steps perform; that is, any device the functions of which can be repeated by a two or three-way circuit in order to give character to the indication steps can be indicated on any of the function steps. Thus, frequently spare code elements are used for indicating from various points in the field, such conditions as power supply "on" and "off", also in the case of pneumatic equipment reporting low air pressure, etc.

The five relays of each field storage unit having the "S" suffix are used for direct control of the functions of the signal system. The relay 5YS, as explained above, through its front contact C3 and through terminals #40 and #41, directly controls the call-on relay ICH, which while ordinarily used for controlling a call-on signal can, if preferred, be used for any other purpose desired.

The relays 6XS and 6YS are ordinarily used for control of switch movements, while the relays 7XS and 7YS ordinarily serve as signal controls. The switch and signal groups of relays directly control repeater relays external to the storage unit. All of the standard signal circuits having to do with safety of the signal system operation may be associated with the external repeater signal relays. It will be appreciated that the control relays of the field storage units serve only as a means of manually controlling the signal system functions. All signal protection is included in the circuits external to the coding equipment between the repeater relays and the devices controlled thereby.

A pair of contacts A5 and B4 is provided on each of the code control relays of the sixth and seventh steps for control of the external repeater relays. These circuits on the sixth step are arranged to illustrate the application of polar control, while the circuits of the seventh step illustrate the arrangement used when neutral relays are preferred as external repeaters. It will be noted that either or any of these combinations can be provided by choice of external connections to the terminals of the field storage units. The control circuits are made identical on both steps so that these steps may be used interchangeably for controlling switches or signals.

The terminal B connection that feeds the stick circuits of the sixth and seventh step code relays through terminals #44 and #46 respectively, as well as the common connections to all four relays through terminals #50, #51, #52 and #53 respectively, are brought out in order to give full interchangeability for control of switches and signals. For example, terminal B is connected directly to the stick circuit for the switch relays through terminal #44, while the signal relays stick circuits, extend through terminal #46, over back contacts 205 and 206 of relays ILH and IRH in series to terminal B. A front contact 207 of relay ITR is connected in parallel with the contacts of relays ILH and IRH of the signal system in order that the signals may be given the stick function, that is to trip upon the passage of train movement. In the case of switch movements, it is desired, when a movement is for any reason stalled, to automatically break down the control circuit. For this purpose, the thermal time element relays h1 and h2 are ordinarily provided in conjunction with the switch movement. These relays when receiving excess current for a given time interval will open their contacts and thus open the control circuit. The circuits through these contacts are shown connected to terminals #50 and #51. When the code relays are used for signal control, their common connections go direct to terminal C as shown through terminals #52 and #53.

Special stick circuits for the sixth and seventh step code control relays are furnished in addition to the regular stick circuits. These special stick circuits, shown connected through terminals #45 and #47, are used in connection with switch control only, in order to prevent change of switch control during conditions determined by external circuits. Some railroads prefer that no change of switch condition be possible when the approach track sections are occupied, due to train approaching. Accordingly, this direct stick circuit is included, which when energized prevents the relay that is picked up from dropping, and hence due to the cross check of the pick-up circuits of these relays through the back contacts of the opposing relays, it will be impossible for the operator to set up the reverse control condition. As shown in the drawings, the special stick circuits for relays 6XS and 6YS are carried over front contacts A3 of these relays to terminal B through back contact 163 of the locking relay IS. It follows, that if the relay IS is deenergized, as by the approach of a train to a clear signal, the circuits prevent a change in the position of the switch by retaining locally the circuit for that one of relays 6XS or 6YS which is then energized.

Contacts C3 on the relays 6XS and 6YS are used in connection with polar contacts of the switch relay KR to form an agreement circuit to insure that the switch position is in agreement with the last control code issued before the signal repeater control relays can clear. This is simply an auxiliary check feature, provided to fit in with the general scheme of signal circuits ordinarily used, and was described in detail above in connection with the signal control circuits.

It will be clear from an examination of these circuits, particularly in view of the means provided for varying the connecting circuits externally, that the system is arranged to give maximum flexibility and interchangeability. It is obvious that this system can be used for control of anything that can be governed by means of an electric circuit, and can indicate anything with which starting and character circuits, as described above, can be associated.

When more track indications are required at any field location than can be handled by the storage units necessary for the control of the switches and signals, additional similar storage units can be added, and due to the interchangeable features of the storage units, all four indicating code elements (first, fifth, sixth and seventh) may be employed for reporting track circuits. The sixth and seventh step indications use only the "X" and "Z" characters; "X" for clear track, and "Z" for occupied track. These connections, of course, are entirely external to the unit.

As already described the relay EV is picked up on the last element of every control code received in the storage unit in question. Indication codes are initiated automatically only due to change of status of devices located at the station. Accordingly, if the station device last controlled fails to respond or in case a control code should be issued without including any change of function, there will be no automatic initiation of a return indication code. Since the control code on its last step extinguished the switch and signal indication lamps on the panel, and as in the case cited no indication code is returned, the lights on the panel will be left extinguished, thus calling the attention of the operator to incomplete action. Should the operator issue another control code to the same storage unit before return of an indication code, the last code element, upon receipt at the field station will select the field storage unit by connecting terminal B to the circuit for relay D as usual through terminal connection #7, but the circuit in this case will be completed over back contact D4 of relay SB, and front contact A5 of relay EV, directly to the relay SA, and thence to terminal C, for initiation of an indication code. The relay SA, picking up, opens the circuit of the relay EV at its back contact C3. The relay EV thus being immediately released transfers the final code element energy from terminal #1 through its back contact A5 direct to the coil of the relay D. Thus two control codes in succession will directly cause the relay SA to be picked up so that an indication code will be returned as soon as line conditions permit, regardless of the status of the regular starting circuits, and thence to terminal C, so that relay D is also energized. This indication code will then restore the lamp indications on the office panel in accordance with conditions existing at the time in the field.

The relays of a system of the type here disclosed are obviously subjected to frequent and severe usage, and we have provided spark arresters each consisting of a resistor and a condenser to absorb the inductive discharge present when a relay becomes deenergized to minimize the sparking at relay contacts. Condensers have been selected for use in this system in view of the high degree of protection that can be obtained by the condenser-resistor method as well as because of the negligible influence that the condensers have on the speed of operation of the system. The condensers are connected to the relay circuits in such manner that they will absorb the inductive discharge of the relay coil when releasing and accordingly, eliminate arcing of the control contact that is being opened to cause the relay to release. Resistors of proper value are in all cases connected in series with the individual condensers in order to damp oscillation of the discharge between the coil and condenser.

Due to the line relays being operated in a series circuit, the condenser and resistor combination is connected individually across the coil circuit of each individual line relay. This arrangement permits the absorption of the inductive discharge of the line relays individually by each condenser and resistor group. Accordingly, the condensers are subjected to much lower maximum electromotive force with this arrangement than would be the case should the condensers be connected in multiple with the control contacts. For instance, the potential across the control contact at the time of breaking the line circuit would be the summation of the inductive discharges of all of the line relays in series, whereas, with the scheme as used the individual discharges of the relays are absorbed locally by the individual condenser and resistor combinations. The connections of the condenser and resistor elements around the line relays are shown within the dot and dash lines of the office line and field line units.

The condenser connections for all office code relays except the line relays, described above, are shown within the dot and dash lines enclosing the office coding unit. Since in quite a number of cases small groups of the office coding relays function either serially or selectively from a common circuit, it is possible to arrange the condenser protection so that one condenser may serve to protect the contacts of several or a small group of relays. In the case of the chain group, it was found possible, by addition of a single contact on each of the relays, to provide contact protection by use of only two condensers. In the case of the intermediate storage relays located under the chain group, one condenser is provided for all of the intermediate relays of each step.

Since the circuits of practically all of the storage group of relays are controlled from contacts of relays located in the coding unit, the condensers for the storage unit relays are likewise connected to the stick holding circuits, and are located in the coding unit.

With this scheme of connection, the condenser, it will be noted, is connected direct to the coil circuit of the relay that is energized through the stick circuit and stick contact of the relay in question. When the stick circuit control is broken, the condenser receives the discharge due to its connection being made between the point of break and the relay coil until the stick contact of the relay in question opens and breaks the connection between the relay and condenser. Thus, the condenser absorbs practically the entire discharge of the relay, inasmuch as it is connected during the time that the magnetic flux of the relay decreases to the release point of the armature, and in addition until the armature has actually opened to its mid stroke. The electromotive force dissipated after this point in the relay operation is practically negligible. The contacts provided on the chain group of relays for connecting the condensers to the individual relays as they become energized, function in an identical manner.

For ready reference, the condensers and the relays in connection with which they are used are given below.

| Condensers | Associated relays |
| --- | --- |
| 164 | OTX—OTY—OTZ. |
| 165 | All OSA relays. |
| 166 | OT1—OR2—OR3—OR4—OR5—OR6—OR7. |
| 167 | OT2—OT3—OT4—OT5—OT6—OT7—OT8. |
| 168 | O1X. |
| 169 | O5X. |
| 170 | O6X—O6Y. |
| 171 | O7X—O7Y. |
| 172 | OR8—All OD1 and OD2 relays. |
| 173 | All NWK and RWK relays—For contact protection of pick-up circuits. |
| 174 | All LHGK—RHGK and RGK relays—for contact protection of pick-up circuits. |
| 175 | OM and All OSB relays. |
| 176 | All NWK, RWK, LHGK, RHGK and RGK relays—protection of knock-down circuits. |
| 177 | All OSD relays on second code step. |
| 178 | All OSD relays on third code step. |
| 179 | All OSD relays on fourth code step. |
| 180 | All AK relays. |
| 181 | All TK relays. |

It will be noted that the condensers complete their circuit through direct connection either to terminal B or terminal C, condensers 164 and 165 being connected to terminal B while the remaining of the condensers are connected to terminal C. The connections to terminal B are first combined and passed through fuse 182. Likewise the connections to terminal C are grouped and passed through a similar fuse 183. This scheme of connections is used and fuses provided so that in case any individual condenser should short circuit, it will directly connect terminals B and C through the resistance associated with the condenser and through the low current fuse. The resistor in this case will protect against burn-out of the circuit but will permit sufficient current to pass to blow the low current fuse. The open circuit at the fuse thus automatically opens the circuit through the condenser to the operating circuit, so that further code action can continue. In order to interfere with code action, it would be necessary to have at least two condensers short circuited at the same time. Open-circuited condensers will, of course, not interfere with code action.

Thus, while we have provided protection against sparking of contacts, we have at the same time provided means by which the protective elements will be prevented from interfering with code action in case of trouble. In case of a broken down condenser, the only handicap will be the absence of spark protection from the time of the burn-out until the trouble is remedied at the time of the next inspection of the unit.

Spark protection for contacts of the field coding relays is provided in the same manner as already described for the office equipment. The condensers, except those associated with the line relays, are shown within the dot and dash lines enclosing the coding unit.

The following is a list of the condensers located in the coding unit and the relays with which they are associated.

| Condensers | Associated relays |
|---|---|
| 184 | TX—TY—TZ. |
| 185 | TX—TY—on first step of indication codes. |
| 186 | T1—R2—R3—R4—R5—R6—R7. |
| 187 | T2—T3—T4—T5—T6—T7—T8. |
| 188 | 1Y. |
| 189 | 5Y. |
| 190 | 6X—6Y. |
| 191 | 7X—7Y. |
| 192 | R8—VC—D. |
| 193 | 6XS—6YS—6V. |
| 194 | 7XS—7YS—7V. |
| 195 | M1 and SB relays. |
| 196 | KD. |
| 197 | 1V—5V—5YS. |
| 198 | SD(X)—SD(Y)—SD(Z). |
| 199 | M. |

The above condensers are all connected through the low current fuses 200 and 201 to terminal C, except condensers 184 and 199 which are connected to terminal B. Thus, the same fuse protection is provided for the field equipment as has been described for the office equipment.

All field stations are provided with special switches and circuits by means of which the line circuit can readily be sectionalized at any given point or any particular station entirely bypassed. The switches and associated circuits are best shown on Fig. 15. The sectionalizing switch 202 is shown as a double pole double throw switch and functions when thrown into the upper position to sectionalize the line circuit at the given location in the same manner as the relay M functions when sending an indication code. That is to say, the switch 202 opens both series line circuits in the rear and creates a new connection for the series control circuits from the home office through the local sectionalizing resistances 125 and 126, through back contact D2 of relay TZ, and direct to the common line wire ZL.

The station by-pass switch shown as a four-pole double-throw switch 203 serves to by-pass the entire station in question including the line relays and transmitter relays of the line unit. The four-pole switch when thrown into the upper position automatically introduces resistors 204 and 205 into the line circuits to compensate for the line relays that are by-passed in this operation. Thus, in case of line trouble normal operation can be quickly restored up to the point at which the proper sectionalizing switch is operated. In case of local trouble in a given station, it can be temporarily by-passed by operation of the station by-pass switch.

While we have based this disclosure on a concrete system such as has been provided to meet present railroad requirements, it is obvious that the natural scope of this system is unlimited in principle, it being determined only by practical considerations. For instance, any number of additional steps may be provided in the chain group. Each additional step in the chain group that is provided for station selection multiplies the total number of possible selections by three. On the other hand, each step added in the function group adds one control function and one indication function to each station of the installation. It should also be borne in mind that while we have here illustrated a system employing two separate line circuits to provide three channels of communication, additional line circuits may be employed to increase the total number of channels and hence the possible characters available on each step. Changes of this character will obviously increase the capacity of the system or permit the performance of the same number of functions in a shorter time.

Since the time required for operation of a system of train dispatching is a matter of prime importance, it should be pointed out that our system possesses certain peculair advantages in this respect. The apparatus operates on the sequence principle, selection between different stations and different office panels in accordance with the sequence in which code elements of definite characters are received, and it is therefore unnecessary to provide time margins to insure proper operation or to prevent operations of devices in improper order. The counting chains and associated parts must operate in a definite sequence or not at all, and each step in the operation represents a necessary function. The general scheme of operation takes advantage of natural variables which would affect variation in the time required for operation of the system, such as variable voltage on relays, variable time constants due to temperature changes, variation of relay calibration due to natural changes, such as contact spring adjustments, core pin lengths, quality of magnetic circuits, etc. Each relay uses exactly the time required for functioning, no more and no less. Thus temporary low voltage will slow up code action, while higher voltage accelerates the action.

Furthermore, the system guards against improper operations in a number of particulars.

For example, the receiving equipment, both at the office and at each station, requires that the codes shall have the proper number of elements, and no function is performed until the last element of the code is received. Any abnormal delay during a closed or open circuit interval of a code will prevent further operation of the counting chain and positively prevent the transmission of an improper control or indication. After the chain has once been stopped, the apparatus automatically resets to its normal condition and prepares for a new code. The circuits further check that the counting chain has reset by requiring the chain to be in its initial or normal condition before permitting a cycle of operation to commence.

In case an open circuit occurs in either the transmitting or receiving apparatus, further code progression is prevented, the apparatus resets, and the code is repeated. Due to the fact that each circuit operation depends upon the successful completion of the preceding circuit operation, this check is direct and positive.

An important feature of our invention resides in the line lock by means of which each code element is reproduced locally by opening the proper line wires at the receiving station to prolong the element until the appropriate registration has been completed. This permits the speed of the system to adjust itself automatically to meet existing conditions while insuring that sufficient time is provided for performing the necessary operation on each step of the received code. The additional check provided by the agreement circuits between the transmitter relays and line relays on each step is also a valuable feature. If the character actually transmitted to the line circuits does not correspond with the controlled condition of the transmitter relays, the counting chain progression is stopped, the apparatus resets, and the code is repeated from the beginning. Still further precautions are taken with respect to indication codes to prevent loss of an indication code, because, as we have explained in detail above, the starting circuit, once closed, remains effective until the last element of the proper code has been delivered to the line circuit and actually received at the office.

Apparatus embodying our invention also has the advantage of minimizing the interference that defective circuits can cause with the operation of the system as a whole. For example, during control codes, all field stations participate in the code action as long as the control code agrees with such field station code, thus assisting to regulate code progression. When trouble develops at a station, however, that station is cut out and normal operation continues to the remaining stations. During the transmission of an indication code, there are only two stations in operation after the completion of the first or locking step. Even on this first step however, trouble at any station will result in removing that station from operation and normal operation will continue. This feature of permitting a damaged or defective station to drop out without disabling the remaining stations is effective on any step of any code, and the circuits are protected, even when no code is on the line circuits, by the normally energized line check relay LC which becomes deenergized and prevents improper code action at a station in case the line circuits are defective.

Another feature of advantage in maintaining uninterrupted service is the provision we have made for stopping control code action, causing repeats, cancelling storages, etc., and for stopping automatic repeat codes from a station while permitting the operator to reinstate the code transmitter at a station to verify the condition of the apparatus at that station. For all of these reasons, the system is under the complete and continuous control of the operator, who is informed, by means of the various elements of our system of all essential conditions which must govern him in controlling train movements.

Still another advantage possessed by apparatus embodying our invention is that the system may be readily adapted to different installations without fundamental change. This arises in part from the fact that the same standard line, coding and storage units are used at all field stations regardless of the number or nature of the devices to be controlled or indicated at that station. Each station requires a line unit, a coding unit, and a sufficient number of storage units to provide the control and indication codes required to operate the devices at the station. For example, a standard four track interlocking layout having six cross-overs and the necessary complement of signals would require five storage units all operated from a single line and coding unit. Another feature that contributes to the flexibility of the system is that individual field stations and office panels may be added or removed without affecting the remainder of the apparatus in any way. Still another feature is the provision of means for employing the individual elements of the codes interchangeably. Thus, any function element of a control code or an indication code may be used to operate any suitable device, and we do not wish to limit ourselves to the particular arrangement of station devices or panel indicators here shown.

Although we have herein shown and described only one form of remote control system embodying our invention, it is understood that various changes and modifications may be made therein within the scope of the appended claims without departing from the spirit and scope of our invention.

Having thus described our invention, what we claim is:

1. In apparatus for communicating between two points including means for establishing a plurality of communication channels between such points and comprising means at one said point for creating a series of code elements by selectively modifying the electrical conditions of said channels, the combination of a plurality of circuits at the other point each arranged to be operated when an individual one of said code elements is delivered to said channels, a chain of counting relays at said other point, means for advancing a step in said chain each time one of said circuits is operated, and means controlled by said counting chain for separately registering the character of each code element.

2. In apparatus for communicating between two points including means for establishing a plurality of communication channels between such points and comprising means at one said point for creating a series of code elements by selectively modifying the electrical conditions of said channels, the combination of a plurality of circuits at the other point responding selectively to each said code element according to the channel or channels which are controlled during such element, a chain of counting relays, means for operating the relays of said chain progressively in response to successive operations of said circuits, and means including said counting chain selectively responsive to the sequence of operation of said circuits.

3. In apparatus for communicating between two points including means for establishing a plurality of communication channels between such points and comprising means at one said point for creating a series of code elements by selectively modifying the electrical conditions of said channels, the combination of a plurality of circuits at the other point responding selectively to each said code elements according to the channel or channels which are controlled during such element, a chain of counting relays, means for operating the relays of said chain progressively in response to successive operation of said circuits, and receiving means controlled by said counting chain and responsive to the circuit which is operated during each code element.

4. The combination, with a plurality of line circuits extending between two spaced points and each including transmitting contacts at one point and a line relay at the other point, and means for operating said transmitting contacts one at a time in a predetermined sequence, of a chain of counting relays, means responsive to successive operation of said line relays for operating the relays of said chain progressively, and means controlled by said chain and selectively responsive to the sequence of operation of said line relays.

5. The combination, with line wires extending between two points to provide a plurality of communication channels and means at one point for controlling said channels selectively in a predetermined sequence to produce a complete code having a series of code elements, of a plurality of circuits at the other point responding selectively to each code element in accordance with the channels controlled during individual code elements, a plurality of sets of receiving apparatus each identified with one element of the complete code and each operating when placed under the control of said circuits to respond selectively to the character of the code element then being delivered to said channels, a chain of counting relays, means for operating the relays of said chain progressively in response to successive code elements, and means controlled by said chain for successively placing said sets of apparatus under the control of said circuits.

6. The combination, with line wires extending between two points to provide a plurality of communication channels and means at one point for controlling said channels selectively in a predetermined sequence to produce a complete code having a series of code elements, of a plurality of circuits at the other point responding selectively to each code element in accordance with the channels controlled during individual code elements, a plurality of sets of receiving apparatus each identified with one element of the complete code and each operating when placed under the control of said circuits to respond selectively to the character of the code element then being delivered to said channels, a chain of counting relays, means for operating the relays of said chain progressively in response to successive code elements, means controlled by said chain for successively placing said sets of apparatus under the control of said circuits, a plurality of sets of indication means, means controlled by certain sets of receiving apparatus for selecting a particular one of said sets of indication means, and means for controlling the selected set of indication means in accordance with the condition of certain other sets of receiving apparatus.

7. Transmitting means for remote controlling apparatus including a plurality of communication channels, a plurality of transmitting contacts each arranged when operated to control an individual one or combination of said channels to produce a code element, a chain of counting relays, means for operating the relays of said chain progressively in response to successive controls of said channels, a movable device, means effective upon operation of said device to initiate operation of said counting chain, means controlled by certain relays of said counting chain for operating said contacts selectively in an arbitrary sequence, and means effective when a particular relay of said chain is operated to operate a selected one of said contacts in accordance with the position of said device.

8. Transmitting means for remote controlling apparatus including a plurality of communication channels, a plurality of transmitting contacts each arranged when operated to control an individual one or combination of said channels to produce a code element, a chain of counting relays, means for operating the relays of said chain progressively in response to successive controls of said channels, a plurality of movable devices, means effective upon operation of any device to initiate operation of said counting chain, means controlled by certain of said counting relays for operating said contacts selectively in an arbitrary sequence depending upon the particular device which was operated, and means effective when a particular relay of said chain is operated to operate a selected one of said contacts depending upon conditions determined by the operated device.

9. Remote controlling apparatus comprising a plurality of normally closed and energized line circuits each including a line relay, a plurality of transmitter relays each arranged when operated to open a particular one of said line circuits, an additional transmitter relay having a single contact included in all said line circuits, and means controlled in part by said line relays for operating said transmitter relays selectively in a predetermined sequence.

10. In a remote controlling system of the code type, a code setting relay, code transmitting means effective when set into operation to produce a code having a first element of a particular character and subsequent elements determined by said relay, means for setting said transmitting means into operation, a pick-up circuit for said relay closed during the first element of said code provided only such first element is of said particular character and a stick circuit for said relay controlled by said transmitting means, and operating to hold the relay energized until the end of the code.

11. In combination with a line circuit, a code setting relay, transmitting means effective when said relay is energized to alternately open and close said line circuit for brief time intervals to produce a code, means for energizing said code setting relay, a slow release relay, means for energizing said slow release relay each time said line circuit is open, and a circuit including a front contact of said slow releasing relay for maintaining said code setting relay in its energized condition.

12. In a remote control system of the code type, a starting device, a master relay and a code setting relay, transmitting means set into operation by actuation of said starting device, means requiring the energization of said master relay to continue the operation of said transmitting means to produce a code the character of which depends upon said code setting relay, a pick-up circuit for the code setting relay controlled by said transmitting means and including a back contact of said master relay, a pick-up circuit for said master relay including a front contact of said code setting relay, and holding circuits for said master relay and said code setting relay controlled by said transmitting means.

13. In combination with a plurality of groups of movable devices, transmitting means for producing a code having a series of code elements of determinable characters, means for initiating operation of said transmitting means from any of said groups, means responsive to the group from which the transmitting means became operated for determining the character of spaced elements of said code, means responsive to the condition of the devices in such group for determining the character of intervening elements of said code, and means responsive to the character of each element of said code.

14. In combination with a control office and a plurality of stations, a group of devices at each station, transmitting means at each station for delivering to said office a code made up of a series of code elements of determinable characters, means at each station for determining the character of spaced elements in a code delivered by the associated transmitting means in accordance with the station at which the code originates, means for determining intervening elements of each such code in accordance with the condition of the devices at such station, a plurality of panels at the office, indication means associated with each panel, and means selectively responsive to said codes and operating to select a particular panel in accordance with the characters of said spaced elements and to control the indication means associated with such selected panel in accordance with said intervening elements.

15. In a remote control system comprising a plurality of line circuits each including a line relay, means for controlling said circuits selectively in a predetermined sequence to produce a complete code, a line checking relay controlled by said line relays and arranged to be energized when any line relay is deenergized, and means for indicating the condition of said checking relay.

16. In a remote control system comprising a line circuit including a line relay and extending from a control office to a field station, means at the office and at said field station for separately supplying codes to the line circuit by repeatedly opening said circuit, a master relay at the office energized only when a code is being delivered to the line circuit from the office, a slow releasing line checking relay at the office arranged to be energized each time said line relay becomes deenergized, a pair of indicators, and means controlled by said checking relay for operating one said indicator or the other according as said master relay is energized or deenergized.

17. In combination with a plurality of normally closed line circuits each including a line relay, means for selectively opening said line circuits in a predetermined sequence to produce a complete code, a slow releasing checking relay, means for energizing said checking relay each time one of said line relays is deenergized, a chain of counting relays, means responsive to said code and effective only if said checking relay is energized to operate the relays of said counting chain progressively, and receiving means controlled by said counting chain and selectively responsive to said code.

18. In combination with a plurality of normally closed line circuits each including a line relay, transmitting means effective when operated to selectively open said line circuits in a predetermined sequence, means for initiating operation of said transmitting means, a first checking relay arranged to be energized when all said line relays are energized, a second checking relay arranged to be energized when any line relay is deenergized, and means requiring both said checking relays to remain energized for continuing the operation of said transmitting means to produce a complete code.

19. In combination with a plurality of normally closed line circuits each including a line relay, transmitting means effective when operated to selectively open said line circuits in a predetermined sequence to produce a complete code, a first checking relay arranged to be energized when all said line relays are energized, a second checking relay arranged to be energized when any line relay is deenergized, and receiving means responsive to said code when and only when both said checking relays are energized.

20. In a system of remote control comprising a normally closed line circuit including a line relay, means for periodically interrupting said line circuit to produce a complete code, a slow releasing checking relay, means for energizing said checking relay when said line relay is energized, apparatus arranged to be operated progressively in response to periodic operation of said line relay, means for preventing operation of said apparatus if said checking relay opens, and means controlled by said apparatus for energizing said checking relay during the first period of deenergization of said line relay in a code.

21. In a system of remote control comprising a normally closed line circuit including a line relay, means for periodically interrupting said line circuit to produce a complete code, a slow releasing checking relay, means for energizing said checking relay when said line relay is energized, apparatus arranged to be operated progressively in response to periodic operation of said line relay, means for preventing operation of said apparatus if said checking relay opens, and means controlled by said apparatus for periodically energizing said checking relay while said line relay is deenergized during said code.

22. In a remote control system comprising a line circuit including a line relay, code transmitting means effective when actuated to periodically control said line circuit to cause alternate energizations and deenergizations of said line relay, a master relay and a code setting relay, means for setting said transmitting means into operation, means requiring energization of said master relay to continue the operation of said transmitting means, means controlled by said code setting relay in its energized condition for determining the character of the code produced by said transmitting means, a pick-up circuit for the code setting relay controlled by said transmitting means and including a back contact of said master relay, a pick-up circuit for said master relay including a front contact of said code setting relay, a first checking relay arranged to be energized during said code but to open its front contact if the open period of said line circuit exceeds a predetermined value, a second checking relay arranged to be energized during said code but to open its front contact if the closed period of said line circuit exceeds a predetermined value, and holding circuits for said master relay and said code setting relay controlled by front contacts of said first and second checking relays.

23. In combination with a control office and a plurality of line stations, a line circuit extending from said office through all said stations in series, a master relay at each station, transmitting means controlled by the master relay at each station and including the portion of the line circuit extending from such station to the office for delivering codes originating at such station to the office, a checking relay at each station arranged to be energized when said line circuit portion between such station and the office is open but having a time interval sufficient to bridge the normal periods of closed circuit in said codes, a sectionalizing relay at each station effective when the corresponding master relay is energized to open the portion of said line circuit extending to all stations more remote from the office, means effective upon the operation of the line relay by the final element of a code to release the associated sectionalizing relay to deenergize all checking relays at the same instant, and starting means at each station for at times energizing the corresponding master relay effective only when the checking relay at the corresponding station is deenergized and the portion of the line circuit extending from such station to the office is closed.

24. In a remote control system, an office and a station, means at the office for transmitting control codes made up of a locking element having the same character for all control codes and other elements of selected ones of at least three possible characters arranged in a distinctive pattern, receiving means at the station selectively responsive to control codes having locking elements of said particular character, means at the station for transmitting indication codes each made up of a locking element of a character different from the locking element of a control code and other elements of a selected one of at least three possible characters arranged in a distinctive pattern, and receiving means at the office selectively responsive to indication codes having locking elements of said different characters.

25. In combination with an office and a station, a movable device at said station, means controlled from said office for transmitting to said station a control code having a locking element of a particular character and a function element of a selected charatcer, control means at the station for operating said device in accordance with the character of the function element of said control code, means controlled from the station for transmitting to the office an indication code having a function element the character of which depends upon the condition of said device and a locking element the character of which depends upon other conditions adjacent said device but is different from the character of locking elements of control codes, means at the station for preventing operation of the associated control means in response to a code containing a locking element of the character employed in indication codes, indication means at the office, and means responsive to a code containing a locking element of said particular character but not to a code containing a locking element of said different character to control said indication means in accordance with the characters of the function element and locking element of such code.

26. In a remote control system of the code type, a starting circuit, means for at times closing said starting circuit, a transmitter for producing a code when said starting circuit is closed, stopping means effective upon the completion of said code to open said starting circuit, and timing means operating upon the failure of said stopping means to open said starting circuit and the consequent repeat of said code to automatically discontinue the operation of said transmitter after a measured time interval.

27. In a remote control system, an office and a station, a movable device at said station, means at the station for transmitting an indication code in accordance with the condition of said device, an indication relay at said office, means controlled by said indication code for selectively energizing said indication relay, a stick circuit for said indication relay operating to hold the relay energized after the termination of said indication code, transmitting means at the office for delivering a control code to the station for operating said device, and means controlled by said transmitting means for breaking said stick circuit at the conclusion of the last element of said control code.

28. In a remote control system, an office and a station, a movable device at said station, means at the station for transmitting an indication code in accordance with the condition of said device, an indication relay at said office, means controlled by said indication code for selectively energizing said indication relay, a stick circuit for said indication relay operating to hold the relay energized after the termination of said indication code, a chain of counting relays at said office, means for energizing the relays of said chain progressively, transmitting means controlled by said counting chain for delivering a control code to said station for operating said device, means operating when said transmitting means is set into operation to break the normal stick circuit for said indication relay, and a temporary stick circuit for said indication relay closed during operation of said transmitting means and including a back contact of the last relay of said counting chain.

29. In combination with an office and a station, a plurality of movable devices at said station, transmitting means at said station for delivering to the office an indication code the character of which depends upon the conditions of said devices, an indication lamp at the office, means comprising an indication relay selectively responsive to an indication code from said station to energize said indication lamp to signify the condition of a corresponding device at the station, and means responsive to an indication code from said station which does not change the condition of said indication relay for briefly interrupting the circuit for said lamp.

30. In a remote control system of the code type, a normally closed line circuit, a starting circuit, means for selectively closing said starting circuit, transmitting means operating when said starting circuit is closed to repeatedly open said line circuit to produce code elements and for closing such line circuit after each such code element, a stopping relay effective when energized to open said starting circuit, and means requiring the line circuit to be closed after the last element of a complete code for energizing said stopping relay.

31. In a remote control system of the code type, a normally closed line circuit, a starting circuit, means for selectively closing said starting circuit, transmitting means operating when said starting circuit is closed to repeatedly open said line circuit to produce code elements and for closing such line circuit after each such code element, receiving means normally responsive to each code element to register such element, means controlled by said receiving means for holding said line circuit open during each code element until the registering means has completed its operation, a stopping relay effective when energized to open said starting circuit, and means requiring the line circuit to be closed after the last element of a complete code for energizing said stopping relay.

32. In combination with a movable device, two relays, a pick-up circuit for one relay including a contact of the other relay and controlled by said device, a stick circuit for said one relay controlled by said device, transmitting means controlled jointly by said relays for producing a code, and means responsive to a code produced by said transmitting means for controlling said other relay.

33. In a remote control system of the code type, an office and a station, means at the office for transmitting control codes to said station, receiving means at the station selectively controlled by said codes, means at the station for transmitting indication codes to the office under the control of said receiving means, and means at the station responsive to the reception of two successive control codes for automatically initiating an indication code.

34. In a remote control system of the code type, an office and a station, means at the office for transmitting control codes to said station, a plurality of devices at said station, receiving means responsive to a control code for selectively controlling said devices, transmitting means at the station effective when operated to deliver to said office an indication code the character of which depends upon the conditions of said devices, automatic means controlled by said devices for setting said station transmitting means into operation, and other means responsive to the reception of two consecutive control codes without an intervening indication code from said station for setting said station transmitting means into operation.

35. In a remote control system of the code type, an office and a station, means at the office for transmitting control codes to said station, a plurality of devices at said station, receiving means responsive to a control code for selectively controlling said devices, transmitting means at the station effective when operated to deliver to said office an indication code the character of which depends upon the conditions of said devices, automatic means controlled by said devices and effective when one of said devices is operated for setting said station transmitting means into operation, a relay at said station arranged to be energized when a control code is received at the station, means for subsequently holding said relay energized only until an indication code is delivered from said station, and means effective if a control code is received at said station when said relay is energized to set said station transmitting means into operation, even though none of the station devices has been operated.

36. In a remote control system of the code type, transmitting means for delivering codes made up of elements of different characters arranged in a predetermined sequence, a series of delivery relays, means responsive to certain elements of said code for preparing circuits for a plurality of said delivery relays, means for registering the characters of certain other elements of the code, means responsive to the last element of the code for completing a particular one of said prepared circuits to operate the corresponding delivery relay, a plurality of sets of indication devices one set for each delivery relay, and each set containing a device corresponding to an individual portion of said registering means, and means effective when any delivery relay is operated to place each of a plurality of the individual devices of the associated indication means simultaneously under the control of the corresponding portion of said registering means.

37. In a remote control system of the code type, means for transmitting a code made up of a series of code elements each having a selected character, a pair of delivery relays, means effective during the last element of said code to energize said delivery relays in series, an indication relay, means effective when one of said delivery relays becomes energized to control said indication relay selectively in accordance with the code just completed, and an indication device controlled by said indication relay and by the other delivery relay.

38. In a remote control system of the code type, means for transmitting a code made up of a series of code elements each having a selected character, a chain of counting relays, means for energizing the relays of said chain progressively in response to said code, a pair of delivery relays, means controlled by a particular relay of said chain for energizing said delivery relays in series, means controlled by one said delivery relay for operating the last relay of said counting chain, a stick circuit for said delivery relays controlled by said last relay of the counting chain, and indication means controlled jointly by said delivery relays.

39. In a remote control system of the code type, means for transmitting codes each including selecting elements and a control element which has a selected one of at least two possible characters, an indication relay, receiving means selectively responsive to said selecting elements to seize said indication relay, and responsive to said control element to energize the relay provided the control element of the code then being received has a particular character, a stick circuit for subsequently holding said indication relay energized, and an indication device effective only when said indication relay is picked up and set into operation upon the reception of a code having selecting elements to seize said indication relay but having a control element of a character different from that required to energize the relay.

40. In a remote control system of the code type, means for transmitting codes each including selecting elements and a control element which has a selected one of at least two possible characters, an indication relay, receiving means selectively responsive to said selecting elements to seize said indication relay, and responsive to said control element to energize the relay provided the control element of the code then being received has a particular character, a stick circuit for subsequently holding said indication relay energized, an audible signal, and means effective only when said indication relay is picked up and set into operation upon the reception of the last element of a code having selecting elements of the proper characters to seize said indication relay but having a control element of a character different from that required to energize the relay.

41. In a remote control system of the code type, a control office and a field station, means controlled from the office for delivering to said station control codes all having initial locking elements of a particular character, transmitting means controlled from the station for delivering to the office indication codes, a master relay arranged to be energized during operation of said transmitting means, receiving means at the station, and means effective when said master relay is deenergized and selectively responsive to the character of the locking element of each control code for operating the receiving means selectively in response to each such control code.

42. A remote control system comprising a control office and a series of line stations, means controlled from the office for transmitting to all said stations control codes all having initial locking elements of a particular character, transmitting means at each station for delivering to the office and to all preceding stations in the series indication codes all having initial locking elements of another character, a master relay at each station arranged to be energized during operation of the associated transmitting means, stepping means at each station operated progressively in response to a code received at such station, and means at each station operating when the associated master relay is deenergized and selectively responsive to a locking element of said other character to prevent operation of the stepping means at the corresponding station.

43. In a remote control system a plurality of normally closed line circuits each including a line relay, means for selectively opening said line circuits in a definite sequence to produce a complete code of separate code elements, receiving means effective when operated to respond selectively to said code, a slow releasing checking relay arranged to be energized when any of said line relays is deenergized, means responsive to the first element of a code to set said receiving means into operation provided said checking relay is deenergized, and means controlled by said checking relay for continuing the operation of said receiving means.

44. In a remote control system a plurality of normally closed line circuits each including a line relay, means for selectively opening said line circuits in a definite sequence to produce a complete code of separate code elements, receiving means effective when operated to respond selectively to said code, a first slow releasing checking relay arranged to be eenrgized when any of said line relays is deenergized, a second slow releasing checking relay, means effective during the first element of a code for energizing said second checking relay, a stick circuit for said second checking relay including a front contact of said first checking relay, means requiring both said checking relays to be deenergized to initiate operation of said receiving means, and means for subsequently completing operation of said receiving means provided said checking relays are both energized.

45. In a remote control system a plurality of normally closed line circuits each including a line relay, means for selectively opening said line circuits in a definite sequence to produce a complete code of separate code elements, receiving means effective when operated to response selectively to said code, a first slow releasing checking relay arranged to be energized when any of said line relays is deenergized, a second slow releasing checking relay, means including a back contact of said first checking relay for energizing said second checking relay when all said line relays are energized, means responsive to the first element of a code for setting said receiving means into operation, means controlled by said receiving means for energizing said second checking relay during the intervals between successive elements of a code, and means controlled by front contacts of both said checking relays for completing the operation of said receiving means.

46. In a remote control system, a plurality of normally closed line circuits each including a line relay, transmitting means effective when operated to open said line circuits selectively in a definite sequence to produce a complete code of separate code elements, a first slow releasing checking relay arranged to be energized when any of said line relays is deenergized, a second slow releasing checking relay, means including a back contact of said first checking relay for energizing said second checking relay when all said line relays are energized, means controlled by a back contact of said first checking relay and a front contact of said second checking relay for initiating operation of said transmitting means, means controlled by said transmitting means for energizing said second checking relay during the interval between successive code elements, and means controlled by front contacts of both said checking relays to complete the operation of said transmitting means.

47. In a remote control system, a plurality of normally closed line circuits each including a line relay, transmitting means effective when operated to open said line circuits selectively in a definite sequence to produce a complete code of separate code elements, a first slow releasing checking relay arranged to be energized when any of said line relays is deenergized, a second slow releasing checking relay arranged to be energized when all said line relays are energized, a third slow releasing checking relay, means controlled by a front contact of said second checking relay and back contacts of said first and third checking relays for initiating operation of said transmitting means, means responsive to the first element of the resulting code for energizing said third checking relay, a stick circuit for said third checking relay controlled by a front contact of said first checking relay, and means controlled by front contacts of all said checking relays for completing the operation of said transmitting means.

48. In a code receiver responsive to code signals made up of a series of elements each having a selected one of a plurality of possible characters, a series of counting relays one for each code element, registering apparatus for certain of said code elements selectively responsive to the characters of the corresponding elements, means for operating the first said counting relay in response to the first element of a code; and means controlled by each counting relay for preparing a circuit for the next succeeding counting relay to render such relay responsive to the corresponding element of the code, each such circuit being prepared only if the preceding counting relay is operated by the preceding element and in the case the preceding counting relay has registering apparatus associated therewith, provided also such registering apparatus is operated in accordance with the character of such element.

49. A code receiver responsive to code signals made up of a series of elements each having a selected one of a plurality of possible characters, comprising a series of counting relays, one for each code element, a series of register relays for registering the character of the code elements including one set for each element; means for selectively operating each register relay by the code element of corresponding character and for also operating the corresponding counting relay when said element is received, provided, in case of each element except the first, that the counting relay for the next preceding element has been operated by its code element; means controlled by each register relay when operated and by the corresponding counting relay for operating the next succeeding counting relay when the next code element is received, whereby the operation of each counting relay of the series is made dependent upon the registration of each preceding code element.

50. A selector of the counting relay type comprising a series of counting relays interconnected so that they may be successively energized, and a series of stick relays for registering selected successive code elements; a pickup circuit for each of said stick relays and for each of said counting relays, including a front contact of the counting relay for the next preceding code element, the pickup circuits for the counting relays for each element adapted to be registered also including the front contact of the corresponding register relay, whereby the operation of the counting relays for registerable elements is made dependent upon the registration of said elements; and holding circuits for each counting relay including a back contact of the next succeeding counting relay.

51. In combination, a plurality of normally closed line circuits, a line relay in each of said line circuits, a plurality of transmitter relays each having a back contact in one of said line circuits, a series of counting relays; means for energizing alternate relays of said series one at a time in sequence over the front contacts of said line relays when all of said line relays are energized, and for energizing the remaining relays of said series one at a time in sequence over the back contacts of said line relays when any of said line relays is deenergized in response to the repeated operation of said transmitter relays in a selected sequence; a plurality of circuits for said transmitter relays, each circuit including the winding of a selected transmitter relay, and a front contact of one of said alternate counting relays, whereby the energization of all of said line relays is adapted to actuate said transmitter to open a selected one of said line circuits; and each of said circuits also including a back contact of the next succeeding counting relay, whereby the release of any line relay is adapted to release said transmitter to again close the corresponding line circuit.

52. In combination, a normally closed line circuit, a line relay included in said circuit, a transmitter relay having a back contact in said line circuit, a series of counting relays; means for energizing alternate relays of said series one at a time in sequence over the front contact of said line relay, and for energizing the remaining relays over the back contact of said line relay, in response to repeated operation thereof; and a plurality of circuits for said transmitter relay each including a front contact of one of said alternate counting relays and a back contact of the next succeeding counting relay.

53. A centralized traffic controlling system for railroads comprising a series of field stations along the track and a control office, a line circuit connecting each of said stations with said office, a selector relay for each of said stations at said office, a plurality of traffic governing devices at each of said stations, an indication stick relay at said office for each indicating position of each of said devices; a pickup circuit for each of said indication relays including a front contact and a holding circuit including a back contact of the selector relay for the corresponding station; means at said office operable to transmit a control message to effect the control of the traffic governing devices at the corresponding station over said line circuit and arranged to release each of the indication relays for said station when said message is transmitted; means at said station set into operation in response to the completion of said control message and operating over said line circuit for energizing said selector relay and selected ones of said indication relays in accordance with the position of said devices and to then release said selector relay to hold the selected indication relays energized; an indication lamp for each indication relay, and a circuit for each of said lamps including a front contact of the corresponding indication relay and a back contact of the corresponding selector relay; whereby each of said lamps is extinguished during the interval between the transmission of a control message and the reception of the succeeding indication, and is also extinguished momentarily while an indication is being received even though the indication does not directly follow a control message.

54. In combination, a code receiver for operating movable devices and a code transmitter for indicating the position thereof, a delivery relay for operating said devices, an auxiliary relay, means for operating said delivery relay in response to the final element of a received code provided said auxiliary relay is then deenergized; means for energizing said auxiliary relay at the termination of said final code element, a starting relay for initiating the operation of said transmitter, means controlled by each of said devices for energizing said starting relay in response to a change in position of such device, means effective when said starting relay is energized for releasing said auxiliary relay, and means effective on the final element of a received code for energizing said starting relay provided said auxiliary relay is then energized.

55. A remote indication system for railroads comprising an office and a plurality of stations, each adapted to transmit indications of track conditions to the office and including at the office a register relay for registering a received "track clear" indication, a plurality of delivery relays at the office, one for each station, an audible signal, a plurality of indication relays at the office, one for each indication to be received from a station, a visual indicator for each indication relay; a pickup circuit for each indication relay including a front contact of the register relay and a front contact of an individual delivery relay, a holding circuit for each indication relay including its own front contact and a back contact of said individual delivery relay, a plurality of circuits for the audible signal, all including a back contact of the register relay, and each including front contacts of a delivery relay and of the corresponding indication relay, means effective when a "track clear" indication is received from a station to energize the register relay and the delivery relay corresponding to said station to pick up the corresponding indication relay, means for energizing said delivery relay but not said register relay when a "track occupied" indication is received to momentarily actuate the audible signal and to then release said indication relay, and means for continuously energizing the visual indicator in one position of said indication relay.

56. In combination, a plurality of starting relays, a plurality of manually operable starting buttons, an actuating circuit for each starting relay controlled by the associated starting button, transmitting means operating when any starting relay is actuated to produce a code the character of which depends upon the particular starting relay actuated, a knock-down button, a restoring circuit for each starting relay controlled by said transmitting means, and a restoring circuit for all starting relays controlled by said knock-down button.

57. In combination with a series of code sending relays, means for selectively energizing any one of said relays and preventing the contemporaneous energization of more than one of such relays, transmitting means operating when any relay is energized to produce a distinctive code, a stick circuit for each relay controlled by said transmitting means, and manual means operable at any time to break the stick circuit of any energized relay to prevent further transmission of said code.

58. In combination with a plurality of independently operable starting relays, a plurality of code sending relays, means for selectively energizing any one of said code sending relays in response to the actuation of the corresponding starting relay, transmitting means operating when any code sending relay is energized to produce a code the character of each element of which depends upon the particular code sending relay that is energized, manually operable means for releasing said code sending relay to interrupt the transmission of said code, and manually operable means for restoring the corresponding starting relay to prevent the subsequent transmission of said code.

59. In a remote control system of the code type, a control office and a plurality of stations, a code transmitter at each station for transmitting indication codes to said office over a line circuit common to all stations in response to the operation of devices at such station, a code transmitter at said office for transmitting control codes to each of said stations, a relay at each station effective when moved to one position to prevent the transmission of indication codes from said station in response to the operation of said devices and adapted to be moved to a second position by the transmission of a control code from the office to said station, and means at the office for moving said relay to said second position to thereby permit the transmission of indication codes from said station.

60. Means for continuously indicating whether or not a contact is closed located at the remote end of an intermittently rendered available circuit comprising a stick relay and a source of current at the local end of said circuit for picking up said stick relay each time said circuit is rendered available and said contact is closed, a holding circuit for maintaining said relay energized, and means for opening said holding circuit effective only when said relay is governed by said contact, and an indication lamp controlled by said relay.

61. The combination with transmitting means for delivering a code comprising a series of elements arranged in a selected pattern in two groups, of a receiver responsive to said code and including a plurality of delivery relays, said receiver also including a group of indication relays for each delivery relay, means effective when the receiver is supplied with the final element of the code for energizing a selected one of the delivery relays in accordance with the character of the elements in one group, and means effective when the selected delivery relay is energized for controlling the indication relays of a selected group in accordance with the character of the elements in a second group of elements in the code.

62. The combination with transmitting means for delivering a code comprising a series of elements arranged in a selected pattern in two groups, of a receiver responsive to said code, a plurality of groups of stick relays each having a pickup circuit and a stick circuit, means effective when the receiver is supplied with the final element of a code for opening the stick circuit of each stick relay of a particular group selected in accordance with the code pattern of one group of elements in said code and for simultaneously closing the pickup circuits of selected relays in said group in accordance with the code pattern of a second group of elements in said code.

63. The combination with transmitting means for delivering a code comprising a series of elements arranged in a selected pattern in two groups, of a receiver responsive to said code, comprising a plurality of delivery relays and a plurality of groups of indication relays including one group for each delivery relay, means effective when the receiver is supplied with one group of elements of the code to prepare circuits for particular delivery relays according to the code pattern of the elements of said one group, means effective when the receiver is supplied with a second group of elements of the code to prepare circuits adapted to control the indication relays of any group, means effective when the receiver is supplied with the final element of a code to selectively energize a particular delivery relay and to thereby energize the indication relays of a selected group in accordance with the said prepared circuits.

64. In a remote control system for railroads, a section of railway track having a track relay, a signal for governing traffic through said section, a stick relay, a control circuit for clearing the signal closed only when the stick relay and the track relay are energized, pickup and stick circuits for the stick relay, said stick circuit including the winding and a front contact of the relay and having a branch closed when the track relay is energized, and a branch closed when the signal is in its most restrictive condition, and means controlled from a remote point for at times closing said pickup circuit to energize said stick relay.

65. In a remote control system, a transmitter adapted to transmit messages to a line circuit, a control relay which if energized causes the transmission of a message of one character and if deenergized causes the transmission of a message of a different character by said transmitter, and means effective if said relay is deenergized to prevent reenergization thereof until a message of said different character has been transmitted by said transmitter.

66. In a remote control system, a transmitter adapted to transmit messages to a line circuit, a control relay which if energized causes the transmission of a message of one character and if deenergized causes the transmission of a message of a different character, a pickup circuit for said relay including a control contact and a contact closed only if the last message transmitted by said transmitter was of said different character, and a stick circuit for said relay including its own front contact and said control contact.

67. In a centralized traffic control system for railroads, a control office and a plurality of field stations, a communication system connecting said control office and said field stations, a plurality of traffic controlling devices at each field station, means including said communication system for transmitting indications of the condition of said traffic controlling devices to said control office from each of said field stations when a change in conditions occurs said means being effective at one station at a time, and means at each field station effective after a predetermined time following the initiation of the transmission of indications from such station to automatically suppress the transmission from the corresponding station if the indications for that station fail to be fully transmitted during said predetermined time.

68. In combination; a track switch; signals governing traffic over said track switch; line wires having a series of code elements transmitted thereover to control said track switch and said signals; means for receiving said code elements to control said switch and said signals, said means preventing reception of the signal control element unless the switch control element has actually effected a response in said receiving means; control means for controlling said switch in accordance with said receiving means; and means for controlling said signals in accordance with said receiving means only when said switch has responded to its said control means.

69. In combination, a switch machine for operating a railway track switch, signals for governing traffic over the track switch, line wires extending from a control office to the track switch and having a series of code elements applied thereto for controlling the operation of said switch machine and said signals, switch control means responsive to a certain element of said series to thereby control said switch machine, signal control means responsive to a certain succeeding element of said series only when said switch control means has actually responded to its code element, and means for clearing said signals when said signal control means has responded to its code element only if said switch machine has responded to said switch control means, whereby the failure in the reception of a code element results in the failure to clear one of said signals.

70. In a centralized traffic control system for governing the operation of signals associated with a track switch at a distant field station from a control office, stepping and control line wires extending from the control office to the field station, two neutral signal direction control relays each respectively governing the clearing of either of two signals in a particular direction over the track switch depending upon its position, means for selectively energizing said control relays momentarily in accordance with the character of a code element transmitted over said line wires at a particular time, a track relay of a detector track circuit adjacent the track switch, another relay controlled by said track relay, and stick circuits for said control relays each including a front contact of said track relay in multiple with a back contact of said other relay, whereby said control relays are deenergized when a train enters the detector track circuit but not when it leaves, and whereby said control relays may be energized while the train is on said track circuit.

71. In a centralized traffic control system for governing the operation of signals associated with a track switch at a distant field station from a control office, stepping and control line wires extending from the control office to the field station, two neutral stick control relays respectively governing the clearing of signals in opposite directions over the track switch, means for momentarily energizing one of said control relays depending upon the character of a code element transmitted over said line wires at a particular time, a stick circuit for each of said control relays including the back contact of the other, and a track relay of a detector track circuit adjacent the switch for opening said circuits.

72. Field equipment for centralized traffic control systems of the multiple impulse type comprising in combination with a track switch and its associated signals, stepping and control line wires, stepping relays operated sequentially in response to a series of code elements transmitted over said line wires irrespective of the character of the said elements, a signal control relay, means governed by one of said stepping relays for momentarily energizing said signal control relay dependent upon the character of one particular code element of said series, a stick circuit for said signal control relay for maintaining it energized after once so energized, and a detector track circuit for breaking said stick circuit to deenergize said control relay upon passage of a train.

73. A centralized traffic control system for governing the operation of signals at a distant field station from a control office by means of a series of code elements transmitted over stepping and control line wires comprising, a group of stepping relays operated one at a time in response to the successive energization and deenergization of said line wires, two neutral signal control relays, means rendered effective on particular steps of said stepping relays for momentarily energizing said control relays selectively depending upon the character of the code elements transmitted over said line wires for such steps, stick circuits for maintaining said control relays energized, and a track relay of a track circuit in advance of the signals for breaking said stick circuits upon the passage of a train.

74. In a system of the type in which any one of a large number of traffic controlling devices at a way station of a railway system may be controlled from a central office through a normally at rest selector system, of a first relay which must be energized to permit operation of said selector system and which is deenergized at the end of an operating cycle of such selector system, a plurality of stick relays each of which if energized closes contacts to transmit a particular code through the medium of said selector system, manually controlled means for energizing said stick relays, a front contact of said first relay included in the stick circuits of said stick relay, and a back contact of said first relay included in the pick-up circuits of all of said stick relays.

75. In a system of the type in which any one of a large number of traffic controlling devices at a way station of a railway system may be controlled from a central office through a normally at rest selector system, of a relay which must be energized to permit operation of said selector system and which is deenergized at the end of an operating cycle of such selector system, conditioning means for conditioning said selector system to transmit a particular code, and means for preventing said conditioning means being changed to transmit a different code while said relay is energized.

76. In a system of the type in which any one of a large number of traffic controlling devices at a way station of a railway system may be controlled from a central office through a normally at rest selector system, of a relay which must be energized to permit operation of said selector system and which is deenergized at the end of an operating cycle of such selector system, conditioning means for conditioning said selector system to transmit a particular code, manually controlled means for controlling said conditioning means, and means for preventing said manually controlled means controlling said conditioning means to transmit a different code while said relay is energized.

77. A centralized traffic control system for controlling the clearing of signals at a distant field station from a control office comprising, line wires extending from the control office to the field station, stepping relays operated sequentially in response to code elements applied to said line wires irrespective of their character, a neutral signal control relay for governing the clearing of a signal for a particular direction, means governed by said stepping relays and responsive to the character of the code elements in said line wires for energizing said signal control relay, a track relay of a track circuit adjacent the signal and in advance thereof, another relay controlled by said track relay, and a stick circuit for said signal control relay closed only if said detector track relay is energized or said other relay is deenergized.

78. In a centralized traffic control system, a signal control relay for controlling the clearing of a signal, remote control means for momentarily energizing said relay, a track relay of a track circuit adjacent to and in advance of said signal, another relay controlled by a front contact of said track relay, and a stick circuit for said control relay including in multiple a front contact of said track relay and a back contact of said other relay.

79. In a centralized traffic control system, a track section having a track relay, two signal control relays controlling the clearing of signals governing the movement of traffic in opposite directions through said track section, another relay controlled by a front contact of said track relay, remote control means for momentarily energizing one of said signal control relays or the other, and a stick circuit for each said signal control relay jointly governed by said track relay and said other relay each said stick circuit opening upon movement of a train into said track section and closing if the stick relay becomes energized while the track section is occupied.

80. A centralized traffic control system for governing the clearing of a railway signal by remote control, comprising a neutral signal control relay, remote controlled means for momentarily energizing said relay, a track section in advance of the signal, a stick circuit for said signal control relay, and means for opening said stick circuit momentarily upon entrance of a train into said track section, whereby said control relay when energized to clear the signal is automatically de-energized by the passage of a train but may be again energized by the operation of said remote control means even though a train is present in said track section.

81. A centralized traffic control system for governing the operation of signals at a distant field station from a control office comprising, stepping and control line wires, a bank of stepping relays sequentially operated in response to code elements applied to said line wires irrespective of their character, a neutral signal control relay, means governed by said stepping relays and responsive to the character of the code elements in said line wires for momentarily energizing said control relay, a stick circuit for said signal control relay, a track relay of a track circuit adjacent to and in advance of the signal controlled by said control relay for interrupting said stick circuit, and means governed by said stepping relays and responsive to the character of the code elements in said line wires for also de-energizing said signal control relay without operation of said track relay.

82. In a remote control system for railroads, a track section, a track relay for the section, a signal for governing traffic through the section, a stick relay for the signal, a control circuit for the signal closed only when the stick relay and the track relay are energized, a pick-up circuit for the stick relay adapted to be closed from a remote point, a first stick circuit for the stick relay closed when the stick relay and the track relay are energized, another relay adapted to be energized when the track relay is energized, and a second stick circuit for the stick relay including a back contact of the other relay.

83. In a remote control system for railroads, a track section, a track relay for the section, a signal for governing traffic through the section, a stick relay for the signal, a control circuit for the signal closed only when the stick relay and the track relay are energized, a pick-up circuit for the stick relay adapted to be closed from a remote point by a momentary current impulse, another relay controlled by a front contact of the track relay, a relay adapted to be controlled manually from a remote point by a momentary current impulse, and a plurality of stick circuits for the stick relay each including a contact of said relay controlled manually and including respectively a front contact of the track relay and a back contact of the other relay.

84. A centralized traffic controlling system for railroads comprising an office and a station connected by line wires, a code transmitter at the station for delivering code elements to said line wires, code responsive indication means at the office, a plurality of similar groups of railway traffic governing devices at the station, means effective when the code transmitter is set into operation for delivering to the line wires a code comprising a series of elements in two groups, including one group of elements having a variable code pattern identifying a selected one of the plurality of groups of devices, and a second group of elements having a code pattern indicating the condition of each device of a group, and means responsive to a change in condition of devices of different groups for operating the transmitter repeatedly to transmit a series of codes to indicate at the office the condition of each of said groups of devices in turn.

85. In a centralized traffic control system for railroads, a control office, a plurality of field stations, a step-by-step mechanism at the control office and at each field station, said mechanism being operated synchronously, line wires extending from said control office through each of said field stations, a plurality of traffic governing devices at each field station divided into groups, means governed by said step-by-step mechanism at each field station responsive to a particular combination of impulses on said line wires to select that field station, means at each field station responsive to a particular combination of impulses, when the corresponding field station is selected, to select a particular group of traffic governing devices at that station, means causing said traffic governing devices of a particular selected group to be responsive to impulses on said line wires, and means governed by the step-by-step mechanism in the control office for selectively placing impulses on said line wires.

86. In a centralized traffic control system for railroads having a control office and a plurality of field stations connected by a selective type communication system, said system being normally at rest, means at the control office for manually initiating the system into operation, means at each field station for automatically initiating the system into operation, and means at each field station for preventing operation of said automatic initiating means at that station when in an operated position and for allowing operation of said automatic initiating means at that station when in a non-operated position, said means being manually controlled.

87. A centralized traffic controlling system for railroads comprising an office and a station connected by line wires, a code transmitter at the station for delivering code elements to said line wires, code responsive indication means at the office, a plurality of similar groups of railway traffic governing devices at the station, means effective when the code transmitter is set into operation for delivering to the line wires a code comprising a series of elements in two groups, including one group of elements having a variable code pattern identifying a selected one of the plurality of groups of devices, and a second group of elements having a code pattern indicating the condition of each device of a group, a plurality of mechanisms including one for each group of devices for setting the transmitter into operation and for determining the code pattern of the first group of elements of a code, and means responsive to a change in condition of any device for selectively actuating one of said mechanisms to thereby transmit a code to indicate at the office the condition of each device of the corresponding group of devices.

88. A centralized traffic controlling system for railroads comprising an office and a station connected by line wires, a coding unit at the office and a coding unit at the station each adapted to send and receive code signals through the medium of said line wires, a plurality of station storage units associated with the station coding unit, a plurality of office storage units associated with the office coding unit including one for each station storage unit, a plurality of track sections at the station including one for each station storage unit, a track switch in each track section, a signal for governing train movements through each section, switch and signal control levers and indicators and a manually controllable starting contact for each office storage unit, means responsive to the operation of any starting contact and controlled by code signals transmitted over said line wires for selectively actuating corresponding office and station storage units through the medium of said coding units and said line wires to operate a selected switch and signal in accordance with the positions of the levers of the unit containing the operated starting contact, and means responsive to a change in condition of a track section or of its associated switch or signal for selectively controlling corresponding office and station storage units through the medium of said coding units and said line wires to indicate the condition of said track section, switch and signal at the office.

89. A centralized traffic controlling system for railroads comprising an office and a station connected by line wires, a plurality of track sections at the station, a track switch and a signal for each section, a coding unit at the office adapted to send code signals and a coding unit at the station adapted to receive code signals through the medium of said line wires, a plurality of storage units associated with each coding unit including one at the office and one at the station for each track section, switch and signal control levers and a manually controllable starting contact for each office storage unit, and means responsive to the operation of any starting contact and controlled by code signals transmitted over said line wires for selectively controlling corresponding office and station storage units through the medium of said coding units to thereby operate a selected switch and its associated signal.

90. A centralized traffic controlling system for railroads comprising an office and a station connected by line wires, a plurality of track sections at the station, a track switch and a signal for each section, a coding unit at the office adapted to receive code signals and a coding unit at the station adapted to send code signals through the medium of said line wires, a plurality of storage units associated with each coding unit including one at the office and one at the station for each track section, and means responsive to a change in condition of a track section or of its associated switch or signal for selectively controlling corresponding office and station storage units through the medium of said coding units to indicate the condition of said track section, switch and signal at the office.

91. A remote control system comprising an office and a plurality of stations connected by line wires, a plurality of governing devices at each station, a coding unit at the office and at each station, a plurality of station storage units for each station coding unit each adapted to control all of the devices for that unit at the corresponding station, means at the office for transmitting a first group of code elements over said line wires to actuate all of the coding units in unison, means responsive to said group to cause the selection of a particular storage unit at a selected station, means at the office for transmitting a second group of code elements of selected character over said line wires to actuate the coding units at the office and at the selected station, and means at the selected station for controlling each device associated with said storage unit in accordance with the character of a code element in said second group.

92. In combination with an office and a plurality of stations, a plurality of groups of devices at each station, transmitting means at each station for delivering to said office a code made up of a series of code elements of determinable characters, means in each group of devices for initiating the operation of said transmitting means, means at each station for determining the character of certain elements in a code delivered by the associated transmitting means in accordance with the station at which the code originates, means for determining the character of certain elements in each said code in accordance with the group in which the code originates, and means for determining the character of other elements of each said code in accordance with the condition of the devices in said group.

93. A remote control system comprising an office and a plurality of stations connected by line wires, a plurality of similar devices at each station, transmitting means at the office for delivering different series of code elements to said line wires to selectively control said devices, comprising means for imparting a selected character to the first element of each series to designate its place of origin, means for imparting a selected character to certain elements of each series in accordance with the station at which the device to be controlled is located, means for imparting a selected character to one element of each series to designate which device at such station is to be controlled, means for imparting a selected character to other elements of each series to determine the operation to be performed by the designated device; selecting means at each station controlled over said line wires including a first selector selectively responsive to the first element of each series only if such element has a particular character, a second selector selectively responsive at one station only to said certain elements of a series to which said first selector responds, and a plurality of third selectors including one for each device, the selector for the designated device only being responsive to said one element of a series to which the second selector responds; and means controlled by the selector for the designated device for operating said device in accordance with the character of the other elements of the series to which such selector responds.

94. In a centralized traffic control system for railroads, a control office, a plurality of field stations, a step-by-step mechanism at the control office and at each field station operable through cycles of operation each step being taken in synchronism, line wires extending from said control office through each of said field stations, a plurality of traffic governing devices at each field station divided into groups, control means at each field station for operating the respective traffic governing devices of each group in accordance with the condition of energization of said line wires for the respective steps of a cycle when selectively governed, means determining what particular field station shall have a control means selectively governed for a particular cycle of operation, and means determining which group of said devices at that particular field station shall be operated with the control means at that field station selectively governed.

95. In a centralized traffic control system for railroads, a control office, a plurality of field stations, a step-by-step mechanism at the control office and at each field station operable through cycles of operation each step being taken in synchronism, line wires extending from said control office through each of said field stations, a plurality of traffic governing devices at each field station divided into groups, indication storing relays in said control office divided into groups for storing the condition of corresponding devices in corresponding groups of said traffic governing devices, the respective indication storing relays of a particular group being controlled in accordance with the condition of said line wires on certain steps during a particular cycle of operation, means governed by the traffic governing devices of each group for selectively determining the condition of said line wires for each step of a particular cycle of operation, and means determining which particular group of said traffic governing devices will be in communication with its corresponding group of said indication storing relays for a particular cycle of operation.

96. In a centralized traffic control system for railroads, a field station having a bank of stepping relays sequentially operated through a cycle of operation, line wires extending from said field station, a plurality of traffic governing devices divided into groups, means governed by the respective devices of each group for controlling the condition of said line wires on the respective steps of each cycle of operation, and means selectively determining which group of said devices shall be effective for controlling the condition of said line wires for any particular cycle of operation.

97. In a centralized traffic control system for railroads, a control office, a plurality of field stations, a step-by-step mechanism at the control office and at each field station, said mechanism being operated synchronously, line wires extending from said control office through each of said field stations, a plurality of traffic governing devices at each field station divided into exclusive groups, means at each field station responsive to a particular combination of impulses on said line wires to select that field station, means at each field station responsive to a particular combination of impulses, when the corresponding field station is selected, to select a particular group of traffic governing devices at that station.

98. In combination; a bank of stepping relays; means for operating said relays of said bank sequentially; a plurality of channel circuits prepared by said bank of stepping relays, one for each operation of one of said stepping relays; means for dividing each of said channel circuits into a plurality of branches with the corresponding branches of said plurality of channel circuits separated into groups; a group of devices for each of said groups of branched channel circuits; means for connecting the devices of any group to its corresponding group of channel circuits whenever a change in the condition of one of the devices in that group occurs; and means for interlocking said groups of channel circuits so that only one group of branched channel circuits can be connected to its devices for any particular operation of said bank of stepping relays.

99. In combination; line wires having a series of distinctive impulses applied thereto; a bank of stepping relays; means for operating all of said stepping relays in said bank sequentially one for each impulse of said series of impulses; a channel circuit prepared by each of said stepping relays; and means controlled over said channel circuits of a first part for branching each of said channel circuits of a second part into any one of a plurality of branches, said plurality being greater than two.

100. A remote control system comprising, two spaced locations connected by line wires, means for transmitting signals to said line wires for communicating between said location in either direction, means at each said location for initiating said transmitting means and imparting distinctive character to a portion of said signals in accordance with the direction in which communication is to be established, and means at each of said locations selectively responsive to the character of said portion of the signals for continuing the effective operation of the said transmitting means.

101. In a centralized traffic control system for railroads, a control office and a field station, a communication system connecting said control office with said field station, means including said communication system for transmitting indications from said field station to said control office in response to a change in conditions at said field station, means made effective upon the initiation of said communication system in response to said change in conditions to measure a predetermined time after which said transmitting means is made ineffective if said indications are not fully transmitted within said predetermined time, and means manually operable from said control office for restoring said transmitting means to a normally effective condition.

102. In a centralized traffic control system for railroads, a plurality of traffic controlling devices, control receiving means, indication transmitting means, a change storing relay actuated by a change in condition of any of said plurality of devices for causing the operation of said indication transmitting means, means initiated upon the actuation of said change storing means for measuring a predetermined time during which said indication transmitting means can be effective, and means for preventing automatic operation of said indication transmitting means following the lapse of said predetermined time whereby failure of said indication transmitting means to complete an operation within said predetermined time prevents further automatic operation of said change storing means.

103. In a centralized traffic control system for railroads, a control office, a field station, a normally at rest indication transmitting means at said field station, initiating means for said transmitting means, means including a thermal relay for measuring a predetermined time after said initiating means actuates said transmitting means, and means automatically effective to render said indication transmitting means ineffective for an undetermined period of time if it fails to fully respond to said initiating means within said predetermined time.

104. In a centralized traffic control system for railroads, a control office connected to a field station having a plurality of traffic controlling devices by a communication system, indication transmitting means, a change storing relay for registering a change in the condition of any one or all of said traffic controlling devices, a stop relay manually governable, a cut-out relay, a time element device, an energizing circuit for said time element device including a front contact of said change storing relay and a back contact of said cut-out relay, a pick-up circuit for said cut-out relay including a front contact of said time element device, a stick circuit for said cut-out relay including a front contact of said cut-out relay and a back contact of said manually governable stop relay, and a cut-out circuit including a contact of said cut-out relay for rendering said indication transmitting means ineffective.

105. In combination, a control office, a plurality of field stations, a normally-at-rest code type system interconnecting said control office and said field stations, initiating means for said system at each field station, code transmitting means at each field station, means allowing only one of said transmitting means to be effective at any one time, cut-out means at each field station effective until manually restored to prevent said initiating means at its particular field station from automatically initiating said system after a predetermined time if said transmitting means at that field station is not effective to complete its transmission within a predetermined time following the first actuation of said initiating means, and manually controlled means at each field station for restoring said cut-out means.

106. In a centralized traffic controlling system for railroads, a control office, a plurality of field stations, a plurality of traffic governing devices at each field station, said devices being arranged in groups including at least two of said devices, a selective type communication system operable through cycles of operation for transmitting indications of the conditions of said devices to said control office, said system being operable to transmit those and only those indications corresponding to a single group of devices during any particular cycle of operation, and means determining which group shall transmit its indications during a particular cycle of operation.

107. In a centralized traffic controlling system for railroads, a control office, a plurality of field stations, a plurality of traffic governing devices at each of said field stations, a communication system for selectively transmitting control impulses to said traffic governing devices at a particular field station during each operation when initiated from the control office, and for selectively transmitting indication impulses to said control office in accordance with the condition of said traffic governing devices at a particular field station when initiated from that field station, manually operable means for initiating said system from said control office when there are control impulses to be transmitted, automatic means for initiating said system from a field station when said devices at that field station have assumed new conditions in response to the transmission of new control impulses, and means for initiating said system from a particular field station when said system has transmitted the same control impulses to that field station for the second time, regardless of the response of said devices at that field station.

108. In a centralized traffic controlling system, a railroad track switch, a detector track section associated with said switch, a synchronous selector type communication system operable through cycles of operation connecting said track switch to a central control office, means for causing a plurality of indications to be transmitted over said communication system during a single cycle of operations and means causing indications of the condition of said track switch and said track section to be transmitted over said communication system during different cycles of operation, whereby the length of each cycle of operation is reduced.

109. In a centralized traffic controlling system, a control office, a railroad track switch, signals governing traffic over said switch, annunciator track sections associated with said track switch, a synchronous selector type communication system operable through cycles of operation connecting said track switch to said control office and automatically controlled for transmitting a plurality of indications during each cycle of operation, and means for automatically transmitting during any particular operating cycle of said synchronous selector type communication system either the indications of said track switch and signals only or the indications of the conditions of said annunciator track sections only.

110. In a centralized traffic controlling system, a control office, a plurality of field stations, step-by-step means in the control office and at each field station operated synchronously, line wires extending from the control office to the several field stations, conditioning means governed by said step-by-step means at each field station for controlling the energization of said line wires in accordance with a distinctive code call for that station, means governed by the step-by-step means in the control office responsive to the respective conditions of said line wires for registering a particular station, and means at each station for determining which group of a plurality of groups of indications are to be transmitted after the corresponding station has been registered in said control office.

111. In a centralized traffic controlling system, a control office, a plurality of field stations, step-by-step means in the control office and at each field station operable synchronously through cycles of operation, line wires extending from the control office to the several field stations, station selecting means in part located at the control office and in part at each field station for determining the particular station which may employ said line wires during a particular cycle of operation, a plurality of traffic controlling devices, a plurality of track sections, route indicating means actuated in accordance with the condition of said plurality of traffic controlling devices, annunciator indicating means actuated in accordance with the occupancy of said plurality of track sections, and means selectively causing said plurality of traffic controlling devices to transmit indications during a particular operating cycle in preference to said plurality of track sections when both are ready to transmit indications at the beginning of a cycle of operation.

112. In a centralized traffic controlling system for railroads, a control office, a field station, a selective type communication system operable through cycles of operation for transmitting impulses from said field station to said control office, a plurality of traffic governing devices at said field station, a plurality of indication storing relays at said control office corresponding to said traffic governing devices, means causing different groups of said traffic governing devices to transmit impulses in accordance with their condition to their respective indication storing relays on separate operating cycles when said traffic governing devices assume new conditions, and means determining the sequence in which the various groups may transmit impulses on succeeding cycles of operation.

113. In a centralized traffic controlling system, a railroad track switch, a detector track section associated with said switch, a synchronous selector type communication system connecting said track switch to a central control office, means for causing a plurality of indications to be transmitted over said communication system during a single cycle of operations, means causing said indications of the condition of said track switch and said track section to be transmitted over said communication system during different cycles of operation whereby the length of each cycle of operation is reduced, and means responsive to a condition requiring the transmission of both track switch and track section indications for causing said system to transmit said track switch indications first.

114. In a centralized traffic controlling system, a control office, a plurality of field stations, a communication system connecting said control office to each of said field stations, a plurality of traffic controlling devices at each of said field stations, control means in said control office for transmitting control impulses to their respective traffic controlling devices, indication means at each field station for automatically transmitting indication impulses to the control office of the condition of said traffic controlling devices when said devices have completed their operation into correspondence with their respective control means, and means manually operable for causing said indication means to transmit indication impulses of the condition of said traffic controlling devices independently of their condition with respect to their respective control means.

115. In a centralized traffic control system for railroads; a control office; a plurality of field stations; a plurality of traffic controlling devices at each field station; control levers in the control office for each of said traffic controlling devices; a selective type communication system connecting said control office with said field stations; means for transmitting controls in accordance with said control levers to said traffic controlling devices at each station, one station at a time; and means at each station for transmitting indications of the condition of the traffic controlling devices at each field station to the control office after said traffic controlling devices have responded to said controls, said means including means for transmitting indications irrespective of the response of said traffic controlling devices if the same controls are transmitted twice to the same traffic controlling devices at a particular station.

116. In a signaling system: means to produce recurring series of impulses; and a chain of relays, to be energized and deenergized in sequence, consisting of two groups the relays of which groups are arranged in alternation, the relays of one group registering the number of impulses of the series of impulses, and the relays of the other group registering the number of intervals occurring during a series of impulses, each relay controlling the energization of the succeeding one and the deenergization of the preceding one.

117. In a centralized traffic controlling system for railroads, a plurality of field stations each associated with a plurality of track sections, a plurality of track signals in each field station for governing traffic over said track sections, a dispatcher's control panel having lines thereon representing said sections, said panel divided into units, each unit corresponding to a field station, a key and a signal on said panel for each track signal, a dispatcher's coding apparatus common to all said keys and signals, a start relay for each panel unit operated in response to the operation of any key in the corresponding panel unit, a group of code marking relays for each panel unit, distributor relays operated in response to the operation of one of said start relays for selecting the corresponding group of code marking relays, means responsive to the selection of a group of code marking relays for operatively connecting said dispatcher's coding apparatus therewith, and means responsive thereto for operating said dispatcher's coding apparatus to transmit a code to said field stations corresponding to the connected group of code marking relays and the operated key for operating the track signal corresponding to the operated key.

118. In a centralized traffic controlling system for railroads, a plurality of field stations each associated with a plurality of track sections, a plurality of track signals in each field station for governing traffic over said track stations, a dispatcher's control panel having lines thereon representing said sections, said panel divided into units, each unit corresponding to a field station, a key and a signal on said panel for each track signal, a dispatcher's coding apparatus common to all said keys and signals, a start relay for each panel unit operated in response to the operation of any key in the corresponding panel unit, a group of code marking relays for each panel unit, distributor relays operated in response to the operation of one of said start relays for selecting the corresponding group of code marking relays, means responsive to the selection of a group of code marking relays for operatively connecting said dispatcher's coding apparatus therewith, means responsive thereto for operating said dispatcher's coding apparatus to transmit a code to said field stations corresponding to the connected group of code marking relays and the operated key for operating the track signal corresponding to the operated key, and means operated during the transmitting period for preventing the operation of a second start relay from selecting its corresponding group of code marking relays and operatively connecting the same to the dispatcher's coding apparatus.

119. In a centralized traffic controlling system for railroads, a plurality of field stations each associated with a plurality of track sections, a plurality of track signals in each field station for governing traffic over said track sections, a dispatcher's control panel having lines thereon representing said sections, said panel divided into units, each unit corresponding to a field station, a key and a signal on said panel for each track signal, a dispatcher's coding apparatus common to all said keys and signals, a start relay for each panel unit operated in response to the operation of any key in the corresponding panel unit, a group of code marking relays for each panel unit, distributor relays operated in response to the operation of one of said start relays for selecting the corresponding group of code marking relays, means responsive to the selection of a group of code marking relays for operatively connecting said dispatcher's coding apparatus therewith, means responsive to the connection of said coding apparatus with said group of code marking relays for operating the coding apparatus to transmit pulses to said field stations, means for grouping said pulses into a code combination in accordance with the connected group of code marking relays and the operated key, and means responsive to the transmitted code combination for selecting the corresponding field station and for operating the track signal therein corresponding to the operated key.

120. Remote controlling apparatus comprising a plurality of line relays, means for causing successive similar operations of individual ones or combinations of said relays in response to successive elements of a code transmitted from a distant point, a chain of counting relays, means for operating the relays of said chain step by step in response to the operation of said line relays during successive code elements, a plurality of indicating devices, code receiving relays controlled by said counting chain and responsive to the sequence of operation of said line relays during certain elements of said code to select a particular device, other code receiving relays also controlled by said counting chain for controlling the said selected device in accordance with another element of said code, and stick circuits for each of said code receiving relays including its own front contact and a contact closed only during said successive code elements.

121. Remote controlling apparatus comprising a plurality of line relays, means for causing successive similar operations of individual ones or combinations of said relays in response to successive elements of a code transmitted from a distant point, a chain of counting relays, means for operating the relays of said chain step by step in response to the operation of said line relays during successive code elements, a plurality of indication devices, code-receiving relays controlled by said counting chain and responsive to the sequence of operation of said line relays during certain elements of said code to select certain ones of said devices, other code receiving relays also controlled by said counting chain for controlling the said selected devices in accordance with other elements of said code, and stick circuits for each of said code receiving relays including its own front contact and a contact closed only during said successive code elements.

122. Remote controlling apparatus comprising a plurality of line relays, means for causing successive similar operations of individual ones or combinations of said relays in response to successive elements of a code transmitted from a distant point, a chain of counting relays, means for operating the relays of said chain step by step in response to the operation of said line relays during successive code elements, code receiving relays for each step of said chain of counting relays, an energizing circuit for each of said code receiving relays closed on its respective step only when the character of the code element for that step corresponds thereto, stick circuits for each of said code receiving relays including its own front contact and a contact closed only during said successive code elements, and means controlled by said code-receiving relays.

123. Remote controlling apparatus comprising a plurality of line relays, means for causing successive similar operations of individual ones or combinations of said relays in response to successive elements of a code transmitted from a distant point, a chain of counting relays, means for operating the relays of said chain step by step in response to the operation of said line relays during successive code elements, code receiving relays for each step of said chain of counting relays, an energizing circuit for each of said code receiving relays closed on its respective step only when the character of the code element for that step corresponds thereto, stick circuits for each of said code receiving relays including its own front contact and a contact closed only during said successive code elements, a plurality of indicating devices, some of said code receiving relays operated in accordance with a portion of the transmitted code to select a particular group of said indicating devices, and other of said code receiving relays operated to control the selected devices in accordance with another portion of the transmitted code.

124. Remote controlling apparatus comprising a plurality of line relays, means for causing successive similar operations of individual ones or combinations of said relays in response to successive elements of a code transmitted from a distant point, a chain of counting relays, means for operating the relays of said chain step by step in response to the operation of said line relays during successive code elements, code receiving relays for each step of said chain of counting relays, an energizing circuit for each of said code receiving relays closed on its respective step only when the character of the code element for that step corresponds thereto, stick circuits for each of said code receiving relays including its own front contact and a contact closed only during said successive code elements, a plurality of groups of indicating devices, said groups divided into sub-groups, some of said code receiving relays operated in accordance with a portion of the transmitted code to select a particular group of indicating devices, another part of said code receiving relays operated in accordance with another portion of the transmitted code to select a particular sub-group in said selected group, and further of said code receiving relays operated to control the devices in the selected sub-group in accordance with a further portion of the transmitted code.

125. Remote controlling apparatus comprising a plurality of line relays, means for causing successive similar operations of individual ones or combinations of said relays in response to successive elements of a code transmitted from a distant point, a chain of counting relays, means for progressively operating the relays of said chain in response to operation of said line relays during successive code elements, a plurality of indication devices, means controlled by said counting chain and responsive to the sequence of operation of said line relays during certain elements of said code to select a particular device, and means also controlled by said counting chain for controlling the selected device in accordance with another element of said code.

126. Remote controlling apparatus comprising a plurality of line relays, means for causing successive similar operations of individual ones of combinations of said relays in response to successive elements of a code transmitted from a distant point, a chain of counting relays, means for progressively operating the relays of said chain in response to the operation of said line relays during successive code elements, a plurality of sets of indication devices each device of each set being assigned to a particular relay in said counting chain, means controlled by said counting chain and responsive to the sequence of operation of said line relays during certain elements of said code to select a particular set of said indication devices, and means for controlling each indication device in the selected set in accordance with the line relay or line relays operated when the counting relay corresponding to such device is operated.

127. Remote controlling apparatus comprising a plurality of line relays, means for causing successive similar operations of individual ones or combinations of said relays in response to successive elements of a code transmitted from a distant point, a chain of counting relays, means for progressively operating the relays of said chain in response to operation of said line relays during successive code elements, a plurality of indication devices each assigned to a particular relay in said counting chain, and means responsive to the last element in said code for controlling each indication device in accordance with the line relay or line relays which were operated when the counting relay corresponding to such device was operated.

128. Remote controlling apparatus comprising a plurality of line relays, means for causing successive similar operations of individual ones or combinations of said relays in response to successive elements of a code transmitted from a distant point, a chain of counting relays, means for progressively operating the relays of said chain in response to operation of said line relays during successive code elements, a plurality of indication devices each assigned to a particular relay in said counting chain, and means controlled by the last relay in said chain for controlling each indication device in accordance with the line relay or line relays which were operated when the counting relay corresponding to such device was operated.

129. In a remote control system of the code type, transmitting means for delivering codes made up of selecting elements and function elements each having a selected one of a plurality of characters, means responsive to certain of said selecting elements for preparing a plurality of delivery circuits, means controlled by the last selecting element of a code for completing a particular one of said prepared delivery circuits depending upon the character of said last element, means for registering the character of each function element in said code, indication means, and means controlled by said registering means and by said completed delivery circuit for controlling said indication means.

130. In a remote control system of the code type, transmitting means for delivering codes made up of selecting elements and function elements each having a selected one of a plurality of characters, means responsive to certain of said selecting elements for preparing a plurality of delivery circuits, means controlled by the last selecting element of a code for completing a particular one of said prepared delivery circuits depending upon the character of such last element, means for registering the character of each function element in said code, a plurality of indication means, and means for simultaneously controlling said indication means in accordance with the condition of said registering means when said delivery circuit is completed.

131. In a remote control system of the code type, transmitting means for delivering codes made up of selecting elements and function elements each having a selected one of a plurality of characters, means responsive to certain of said selecting elements for preparing a plurality of delivery circuits, means controlled by the last selecting element of a code for completing a particular one of said prepared delivery circuits depending upon the character of such last element, means for registering the character of each function element in said code, a plurality of sets of indication means one set for each delivery circuit, and means effective when any delivery circuit is completed for controlling the associated set of indication devices in accordance with the condition of said registering means.

132. In a remote control system of the code type, transmitting means for deliverying codes made up of elements of different characters arranged in a predetermined sequence, means responsive to certain elements of said code for preparing a plurality of delivery circuits, means for registering the characters of certain other elements of the code, means responsive to the last element of the code for completing a particular one of said prepared delivery circuits depending upon the character of such last element, indication means, and means effective when said delivery circuit is closed for controlling said indication means by said registering means.

133. In a remote control system of the code type, transmitting means for delivering codes made up of elements of different characters arranged in a predetermined sequence, a series of delivery relays, means responsive to certain elements of said code for preparing circuits for a plurality of said delivery relays, means for registering the characters of certain other elements of the code, means responsive to the last element of the code for completing a particular one of said prepared circuits to operate the corresponding delivery relay, indication means, and means effective when said delivery relay is operated to control said indication means by said registering means.

134. In a remote control system of the code type; transmitting means for delivering codes made up of elements of different characters arranged in a predetermined sequence, a series of delivery relays, means responsive to certain elements of said code for preparing circuits for a plurality of said delivery relays, means for registering the characters of certain other elements of the code, means responsive to the last element of the code for completing a particular one of said prepared circuits to operate the corresponding delivery relay, a plurality of sets of indication devices one set for each delivery relay, and means effective when any delivery relay is operated to control the associated set of indication devices by said registering means.

135. In a remote control system of the code type, means for transmitting a code made up of a series of code elements each having a selected character, stepping means arranged to be operated progressively by successive elements of said code, a plurality of delivery relays, means controlled by said stepping means for energizing a selected one of said delivery relays during the last element of said code depending upon the character of such last element, and means controlled by each delivery relay and selectively responsive to certain elements of said code preceding said last element.

136. In a remote control system of the code type, transmitting means for delivering codes made up of elements of different characters arranged in a predetermined sequence, a series of delivery relays, means responsive to certain elements of said code for preparing circuits for a plurality of said delivery relays, means for registering the characters of certain other elements of the code, means responsive to the last element of the code for completing a particular one of said prepared circuits to operate the corresponding delivery relay, a plurality of sets of indication devices one set for each delivery relay, and each set containing a device corresponding to an individual portion of said registering means, and means effective when any delivery relay is operated to control the individual devices of the associated indication means in accordance with the corresponding portions of said registering means.

137. In a train dispatching system having stations communicating over three conductors in a code involving successive impulses and a distinctive current combination in each impulse, a receiver comprising a counter counting impulses from the start of a signal and a relay responsive during only a certain impulse, as determined by the counter, and responsive only to a certain current combination during that impulse.

138. In a train dispatching system, a receiver as described in claim 137 and automatic means for restoring the counter to normal after the conclusion of a signal.

139. In a train dispatching system, stations communicating over three wires in a code involving two successive distinctive impulses, a receiver at one station comprising a counter responsive to the interval between the impulses, and an element limited thereby to respond during a particular impulse of the code and then responsive only to an impulse of one distinctive character.

CLARENCE S. SNAVELY.
ALFRED B. MILLER.
ROBERT H. TUNELL.